US009940507B2

(12) United States Patent
Maeda et al.

(10) Patent No.: US 9,940,507 B2
(45) Date of Patent: Apr. 10, 2018

(54) IMAGE PROCESSING DEVICE AND METHOD FOR MOVING GESTURE RECOGNITION USING DIFFERENCE IMAGES

(71) Applicant: SONY CORPORATION, Tokyo (JP)

(72) Inventors: Yoshinori Maeda, Kanagawa (JP); Jun Yokono, Tokyo (JP); Katsuki Minamino, Tokyo (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 14/887,209

(22) Filed: Oct. 19, 2015

(65) Prior Publication Data

US 2016/0110592 A1 Apr. 21, 2016

Related U.S. Application Data

(63) Continuation of application No. 13/734,010, filed on Jan. 4, 2013, now Pat. No. 9,165,181.

(30) Foreign Application Priority Data

Dec. 4, 2012 (JP) ................................ 2012-265234

(51) Int. Cl.
*G06K 9/00* (2006.01)
*G06F 3/01* (2006.01)
(Continued)

(52) U.S. Cl.
CPC ......... *G06K 9/00335* (2013.01); *G06F 3/005* (2013.01); *G06F 3/017* (2013.01);
(Continued)

(58) Field of Classification Search
CPC . G06F 3/005; G06F 3/017; G06K 2009/4666; G06K 9/00228;
(Continued)

(56) References Cited

U.S. PATENT DOCUMENTS

2006/0209021 A1* 9/2006 Yoo ........................ G06F 3/017 345/156
2010/0272365 A1* 10/2010 Yamamoto ......... G06K 9/00221 382/190

(Continued)

FOREIGN PATENT DOCUMENTS

JP 2007-087089 A 4/2007

OTHER PUBLICATIONS

Kolsch, Mathias, Matthew Turk, and Tobias Hollerer. "Vision-based interfaces for mobility." Mobile and Ubiquitous Systems: Networking and Services, 2004. MOBIQUITOUS 2004. The First Annual International Conference on. IEEE, 2004.*

*Primary Examiner* — Nirav G Patel
(74) *Attorney, Agent, or Firm* — Chip Law Group

(57) ABSTRACT

An image processing device includes a difference image generation unit which generates a difference image by obtaining a difference between frames of a cutout image which is obtained by cutting out a predetermined region on a photographed image; a feature amount extracting unit which extracts a feature amount from the difference image; and a recognition unit which recognizes a specific movement of an object on the photographed image based on the feature amount which is obtained from the plurality of difference images which are aligned in time sequence.

12 Claims, 39 Drawing Sheets

STARTING GESTURE RECOGNITION PROCESSING
S11 START PHOTOGRAPHING
S12 START HAND SHAPE RECOGNITION
S13 IS HAND DETECTED? NO YES
S14 PERFORMING TRACKING OF POSITION OF HAND
S15 IS HAND IN A CERTAIN RANGE? NO YES
S16 DETERMINING CUTOUT REGION
S17 PERFORMING FEEDBACKING OF GESTURE RECOGNITION
S18 RESETTING TIMER OF FIXING TIME
S19 OBTAINING DIFFERENCE BETWEEN FRAMES
S20 EXTRACTING FEATURE AMOUNT
S21 PERFORMING GESTURE RECOGNITION
S22 CAUSING PROCESSING CORRESPONDING TO GESTURE RECOGNITION RESULT TO BE EXECUTED
S23 IS NEW HAND DETECTED OUTSIDE CUTOUT REGION? YES NO
S24 HAS FIXING TIME PASSED? NO YES

(51) Int. Cl.

| | |
|---|---|
| ***G06K 9/46*** | (2006.01) |
| ***G06K 9/52*** | (2006.01) |
| ***G06K 9/62*** | (2006.01) |
| ***G06T 7/20*** | (2017.01) |
| ***G06T 7/60*** | (2017.01) |
| ***G06F 3/00*** | (2006.01) |
| ***G06T 7/73*** | (2017.01) |
| ***G06T 7/254*** | (2017.01) |

(52) U.S. Cl.
CPC ..... *G06K 9/00228* (2013.01); *G06K 9/00355* (2013.01); *G06K 9/00744* (2013.01); *G06K 9/4661* (2013.01); *G06K 9/52* (2013.01); *G06K 9/6215* (2013.01); *G06T 7/20* (2013.01); *G06T 7/254* (2017.01); *G06T 7/60* (2013.01); *G06T 7/74* (2017.01); *G06K 2009/4666* (2013.01); *G06T 2207/20076* (2013.01); *G06T 2207/20081* (2013.01); *G06T 2207/30201* (2013.01)

(58) Field of Classification Search
CPC ........... G06K 9/00335; G06K 9/00355; G06K 9/00744; G06K 9/4661; G06K 9/52; G06K 9/6215; G06T 2207/20076; G06T 2207/20081; G06T 2207/30201; G06T 7/20; G06T 7/254; G06T 7/60
See application file for complete search history.

(56) References Cited

U.S. PATENT DOCUMENTS

2011/0216941 A1 9/2011 Saijo
2013/0088422 A1 4/2013 Niikura et al.
2014/0010425 A1 1/2014 Gurman

* cited by examiner 11
12
U11
12
U11
RE11
DP11-1
DP11-2
DP11-3
DP11-4

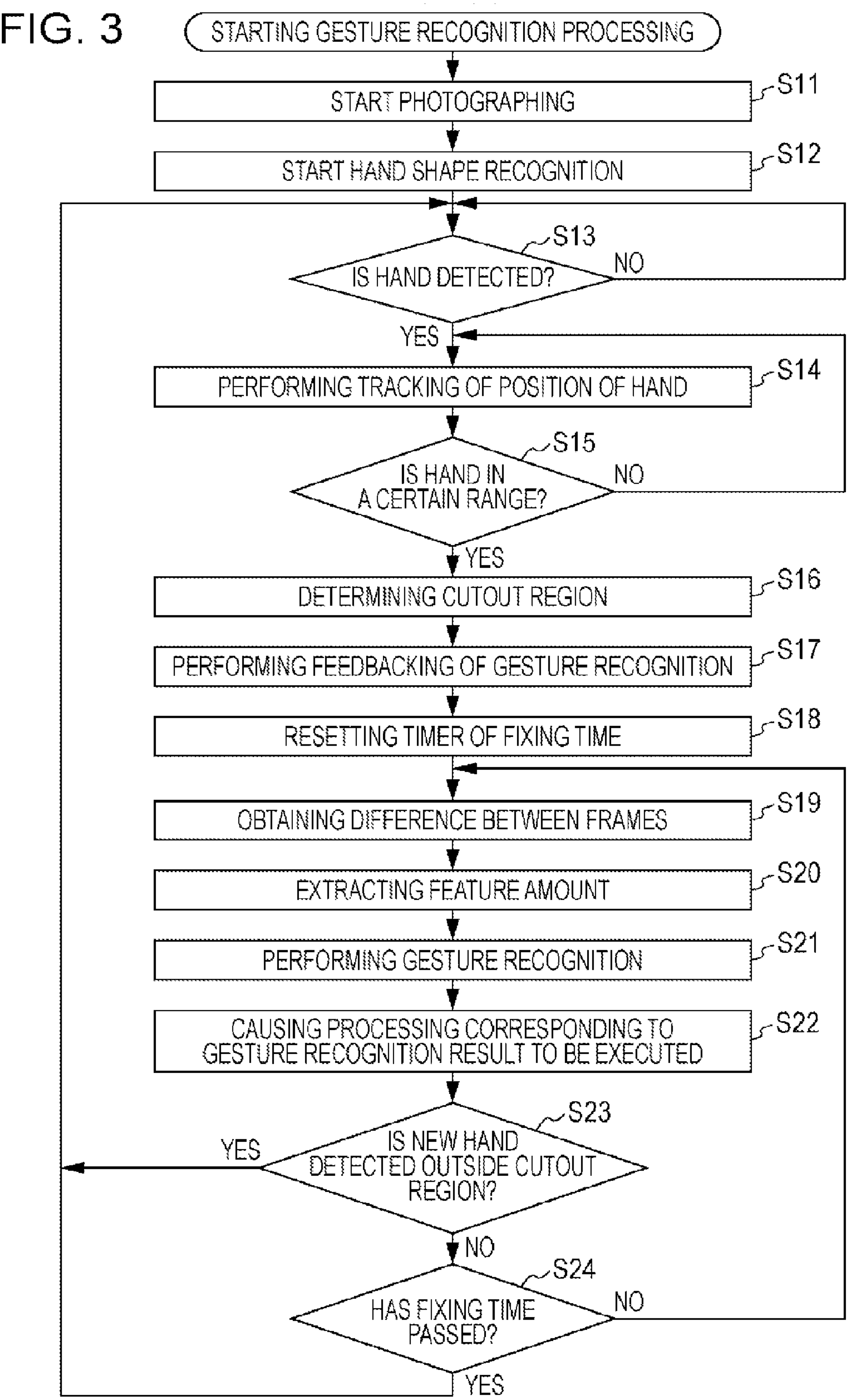
FIG. 3
STARTING GESTURE RECOGNITION PROCESSING
START PHOTOGRAPHING
S11
START HAND SHAPE RECOGNITION
S12
IS HAND DETECTED?
S13
NO
YES
PERFORMING TRACKING OF POSITION OF HAND
S14
IS HAND IN A CERTAIN RANGE?
S15
NO
YES
DETERMINING CUTOUT REGION
S16
PERFORMING FEEDBACKING OF GESTURE RECOGNITION
S17
RESETTING TIMER OF FIXING TIME
S18
OBTAINING DIFFERENCE BETWEEN FRAMES
S19
EXTRACTING FEATURE AMOUNT
S20
PERFORMING GESTURE RECOGNITION
S21
CAUSING PROCESSING CORRESPONDING TO GESTURE RECOGNITION RESULT TO BE EXECUTED
S22
IS NEW HAND DETECTED OUTSIDE CUTOUT REGION?
S23
YES
NO
HAS FIXING TIME PASSED?
S24
NO
YES

U11
12
Q41
Q42
FB21
AC11-1
AC11-2
AC11-3
AC11-4

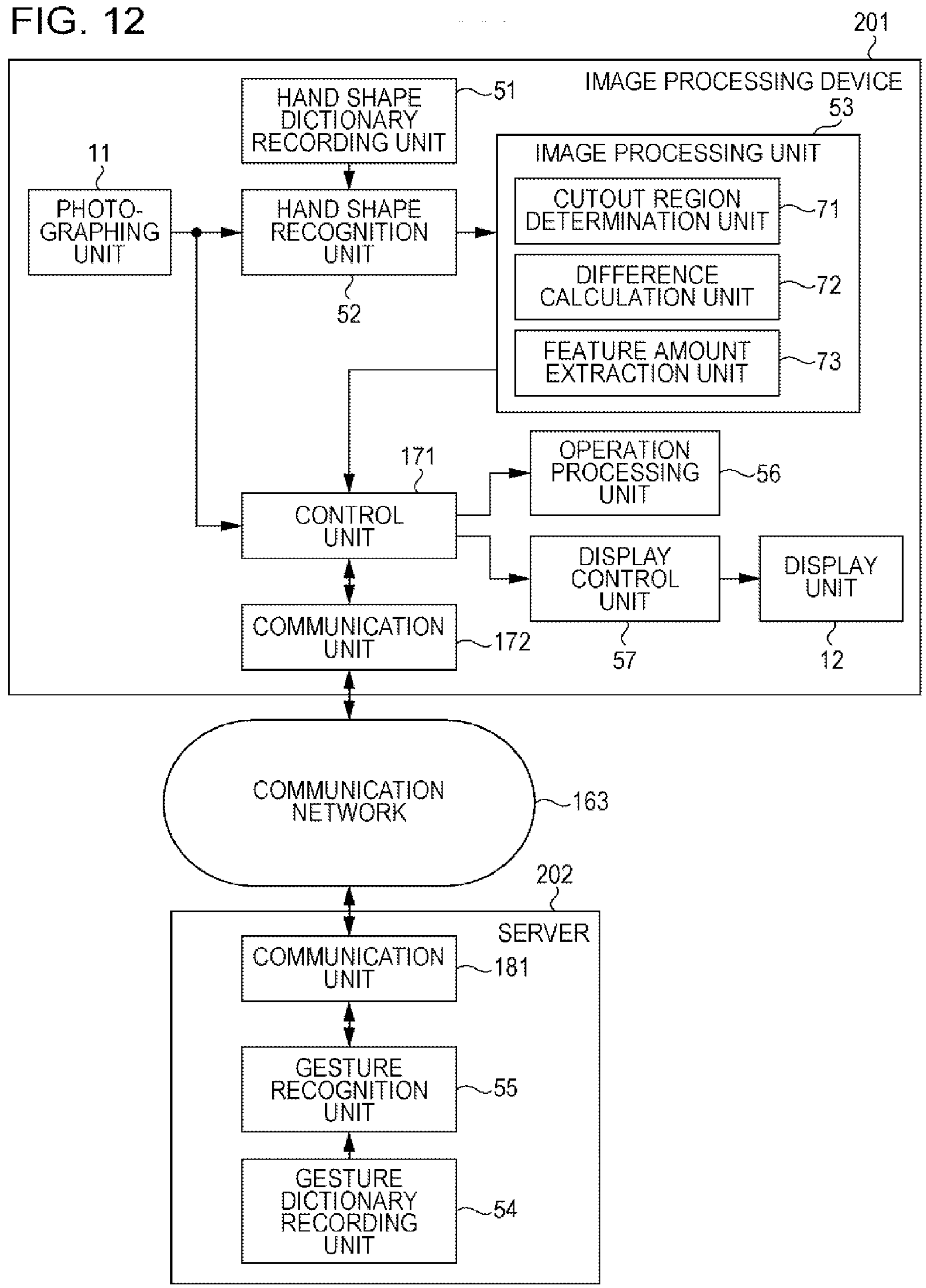
FIG. 12
201
IMAGE PROCESSING DEVICE
HAND SHAPE DICTIONARY RECORDING UNIT
51
53
IMAGE PROCESSING UNIT
11
PHOTO-GRAPHING UNIT
HAND SHAPE RECOGNITION UNIT
52
CUTOUT REGION DETERMINATION UNIT
71
DIFFERENCE CALCULATION UNIT
72
FEATURE AMOUNT EXTRACTION UNIT
73
171
CONTROL UNIT
OPERATION PROCESSING UNIT
56
DISPLAY CONTROL UNIT
57
DISPLAY UNIT
12
COMMUNICATION UNIT
172
COMMUNICATION NETWORK
163
202
SERVER
COMMUNICATION UNIT
181
GESTURE RECOGNITION UNIT
55
GESTURE DICTIONARY RECORDING UNIT
54

U31
12
11
12
U31
RF4

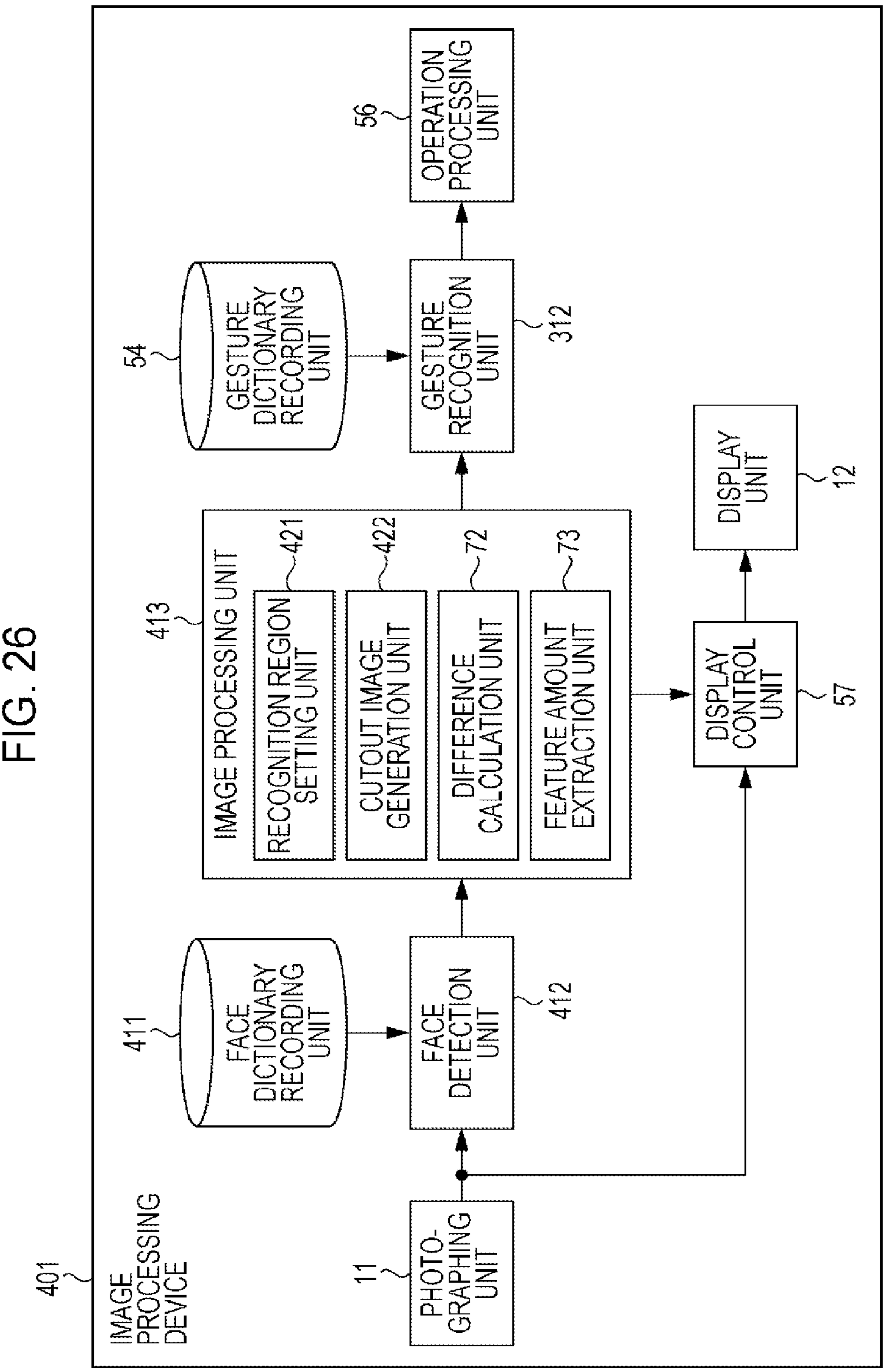
FIG. 26
401
IMAGE PROCESSING DEVICE
11
PHOTO-GRAPHING UNIT
411
FACE DICTIONARY RECORDING UNIT
FACE DETECTION UNIT
412
413
IMAGE PROCESSING UNIT
421
RECOGNITION REGION SETTING UNIT
422
CUTOUT IMAGE GENERATION UNIT
72
DIFFERENCE CALCULATION UNIT
73
FEATURE AMOUNT EXTRACTION UNIT
54
GESTURE DICTIONARY RECORDING UNIT
GESTURE RECOGNITION UNIT
312
56
OPERATION PROCESSING UNIT
DISPLAY CONTROL UNIT
57
DISPLAY UNIT
12

U31
12
11
12
RA4
U31
HA1

11
12
U31
12
RA4
U31
RF9
HA1

Q61
Q62
12
11
U31
PIC11-1
PIC11-2
PIC11-3
PIC11-4
PIC11-5
PIC11-6
ON
OFF
SW12

IMAGE PROCESSING DEVICE AND METHOD FOR MOVING GESTURE RECOGNITION USING DIFFERENCE IMAGES

BACKGROUND

The present technology relates to an image processing device, a method thereof, and a program, and in particular, to an image processing device, a method thereof, and a program in which a gesture can be recognized with higher precision.

In the related art, gesture recognition has been known in which, when a user makes a specific gesture by moving a hand or the like, the gesture is recognized.

For example, in the gesture recognition, a trace of a hand is obtained by aligning information of positions of a user's hand in time sequence, and whether or not a gesture has been made is determined by comparing the trace to traces of the hand which are registered in advance.

In addition, a technology in which the direction of a movement of a user's hand is set as an observation signal, and a gesture is recognized based on some rows of the observation signal has also been proposed (for example, refer to Japanese Unexamined Patent Application Publication No. 2007-87089).

SUMMARY

However, in the above-described technology, it was difficult to recognize a gesture by a user with high precision.

For this reason, a gesture which is a recognition target is necessarily a gesture in which traces of a user's hand can be reliably recognized when a user moves a hand largely in a wide range to some extent. Such a large gesture is burdensome for a user, and makes an application program using the gesture recognition, or the like, inconvenient to use.

It is desirable to make a gesture to be recognized with high precision.

According to an embodiment of the present technology, there is provided an image processing device which includes a difference image generation unit which generates a difference image by obtaining a difference between frames of a cutout image which is obtained by cutting out a predetermined region on a photographed image; a feature amount extracting unit which extracts a feature amount from the difference image; and a recognition unit which recognizes a specific movement of an object on the photographed image based on the feature amount which is obtained from the plurality of difference images which are aligned in time sequence.

The recognition unit may be recognize a gesture by a user's hand as a specific movement of the object.

The image processing device may be further provided with a hand detection unit which detects the user's hand from the photographed image; and a cutout region determination unit which determines the predetermined region based on a position of the detected user's hand on the photographed image.

The cutout region determination unit may determine the predetermined region based on the position of the user's hand when the detected user's hand is located in a certain range on the photographed image with respect to the photographed image of a continuous plurality of frames.

The image processing device may be provided with a cutout region determination unit which determines the predetermined region by obtaining a difference between frames in each region on the photographed image.

The predetermined region may be a region which is predetermined on the photographed image.

The image processing device may further include a region setting unit which sets a recognition region in which the plurality of predetermined regions are arranged on the photographed image, and in which the difference image generation unit may be caused to generate the difference image in each of the predetermined regions which is arranged in the recognition region, the feature amount extraction unit may be caused to extract the feature amount from the difference image in each of the predetermined regions, and the recognition unit may recognize a gesture of the user based on the feature amount which is obtained from the plurality of difference images which are aligned in time sequence in each of the predetermined regions.

The image processing device may further include a cutout region determination unit which determines sizes of the respective predetermined regions, and is arranged in the recognition region.

The image processing device may further include a detection unit which detects a part of the user's body from the photographed image, and the region setting unit may be caused to set the recognition region based on a position on the photographed image of the part of the user's body which is detected.

The cutout region determination unit may be caused to determine sizes of the respective predetermined regions based on a size of the part of the user's body which is detected.

The detection unit may be caused to detect the user's face from the photographed image.

The detection unit may be caused to detect the user's hand from the photographed image.

The image processing device further includes a movement determination unit which determines a movement in the recognition region based on a magnitude of a motion vector in the recognition region, and in which the recognition unit may be caused to recognize a gesture of the user according to a determination result by the movement determination unit.

The image processing device may be further provided with a display control unit which causes a display unit to display the user on the photographed image, and an image denoting a position of the predetermined region.

The image processing device may be further provided with a motion processing unit which executes processing corresponding to a recognized gesture when a user's gesture is recognized.

The display control unit may cause the display unit to display the image denoting the predetermined region, and the motion processing unit may execute processing which is determined by the predetermined region in which the user's gesture of is recognized among the plurality of predetermined regions, and the recognized gesture.

The display control unit may cause the display unit to display a fact that gesture recognition unit is executed, or the user's gesture has been recognized.

The feature amount extraction unit may divide the difference image into a plurality of blocks, and to extract average luminance of pixels in the block as the feature amount of the blocks.

According to another embodiment of the present technology, there is provided an image processing method, or a program which includes generating a difference image by obtaining a difference between frames of a cutout image which is obtained by cutting out a predetermined region on a photographed image; extracting a feature amount from the difference image; and recognizing a specific movement of an object on the photographed image based on the feature amount which is obtained from the plurality of difference images which are aligned in time sequence.

According to the embodiments of the present technology, a difference image is generated by obtaining a difference between frames of a cutout image which is obtained by cutting out a predetermined region on a photographed image, a feature amount is extracted from the difference image, and a specific movement of an object on the photographed image is recognized based on the feature amount which is obtained from the plurality of difference images which are aligned in time sequence.

According to the embodiments of the present technology, it is possible to recognize a gesture with higher precision.

BRIEF DESCRIPTION OF THE DRAWINGS

FIG. 3 is a flowchart which describes gesture recognition processing.

FIG. 12 is a diagram which illustrates another configuration example of the gesture recognition system.

FIG. 26 is a diagram which illustrates a further another configuration example of the image processing device.

DETAILED DESCRIPTION OF EMBODIMENTS

Hereinafter, embodiments to which the present technology is applied will be described with reference to drawings.

First Embodiment

Summary of Recognizing Gesture

First, a summary of the present technology will be described. The present technology is to recognize a specific movement of an object based on an image which is continuously photographed. More specifically, the present technology is to recognize a predetermined gesture based on a photographed image, for example.

Figure 1:
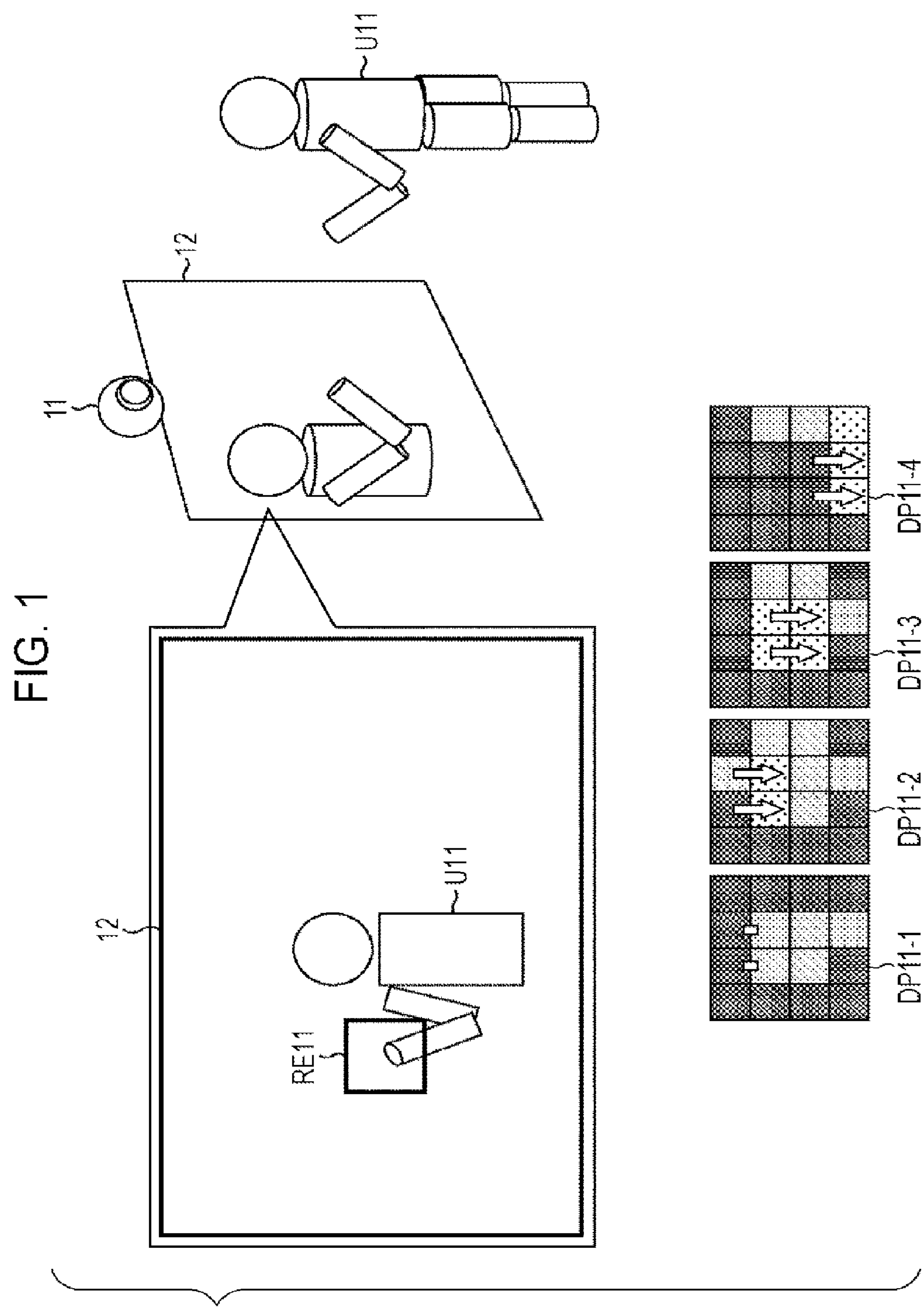
FIG. 1 is a diagram which schematically describes the present technology.

For example, as shown in FIG. 1, a system which performs gesture recognition is provided with a photographing unit 11 which photographs a user U11 who makes a gesture, and a display unit 12 which displays an image of the photographed user U11, or the like.

When the user U11 wants to perform predetermined processing, or the like, the user makes a gesture of instructing the processing or the like toward the photographing unit 11. After that, an image in a predetermined region (hereinafter, also referred to as cutout region) of an image of the user U11 which is photographed by the photographing unit 11 is cut out, and as a result, a difference between frames of the obtained cutout image is obtained.

Here, the cutout region is set, for example, as a region RE11 including a palm of the user U11 on an image as shown on the left in the figure, or the like. Regarding an image in each frame which is photographed by the photographing unit 11, when the region RE11 on the image is cut out, is set as a cutout image, and a difference of the cutout image between neighboring frames is obtained, it is possible to obtain, for example, difference images DP11-1 to DP11-4 which are shown on the lower side in the figure.

These difference images DP11-1 to DP11-4 are images which are obtained when the user U11 makes a gesture of bringing down a palm from a state of making the palm face the direction of the display unit 12, and the density of color in each position denotes a size of difference on the difference images. That is, it denotes that the lower the density of the color, the larger the difference between adjacent images, and the larger the movement of an object on the image.

In addition, in the example, the difference image DP11-1 is a difference image which is obtained in the earliest time, that is, a difference image which is obtained from the oldest frame, and the difference images DP11-1 to DP11-4 are set in order of the earlier time. In addition, hereinafter, when it is not necessary to separate the difference images DP11-1 to DP11-4 from each other, the images are simply referred to as the difference image DP11.

In the example in FIG. 1, since the user U11 makes a gesture of bringing down the palm, a region on the difference image DP11 in which the difference is large also moves downward in the figure, along with a movement of a position of fingertips of the user U11 which moves downward in the figure.

When the difference image DP11 is obtained in this manner, a feature amount is extracted from the difference image DP11, and gesture recognition is performed based on each time obtained, that is, the feature amount of each frame of the difference image DP11. In addition, when a specific gesture is recognized, processing according to the recognition result is performed.

As described above, it is possible to recognize the gesture of a user robustly (high precision) by extracting the feature amount from the difference image DP11, and using the feature amount, not directly using the image which is obtained by photographing a user.

In this manner, it is possible to recognize even a gesture of a small movement such as bringing down a hand, to make a gesture which is made by a user a small, natural movement, and to relieve the burden of a user. When the burden of a gesture with respect to a user is relieved, a user is able to simply operate devices with a small gesture such as a movement of fingers.

The present technology can be applied to various devices, for example, such as a big screen signage, a personal computer, a television receiver, or the like.

For example, when the present technology is applied to the signage, if a user makes a gesture, it is possible to cause the signage to display store guidance or the like according to the gesture, or to display detailed information regarding items which are selected from an entry.

In addition, when the present technology is applied to a personal computer, it is possible to cause the personal computer to execute various processes, for example, a process of reproducing a piece of music by a music player, or the like, or a process of reproducing an image on a picture viewer, or the like, when a user makes a gesture. In this case, an image of a user (gesture by user) can be captured, for example, by a web camera or the like which is provided in the personal computer.

Further, when the present technology is applied to the television receiver, if a user makes a gesture, it is possible to make a channel choice of programs, or to it is select connected equipment such as a recorder which is connected to the television receiver, or the like.

Configuration Example of Image Processing Device

Subsequently, detailed embodiments to which the present technology is applied will be described.

Figure 2:
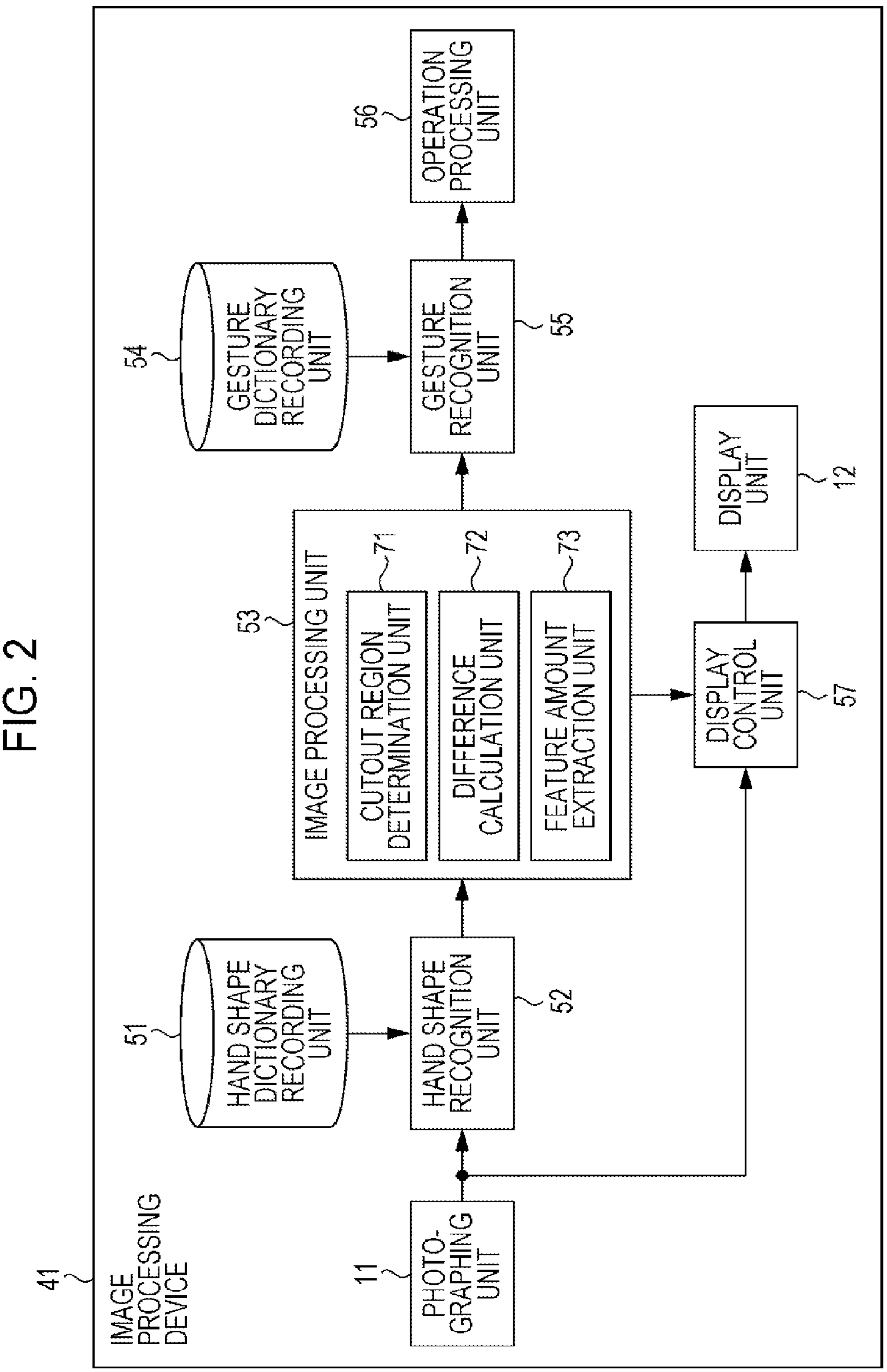
FIG. 2 is a diagram which illustrates a configuration example of an image processing device.

FIG. 2 is a diagram which illustrates a configuration example of an embodiment of an image processing device to which the present technology is applied. In addition, in FIG. 2, portions corresponding to the case in FIG. 1 are given the same reference numerals, and descriptions thereof will be suitably omitted.

An image processing device 41 in FIG. 2 includes a photographing unit 11, a hand shape dictionary recording unit 51, a hand shape recognition unit 52, a gesture recognition unit 55, a motion processing unit 56, a display control unit 57, and a display unit 12.

The photographing unit 11 is configured by a camera, or the like, photographs a user as an object, and supplies a photographed image which is obtained as a result to the hand shape recognition unit 52, and a display control unit 57.

The hand shape dictionary recording unit 51 records a hand shape dictionary for recognizing a hand of a specific shape which is obtained through a statistical learning such as AdaBoost, is predetermined, and supplies the hand shape dictionary to the hand shape recognition unit 52 as necessary. For example, in learning of the hand shape dictionary, a plurality of images for learning including images of hands as recognition targets are used, and a discriminator which is the hand shape dictionary or the like is obtained due to the learning.

The hand shape recognition unit 52 recognizes a specific shape of a hand based on the hand shape dictionary which is supplied from the hand shape dictionary recording unit 51 from a photographed image which is supplied from the photographing unit 11, and supplies the recognized result, and the photographed image to the image processing unit 53.

The image processing unit 53 extracts a feature amount for recognizing a gesture based on the recognition result which is supplied from the hand shape recognition unit 52, and the photographed image, supplies the feature amount to the gesture recognition unit 55, and supplies information of a cutout region, or the like to the display control unit 57 as necessary.

In addition, the image processing unit 53 includes a cutout region determination unit 71, a difference calculation unit 72, and a feature amount extraction unit 73.

The cutout region determination unit 71 determines a cutout region on the photographed image based on a recognition result of a hand shape, cuts out an image in the cutout region from the photographed image, and sets as a cutout image. The difference calculation unit 72 obtains a difference of a cutout image in the neighboring frame, and generates a difference image. The feature amount extraction unit 73 extracts a feature amount for gesture recognition from the difference image.

A gesture dictionary recording unit 54 records a gesture dictionary which is used for recognizing a gesture, and supplies the gesture dictionary which is recorded as necessary to a gesture recognition unit 55. For example, a parameter such as state transition probability, output probability density function, or the like which constructs HMM (Hidden Markov Model) is recorded as the gesture dictionary.

The gesture recognition unit 55 recognizes a gesture based on the gesture dictionary which is supplied from the gesture dictionary recording unit 54, and the feature amount which is supplied from the image processing unit 53, and supplies the recognition result to the operation processing unit 56. The operation processing unit 56 causes each unit of the image processing device 41 to execute processing corresponding to gestures based on the recognition result of the gesture recognition unit 55.

The display control unit 57 causes the display unit 12 to display an image based on photographed image which is supplied from the photographing unit 11, and information on cutout region or the like which is supplied from the image processing unit 53.

Description of Gesture Recognition Processing

Subsequently, gesture recognition processing by the image processing device 41 will be described with reference to the flowchart in FIG. 3.

In step S11, the photographing unit 11 starts photographing of an image to be photographed. That is, the photographing unit 11 photographs a user in the periphery of the photographing unit 11 as an object, and supplies a photographed image in each frame which is obtained as the result to the hand shape recognition unit 52, and the display control unit 57 sequentially.

In addition, the display control unit 57 supplies the photographed image which is supplied from the photographing unit 11 to the display unit 12, and causes the display unit to display the image. Due to this, since a user himself who is photographed as an object is displayed in the display unit 12, the user is able to make a gesture while viewing himself who is displayed in the display unit 12. In addition, here, an example in which a user himself is displayed on the display unit 12 has been described, however, it is not necessary for a user to be displayed in the display unit 12. For example, when a user's hand is detected, it is also preferable to make a user understand a position of his hand by displaying a cursor, or a hand image which denotes a position of a user's hand at a position corresponding to the user's hand in the display unit 12. In addition, when the cutout region is determined particularly based on the position of user's hand, or the like, neither an image of the user himself, nor an image of the position of the user's hand may be displayed in the display unit 12.

In step S12, the hand shape recognition unit 52 starts recognizing of the hand shape.

Specifically, the hand shape recognition unit 52 detects a specific shape of a hand from a photographed image of each frame based on the hand shape dictionary which is recorded in the hand shape dictionary recording unit 51, and the photographed image which is supplied from the photographing unit 11, and supplies the detection result and the photographed image to the image processing unit 53.

For example, when a discriminator is recorded as the hand shape dictionary, the hand shape recognition unit 52 detects the hand with the specific shape from the photographed image by extracting a feature amount from a predetermined region on the photographed image, and substituting the feature amount for the discriminator. By performing such hand shape recognition, a shape, the size, or a position of a hand can be detected. In addition, a hand shape which is a recognition target is set to a hand shape at the time of starting a predetermined gesture, or a general hand shape such as paper, or a rock.

In addition, here, recognizing of a hand shape has been exemplified, however, if it is possible to detect a position of the user's hand, it is not limited to recognizing of the hand shape, and may be any detection method.

In step S13, the image processing unit 53 determines whether or not the hand with the specific shape has been detected from the photographed image based on the result of the hand shape recognition.

In step S13, when it is determined that the hand is not detected, processing returns to step S13, and the above-described processing is repeated.

In contrast to this, in step S14, when it is determined that the hand is not detected in step S13, the image processing unit 53 performs tracking of the position of the hand based on the hand shape recognition result. That is, tracking of the position of the detected hand is performed with respect to frames after the frame at which the hand is newly detected.

In step S15, the image processing unit 53 determines whether or not the hand is in a certain range. For example, a position of the hand which is detected in each frame after the predetermined frame as a reference is in a range of a predetermined size in which the position of the hand in the predetermined frame is set as the center, the hand is determined to be in the certain range.

In step S15, when it is determined that the hand is not in the certain range, processing returns to step S14, and the above-described processing is repeated.

On the other hand, in step S15, when it is determined that the hand is in the certain range, in step S16, the cutout region determination unit 71 determines a cutout region based on a result of the hand shape recognition from the hand shape recognition unit 52.

For example, the cutout region determination unit 71 sets a rectangular region with a predetermined size in which a position of a center of gravity of the hand which is detected on the photographed image is set as the cutout region. Since the size of the hand can be understood to some extent in the hand shape recognition, the size of the cutout region is set to a size in which the detected hand is included.

In addition, since it is possible to recognize a gesture even when the entire region of the hand is not included in the cutout region, the size of the cutout region may not be a size in which the entire region of the hand is necessarily included. In addition, the cutout region may be determined in any way, if the region is determined based on the position of the detected hand.

When the cutout region is determined, the cutout region determination unit 71 generates an image of the cutout region on the photographed image with respect to the photographed image of each frame which is supplied from the hand shape recognition unit 52. Accordingly, a region on the same position as the photographed image of each frame is set as the cutout image.

In addition, more specifically, the cutout region determination unit 71 performs an enlarging process and a reducing process with respect to the generated cutout image as necessary so that the size of the cutout image becomes a predetermined specified size. It is possible to perform the processing of gesture recognition more simply, by making the size of the cutout image be the predetermined size in this manner.

Hereinafter, the gesture recognition is performed using the cutout image which is generated in this manner.

Meanwhile, in a case of performing the gesture recognition, when a user makes a gesture while moving his hand, there is concern that a precision of gesture recognition may decrease due to a change in the background of a portion of the hand in the photographed image, or the like.

Therefore, in the image processing device 41, in order to set only a gesture which is made in a state where a user does not move his hand largely as a gesture recognition target, it is determined whether or not the hand is in the certain range, and the cutout region is determined.

In this case, when the hand is in the certain range, the gesture recognition is started by assuming that the hand has stopped to some extent. In addition, the gesture recognition may be started by determining the cutout region when the movement of the hand is the threshold value or less, or may be started by determining the cutout region when the hand with the specific shape is detected.

When the cutout region is determined as described above, the image processing unit 53 supplies information denoting the position of the determined cutout region to the display control unit 57.

In step S17, the display control unit 57 performs feedback that the gesture recognition is performed based on information which is supplied from the image processing unit 53.

Figure 4:
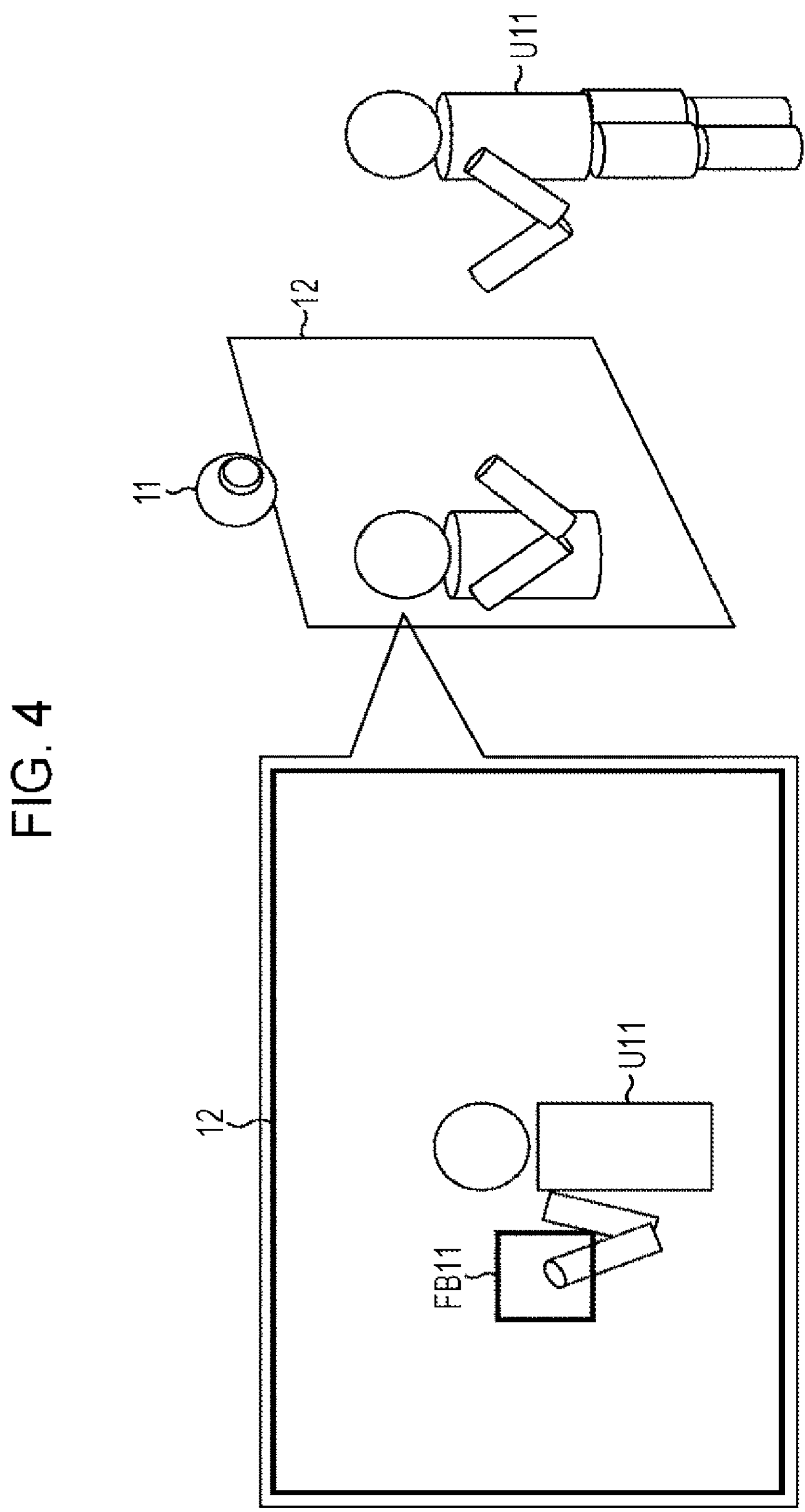
FIG. 4 is a diagram which illustrates a display example of a position of a cutout region.

For example, as shown in FIG. 4, the display control unit 57 performs feedback that the gesture recognition is performed by causing the display unit 12 to display a frame FB11 denoting a cutout region. In addition, in FIG. 4, portions corresponding to the case in FIG. 1 are given the same reference numerals, and descriptions thereof will be omitted.

In the example in FIG. 4, the frame FB11 denoting the cutout region is displayed at a portion of a user U11's hand on the photographed image which is displayed in the display unit 12. In addition, feedback that the gesture recognition is performed may be performed in any way without being limited to the display of the frame FB11.

For example, a mark of a human hand, an arrow icon, or the like may be displayed in the vicinity of the cutout region in the display unit 12. In addition, it is possible to change a display format by making a frame surrounding the detected hand display, by making the frame blink when the gesture recognition is started, or the like, at a point in time when the hand is detected. Further, the feedback that the gesture recognition is performed is not limited to an image display, and may be performed by reproducing a sound.

Returning to descriptions of the flowchart in FIG. 3, when feedback of starting the gesture recognition is performed, processing proceeds to step S18 from step S17 thereafter.

In step S18, the image processing unit 53 resets a timer of a fixation time which fixes the cutout region.

Here, the fixation time means a time in which a position of the cutout region is fixed, and processing of recognizing a gesture is continuously performed using a cutout image which is obtained from the cutout region. That is, when a gesture is not recognized in a fixation time, a new cutout region is determined, and gesture recognition is performed with respect to the cutout region.

When the timer is reset, the image processing unit 53 performs counting of the timer continuously until the fixation time passes.

In step S19, the difference calculation unit 72 obtains a difference between frames of the cutout image, and generates a difference image. For example, a pixel value of a predetermined pixel of the difference image is set as an absolute difference value of a pixel value of a pixel on the cutout image of two continuous frames which is on the same position as the pixel.

In step S20, the feature amount extraction unit 73 extracts a feature amount for gesture recognition from the difference image.

For example, the feature amount extraction unit 73 divides the difference image into blocks with arbitrary sizes, and calculates a mean value of luminance values of a pixel in the block. In addition, the feature amount extraction unit 73 sets a vector having a mean value of luminance values which are obtained in each block as an element as a feature amount which is extracted from the difference image.

A change in luminance occurs at a portion at which a moving object is present in the time direction, and the change in luminance does not occur at a portion at which there is not a movement on the difference image. For this reason, it is possible to detect a shape of the moving object, or a flow of the movement of the moving object in the cutout image by setting the average luminance of each region on the difference image as a feature amount, and by aligning the feature amount in time sequence, and to recognize a gesture from the feature amounts. Here, the shape of the moving object is, for example, a shape of a palm, or a finger, and the flow of the movement of the moving object is, for example, changes in images (change in luminance in each position) in which the hand is brought down due to a gesture.

The feature amount extraction unit 73 supplies a feature amount which is extracted in this manner to the gesture recognition unit 55.

In step S21, the gesture performs the gesture recognition based recognition unit 55 on the feature amount which is supplied from the feature amount extraction unit 73 of the image processing unit 53, and the gesture dictionary which is recorded in the gesture dictionary recording unit 54, and supplies the recognition result to the operation processing unit 56.

For example, the gesture recognition unit 55 normalizes a feature amount which is obtained from a difference image in a section which is formed by a predetermined number of frames which are preset. Specifically, the gesture recognition unit 55 normalizes a feature amount which is obtained from a block at the same position on the difference image among feature amounts which are aligned in time sequence so that the feature amount becomes a value in a range of 0 to 1 by dividing the feature amount by the maximum value of the feature amount which is obtained from a block on the same position.

Further, the gesture recognition unit 55 recognizes whether or not a specific gesture has been made by a user by performing time sequential recognition processing using HMM or the like which is constructed from a parameter as the gesture dictionary based on a time sequential feature amount which is normalized.

In addition, gesture recognition based on the time sequential feature amount may be performed in any way, by comparing the feature amount which is extracted from each difference image which is aligned in time sequence to a time sequential feature amount which is obtained by learning in advance, or the like.

In step S22, the operation processing unit 56 causes each unit of the image processing device 41 to execute processing corresponding to the gesture recognition result which is supplied from the gesture recognition unit 55. In addition, when the gesture is not recognized, none of the processing is performed.

For example, an operation in an application program relating to reproducing a piece of music is caused to be executed by a gesture. In this case, when a gesture of swinging a hand is performed in a state where a user opens the hand, the operation processing unit 56 moves a cursor which selects an album, and causes the cursor to select an album which will be a reproducing target from a plurality of albums with an album formed from a plurality of pieces of music as the processing unit.

In addition, when a user makes a gesture of swinging a forefinger, the operation processing unit 56 moves the cursor which selects a piece of music with the piece of music configuring the album as the processing unit, and causes the cursor to select a piece of music as the reproducing target from among the plurality of pieces of music configuring the album.

In this manner, it is possible for a user to perform a sensitive operation by determining the number of fingers which are used when making a gesture, or positions of the fingers according to a relationship in size of the processing unit such as an album or a piece of music, a folder or a file, or the like.

In addition, it is possible to perform an operation of selecting an icon, or the like, by moving a pointer or the like which is displayed in the display unit 12 using, for example, a gesture.

In such a case, for example, when a user makes a gesture of bringing down a thumb in a state of opening the hand, the operation processing unit 56 causes an operation corresponding to left clicking of a mouse to be executed. In addition, when a user make a gesture of bringing down a forefinger in a state of opening the hand, the operation processing unit 56 causes an operation corresponding to right clicking of the mouse to be executed. In such an example, it is possible to perform an operation using a gesture with the same operation sense as that of an existing device.

In addition to that, when a user makes a gesture of changing the hand shape from paper to rocks, in a case where a file or the like on the display unit 12 is selected, or the user makes a gesture of moving the hand in parallel while maintaining the hand shape of rocks, it is possible to make the selected file or the like be moved, or the like.

In addition, when processing according to the gesture recognition result is performed, the display control unit 57 may cause the display unit 12 to display a fact that gesture recognition has been performed, a display denoting a recognized gesture, or the like. In such a case, the gesture recognition result is also supplied to the display control unit 57 from the gesture recognition unit 55.

In step S23, the image processing unit 53 determines whether or not a new hand is detected outside the cutout region based on the hand shape recognition result from the hand shape recognition unit 52.

In step 23, when it is detected, processing returns is determined that a new hand to step 23, and the above-described processing is repeated. That is, a gesture using a newly detected hand is recognized, and processing according to the gesture is executed.

In contrast to this, when whether or not the new hand is detected is determined in step S23, the image processing unit 53 determines whether or not a fixing time has passed after resetting the timer based on the timer which is counting in step S24.

In step S24, when it is determined that the fixing time has not passed, processing returns to step S19, and the above-described processing is repeated. That is, a section as the processing target up to now, that is, a section as a gesture recognition target is deviated by one frame in the future direction, and the gesture recognition is performed with respect to a section of the new processing target.

In addition, when a gesture is recognized in advance regarding the determined cutout region, and processing corresponding to the gesture is performed, processing may return to step S13 after the processing in step S22.

On the other hand, when it is determined that the fixing time has passed in step S24, processing returns to step S13, and the above-described processing is repeated. That is, when a new hand is detected, a cutout region is determined based on a position of the hand, and gesture recognition is performed.

In addition, when an instruction of ending the gesture recognition is delivered from a user, the gesture recognition processing is completed.

As described above, the image processing device 41 sets a region including at least a part of the user's hand on the photographed image as a cutout region, and extracts a feature amount from the difference image which is acquired by obtaining a difference of an image in the cutout region. In addition, the image processing device 41 recognizes a gesture of a user, and performs processing corresponding to a recognition result, by time sequential recognizing processing based on the feature amounts which are aligned in time sequence.

In this manner, it is possible to recognize a user's gesture with high precision by extracting a feature amount from a difference image, and recognizing the gesture.

Accordingly, a user is able to execute determined processing with respect to each gesture by making a gesture to an extent of a small movement from a wrist to the front such as bringing down, swinging, raising a hand, or the like, without largely moving the hand more than necessary. If the burden to a user is released, it is possible to improve a usability of an application program which is caused to execute processing corresponding to a gesture, or the like.

In particular, in the image processing device 41, it is possible for a user to perform a gesture operation at an arbitrary position, since the cutout region is determined based on a position of a hand which is detected when recognizing the hand shape. That is, a user is able to perform the gesture operation by a natural movement without being conscious of a position of the cutout region, and to further reduce the burden of a user.

Regarding Extraction of Feature Amount

In addition, in the above description, a case has been described in which a difference image is divided into a few blocks, and a mean value of the luminance value of pixels in the block is set as the feature amount in each block, however, dividing of the difference image may be performed in any way.

Figure 5:
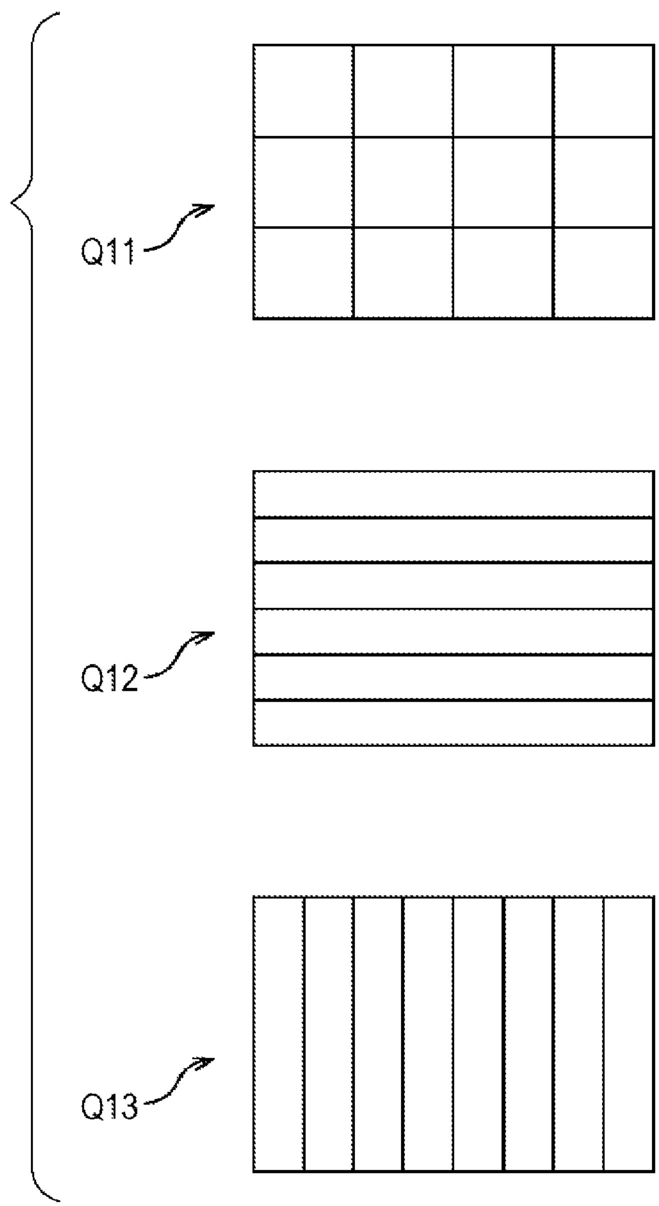
FIG. 5 is a diagram which illustrates an example of dividing blocks of a difference image.

For example, as shown in the arrow Q11 in FIG. 5, the difference image may be divided into 12 blocks in total of 3 in the vertical direction, and 4 in the horizontal direction in the figure. In this case, since obtaining the feature amount by dividing into blocks is equivalent to smoothing the difference image, it is possible to specify a rough shape and a movement state (direction) of the hand as a recognition target, and to recognize the gesture with high precision.

In addition, for example, as shown in the arrow Q12, the difference image may be divided into blocks which are long in the horizontal direction in the figure. In the example, pixel arrays which are aligned in the horizontal direction on the difference image are divided into blocks so as to belong to the same block.

When performing such a block division, it is possible to obtain a feature amount which is specified in the vertical movement in the figure, and when there is a moving object in the vertical direction regardless of the hand shape, it is recognized that a gesture has been made.

Further, as shown in the arrow Q13, the difference image may be divided into blocks which are long in the vertical direction in the figure. In the example, pixel arrays which are aligned in the vertical direction on the difference image are divided into blocks so as to belong to the same block, and when there is a moving object in the horizontal direction regardless of the hand shape, it is recognized that a gesture has been made.

In addition, in the above description, an example in which an average luminance of the blocks on the difference image is set as the feature amount has been described, however, if the feature amount is assumed to be obtained from the difference image, it may be any of an optical flow, a mean value of a specific component of pixels in the block, and the like.

Second Embodiment

Regarding Cutout Region of Gesture Recognition

Further, in the above description, it has been described such that a hand with a specific shape is recognized by performing the hand shape recognition, and the cutout region is determined based on a position of the hand, however, the cutout region may be set as a predetermined position.

Figure 6:
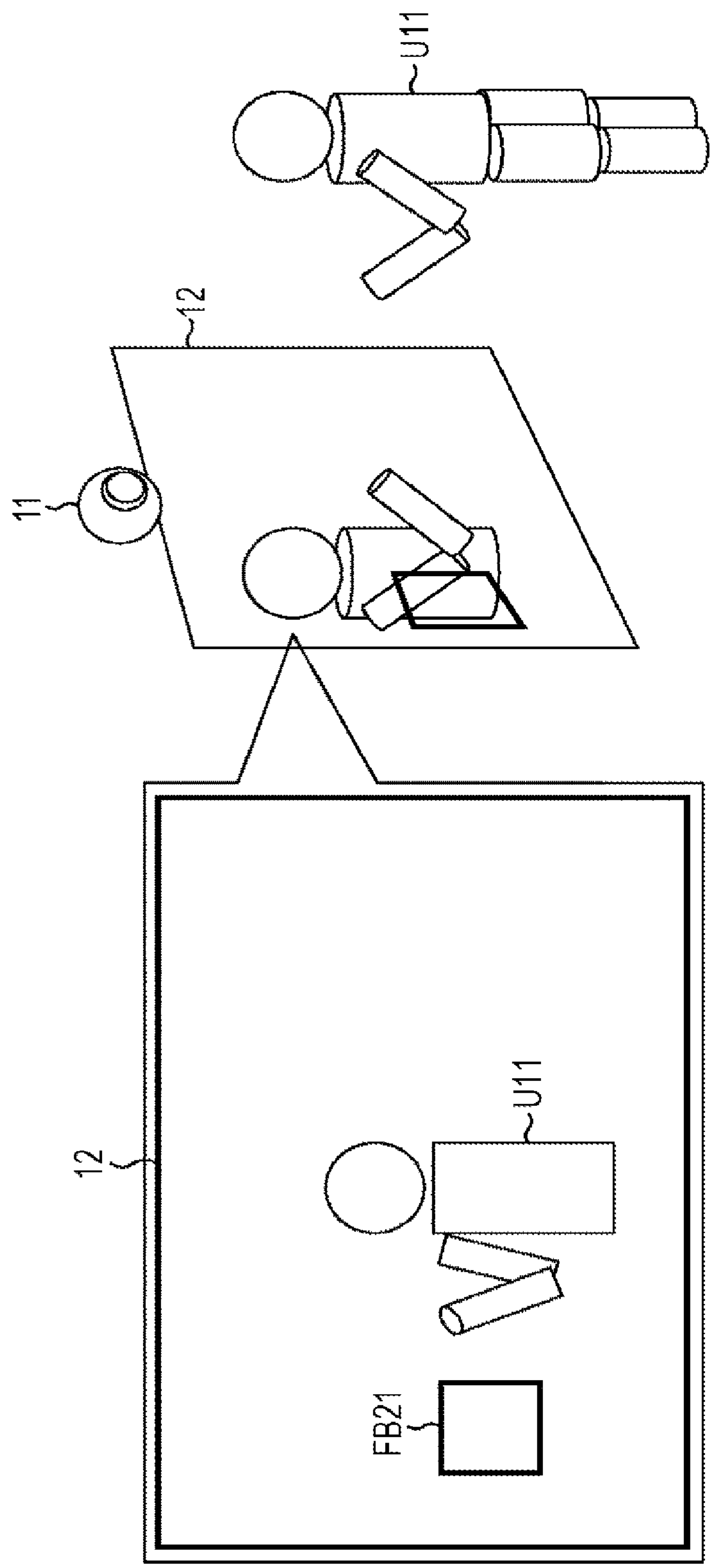
FIG. 6 is a diagram which illustrates a display example of a position of the cutout region.

In such a case, as shown in FIG. 6, for example, the frame FB21 which denotes a position of a cutout region is displayed on a display unit 12. In addition, in FIG. 6, portions which are corresponding to the case in FIG. 1 are given the same reference numerals, and descriptions thereof will be appropriately omitted.

In the example in FIG. 6, not only a user U11, but also the frame FB21 which denotes a position of a predetermined cutout region is displayed on the display unit 12. Accordingly, in the example, the user U11 may make a gesture by moving a hand in the frame FB21 while checking the position of himself which is displayed on the display unit 12 and the frame FB21.

In addition, in this case, one gesture may be allocated, or a plurality of gestures may be allocated to the frame FB21 which is displayed on the display unit 12.

For example, when it is assumed that one gesture GES1 is allocated to the frame FB21, in a case where a user makes the gesture GES1 in the frame FB21, determined processing is performed with respect to the gesture GES1. In contrast to this, even when a user makes a gesture GES2 properly in the frame FB21, none of the processing is executed.

In addition, it is assumed that two gestures of GES1 and GES2 have been allocated with respect to the frame FB21. In this case, when a user makes the gesture GES1 in the frame FB21, processing corresponding to the GES1 is executed, and when a user makes the gesture GES2 in the frame FB21, processing corresponding to the GES2 is executed.

Further, a plurality of frames denoting positions of the cutout regions on the display unit 12 may be displayed. In this case, different gestures may be allocated to each of the plurality of frames, and one gesture may be allocated to some of different frames. When the same gesture is allocated to the respective plurality of frames, if a gesture in any of those frames is recognized, processing corresponding to the gesture is performed.

In addition, one gesture may be allocated to one frame in each frame denoting a position of the cutout region which is displayed on the display unit 12, and the plurality of gestures may be allocated thereto.

In addition, hereinafter, a case will be described in which one frame denoting a position of the cutout region is displayed on the display unit 12, and one gesture is allocated to the frame in order to make descriptions easy.

Configuration Example of Image Processing Device

Figure 7:
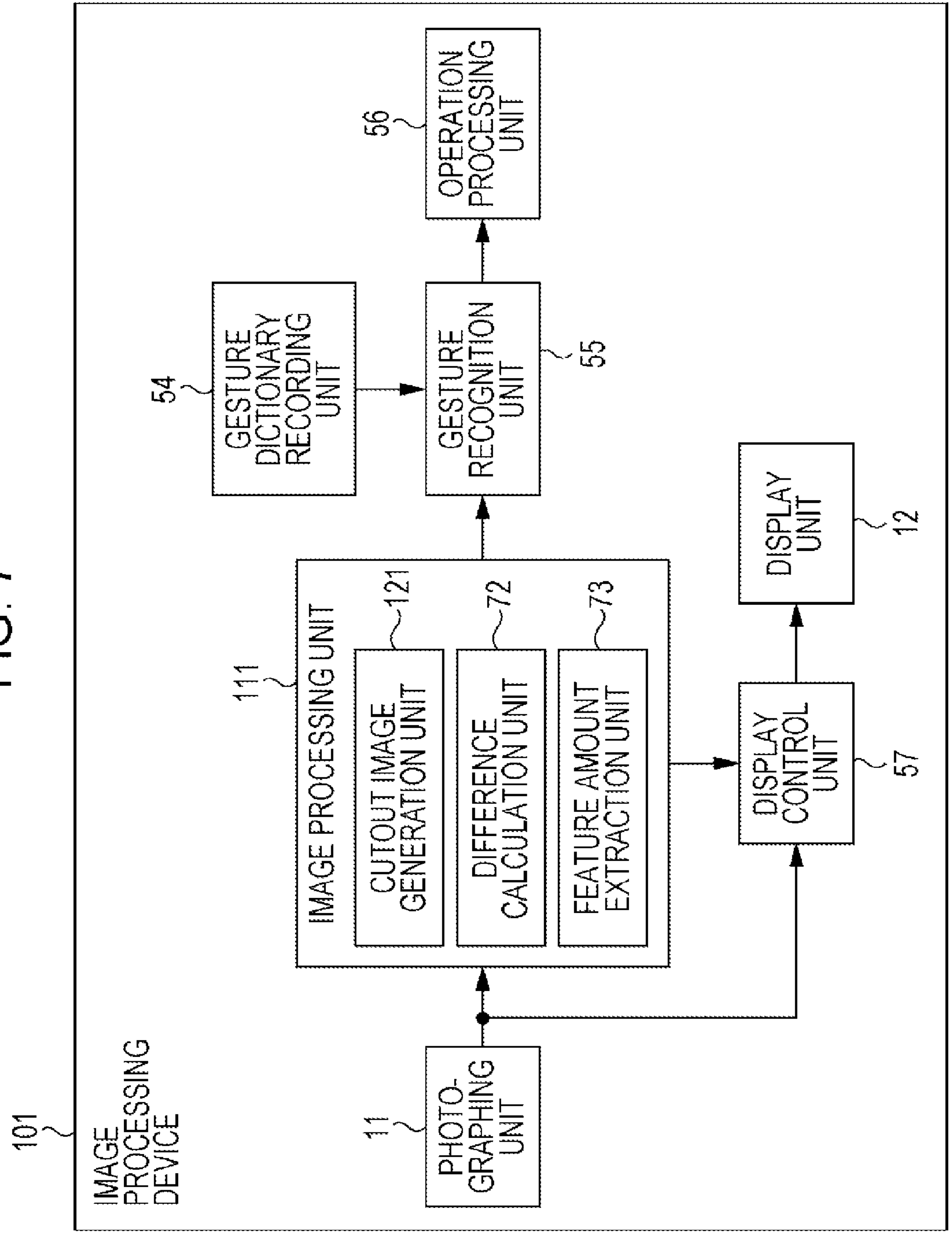
FIG. 7 is a diagram which illustrates a configuration example of another image processing device.

In this manner, when a position of the cutout region is predetermined, the image processing device is configured as shown in FIG. 7, for example. In addition, in FIG. 7, portions corresponding to the case in FIG. 2 will be given the same reference numerals, and descriptions thereof will be omitted.

An image processing device 101 in FIG. 7 is configured by a photographing unit 11, an image processing unit 111, a gesture dictionary recording unit 54, a gesture recognition unit 55, an operation processing unit 56, a display control unit 57, and a display unit 12.

The image processing unit 111 extracts a feature amount for gesture recognition based on a photographed image which is supplied from the photographing unit 11, supplies the feature amount to the gesture recognition unit 55, and supplies information on cutout region or the like to the display control unit 57 as necessary.

The image processing unit 111 includes a cutout image generating unit 121, a difference calculation unit 72, and a feature amount extraction unit 73. The cutout image generating unit 121 sets a predetermined region on the photographed image as a cutout region, and sets a cutout image by cutting out an image in the cutout region of the photographed image.

Descriptions of Gesture Recognition Processing

Figure 8:
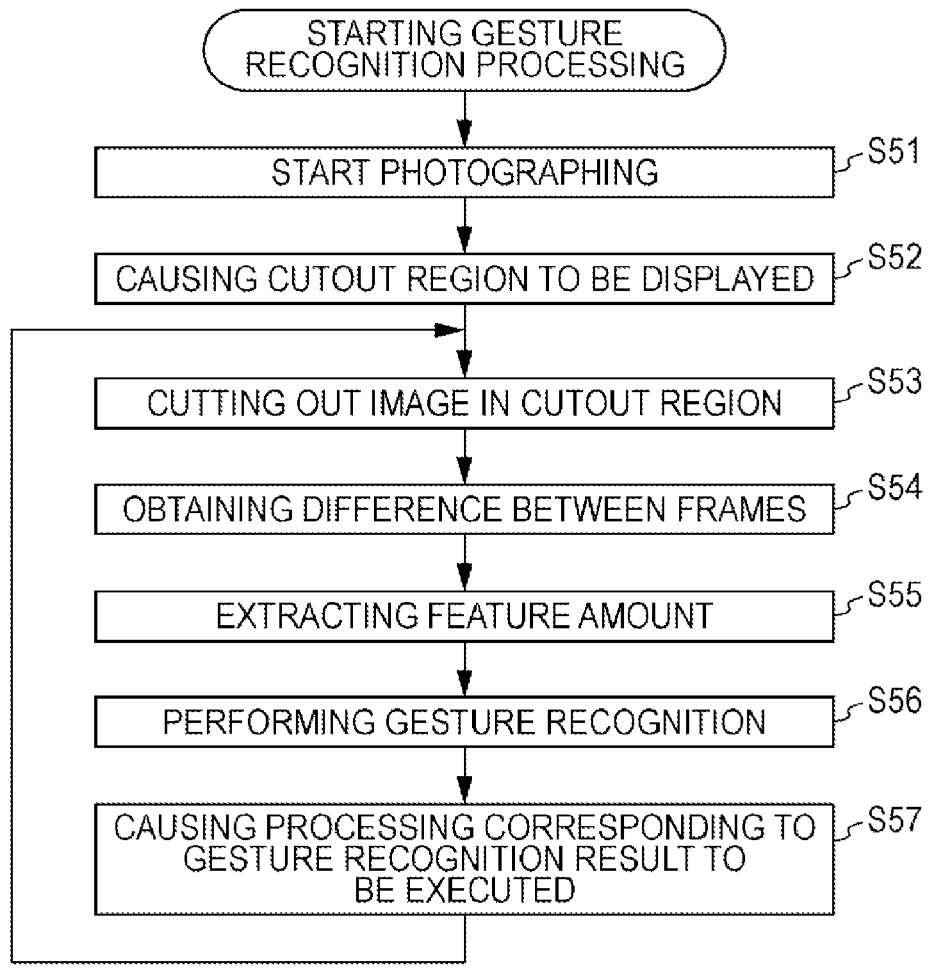
FIG. 8 is a flowchart which describes gesture recognition processing.

Subsequently, gesture recognition processing by the image processing device 101 will be described with reference to the flowchart in FIG. 8.

In step S51, the photographing unit 11 starts photographing of the photographed image.

That is, the photographing unit 11 user in the periphery of the photographing photographs unit 11 as a an object, and sequentially supplies a photographed image of each frame which is obtained as the result to the image processing unit 111 and the display control unit 57.

In addition, the display control unit 57 supplies the photographed image which is supplied from the photographing unit 11 to the display unit 12, and displays the photographed image. The image processing unit 111 supplies information denoting a position of the predetermined cutout region to the display control unit 57.

In step S52, the display control unit 57 displays a frame denoting the position of the cutout region on the display unit 12 based on the information which is supplied from the image processing unit 111. A user makes a desired gesture by moving a hand in the frame while viewing the frame which is displayed on the display unit 12, or his hand.

In step S53, the cutout image generation unit 121 cuts out an image in the predetermined cutout region on the photographed image with respect to the photographed image of each frame which is supplied from the photographing unit 11, and generates a cutout image.

In addition, more specifically, the cutout image generation unit 121 performs an enlarging process, or a reducing process with respect to the generated cutout image as necessary so that the size of the cutout image becomes a predetermined specific size.

In step S54, the difference calculation unit 72 obtains a difference between frames of the cutout image, and generates a difference image.

In addition, in step S55, the feature amount extraction unit 73 extracts a feature amount for gesture recognition based on the difference image, and supplies the feature amount to the gesture recognition unit 55. For example, in step S55, the same processing as that in step S20 in FIG. 3 is performed, and the feature amount is extracted.

In step S56, the gesture recognition unit 55 performs the gesture recognition based on the feature amount which is supplied from the feature amount extraction unit 73, and the gesture dictionary which is recorded in the gesture dictionary recording unit 54, and supplies the recognition result to the operation processing unit 56. In step S56, the same processing as that in step S21 in FIG. 3 is performed.

In step S57, the operation processing unit 56 causes each unit of the image processing device 101 to execute processing corresponding to the gesture recognition result which is supplied from the gesture recognition unit 55, processing returns to step S53, thereafter, and the above-described processing is repeated.

In addition, when the specific gesture is recognized, and processing corresponding to the gesture is executed, feedback that the gesture is recognized may be performed. For example, such feedback may be performed by causing a frame denoting a position of the cutout region which is displayed on the display unit 12 by the display control unit 57 to blink, or to display a predetermined image.

In addition, when a user instructs completing of the gesture recognition, the gesture recognition processing is completed.

As described above, the image processing device 101 generates a difference image by obtaining a difference of an image in the predetermined cutout region on the photographed image, and extracts a feature amount from the difference image. In addition, the image processing device 101 recognizes a user's gesture by a time sequential recognizing processing based on the feature amounts which are aligned in time sequence, and performs processing corresponding to the recognition result.

In this manner, it is possible to recognize the user's gesture with high precision by recognizing the gesture by extracting the feature amount from the difference image.

Figure 9:
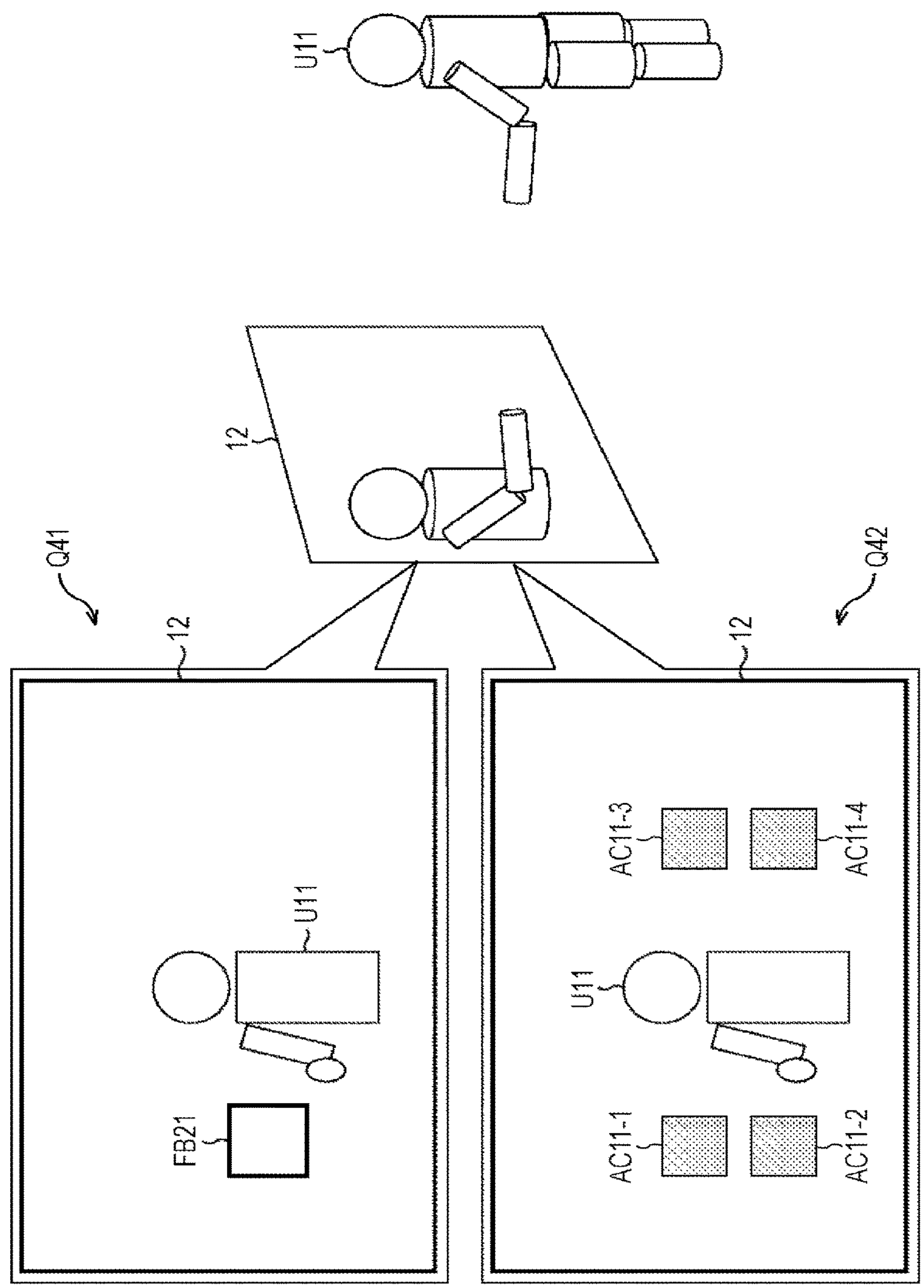
FIG. 9 is a diagram which illustrates a display example of a button icon.

In addition, in the above description, as shown in the arrow Q41 in FIG. 9, it has been described that the user U11 who is photographed as an object, and the frame FB21 denoting the position of the cutout region are displayed on the display unit 12, however, it may be any display, if it is a display in which the position of the cutout region can be understood. In FIG. 9, portions corresponding to the case in FIG. 6 will be given the same reference numerals, and descriptions thereof will be appropriately omitted.

For example, as a display of enabling a user to understand the position of the cutout region, a display which is denoted in the arrow Q42 can be considered.

In the example shown in the arrow Q42, the user U11 who is photographed, and button icons AC11-1 to AC11-4 for executing each processing are displayed on the display unit 12. An image which serves as a reminder of the processing to be executed when being operated, characters describing processes, or the like may be displayed in the button icons AC11-1 to AC11-4.

In addition, hereinafter, when it is not necessary to separate the button icons AC11-1 to AC11-4 from each other, they are also referred to simply as a button icon AC11.

In the example, a position on the photographed image corresponding to a region of each button icon AC11 is set as the predetermined cutout region. Accordingly, when the user U11 moves his hand to a desired region in the button icon AC11, and makes a gesture, the user is able to perform determined processing with respect to the button icon AC11.

At this time, a gesture which is allocated to the button icon AC11 is set to a gesture of, for example, pressing the button icon AC11 such as bringing down a hand, the user U11 is able to perform a more sensitive gesture operation.

In addition, when a position of the cutout region is predetermined, even when the user U11 makes a gesture at a position which is different from the position in the button icon AC11, the gesture is not recognized.

In addition, the gestures which are allocated to each of the button icons AC11 are the same as each other, however, processes which are executed by the gestures may be different in each button icon AC11. Accordingly, in this case, processing which is determined by a position in the button icon AC11 (cutout region), and a recognized gesture is executed.

Regarding Determination on Cutout Region

Further, even in a case where the hand shape recognition is not performed, the cutout region may be determined based on the photographed image.

Figure 10:
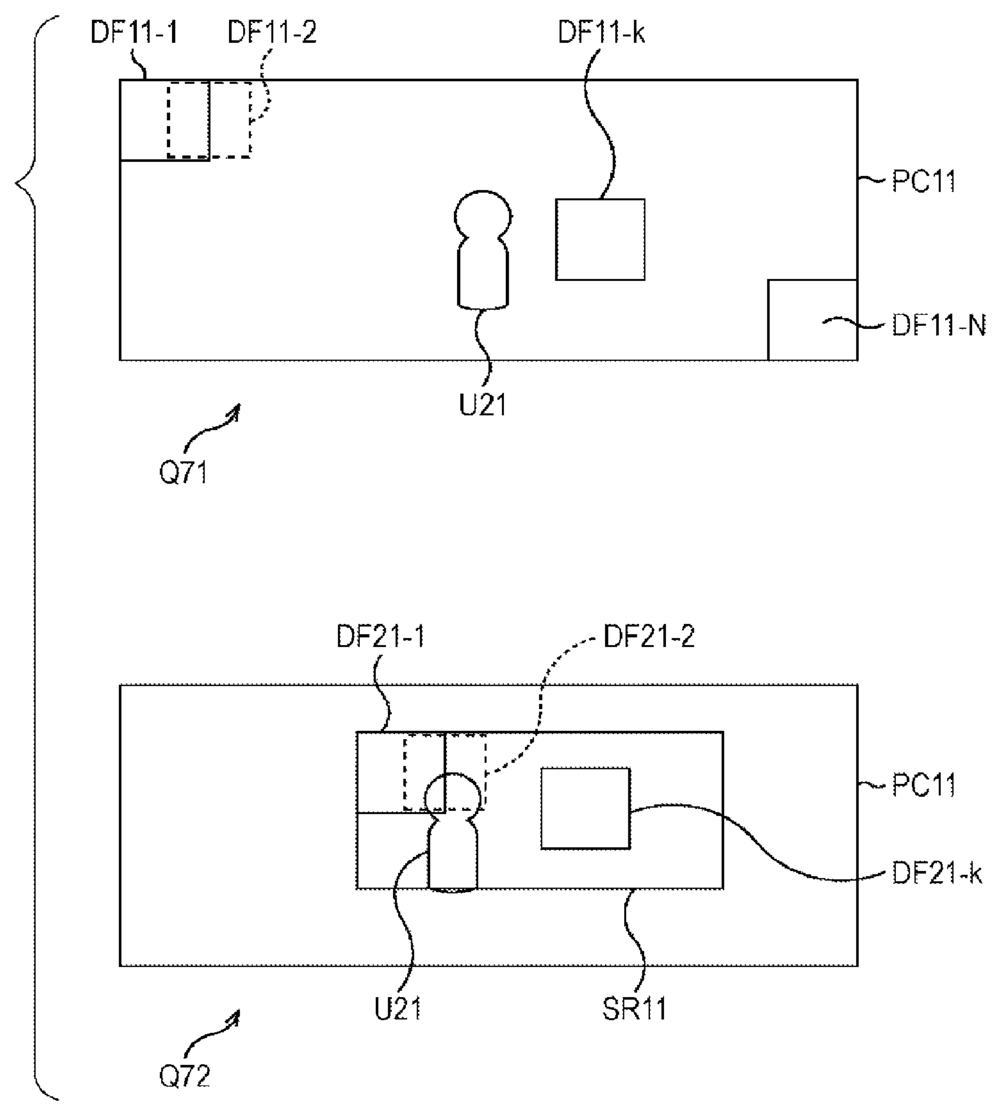
FIG. 10 is a diagram which describes an example of a method of determining the cutout region.

In such a case, for example, as shown in the arrow Q71 in FIG. 10, a difference between frames in each region of the photographed image PC11 which is obtained when a user U21 as an object is photographed is obtained, and a cutout region is determined.

In the example, the cutout image generation unit 121 obtains the sum of absolute difference values of luminance values of pixels between frames in the region with respect to a region as a candidate of the cutout region on the photographed image PC11 of the continuous two frames. At this time, the cutout image generation unit 121 obtains the sum of absolute difference values with respect to each region, while shifting a region as a candidate of the cutout region.

In the example shown in the arrow Q71, each region from the region DF11-1 on the upper left to the region DF11-N on the lower right in the figure of the photographed image PC11 is set as a candidate of the cutout region, and the sum of absolute difference values in those regions is calculated. Here, a region as a candidate of the cutout region is determined so that a part of regions which are close to each other, for example, the region DF11-1 and the region DF11-2 or the like is overlapped.

In addition, the cutout image generation unit 121 sets a region of which the sum of absolute difference values becomes the maximum as the final cutout region, among each of regions. In the example, the region DF11-*k* which is in the vicinity of the user U21 becomes the cutout region.

When the user U21 moves his hand so as to make a gesture, a difference between frames of the photographed image PC11 in a region of the hand becomes large. Therefore, in the example, a region in which the difference on the photographed image PC11 is large becomes the region of a hand of the user U21, and the region becomes the cutout region.

However, in such a case, when there is a difference moving object from the user U21 on the photographed image PC11, there is a possibility that the moving object becomes the cutout region.

Therefore, for example, as shown in the arrow Q72, a region of which a difference between frames of the photographed image PC11 becomes the maximum in the region SR11 in the vicinity of the user U21 may be set as the cutout region.

In this case, first, the cutout image generation unit 121 detects a region of the user U21 based on the photographed image PC11. The detection of the user U21 can be performed by detecting, for example, a person, or a face. Subsequently, the cutout image generation unit 121 determines the region SR11 with a predetermined size including the region of the user U21 based on a detected position of a face of the user U21.

In addition, the cutout image generation unit 121 sets each region from the region DF21-1 on the upper left, to a region of the region SR11 on the lower right in the figure of the region SR11 as a candidate of the cutout region, and calculates the sum of absolute difference values of those regions. Here, a region as a candidate of the cutout region is determined so that a part of regions which are close to each other, for example, the region DF21-1 and the region DF21-2 or the like are overlapped.

Further, the cutout image generation unit 121 sets a region, in which the sum of absolute difference values becomes the maximum among each of the regions, as the final cutout region. In the example, the region DF21-*k* which is in the vicinity of the user U21 becomes the cutout region. In this manner, it is possible to specify a region of a hand of the user with higher precision by making the region in the vicinity of the user U21 as a candidate of the cutout region.

In addition, in the example shown in FIG. 10, it has been described that a region of which the difference is the maximum is set as the cutout region among candidate regions of the cutout region, however, several regions may be set as the cutout region in order of regions of which the difference is large. In addition, one or a plurality of regions which is determined from a position of a face of the user U21 on the photographed image PC11 may be set as the cutout region.

As described above, when the cutout image generation unit 121 determines the cutout region based on the photographed image, it is also possible to cause the display unit 12 to display the frame denoting the position of the cutout region which is determined by the display control unit 57, or the like.

Third Embodiment

Configuration Example of Gesture Recognition System

Further, in the above description, an example has been described in which the entire process from the photographing of the photographed image to the gesture recognition is performed in the image processing device 41, or the image processing device 101, however, a part of those processes may be performed in other devices which is connected through a communication network, or the like.

Figure 11:
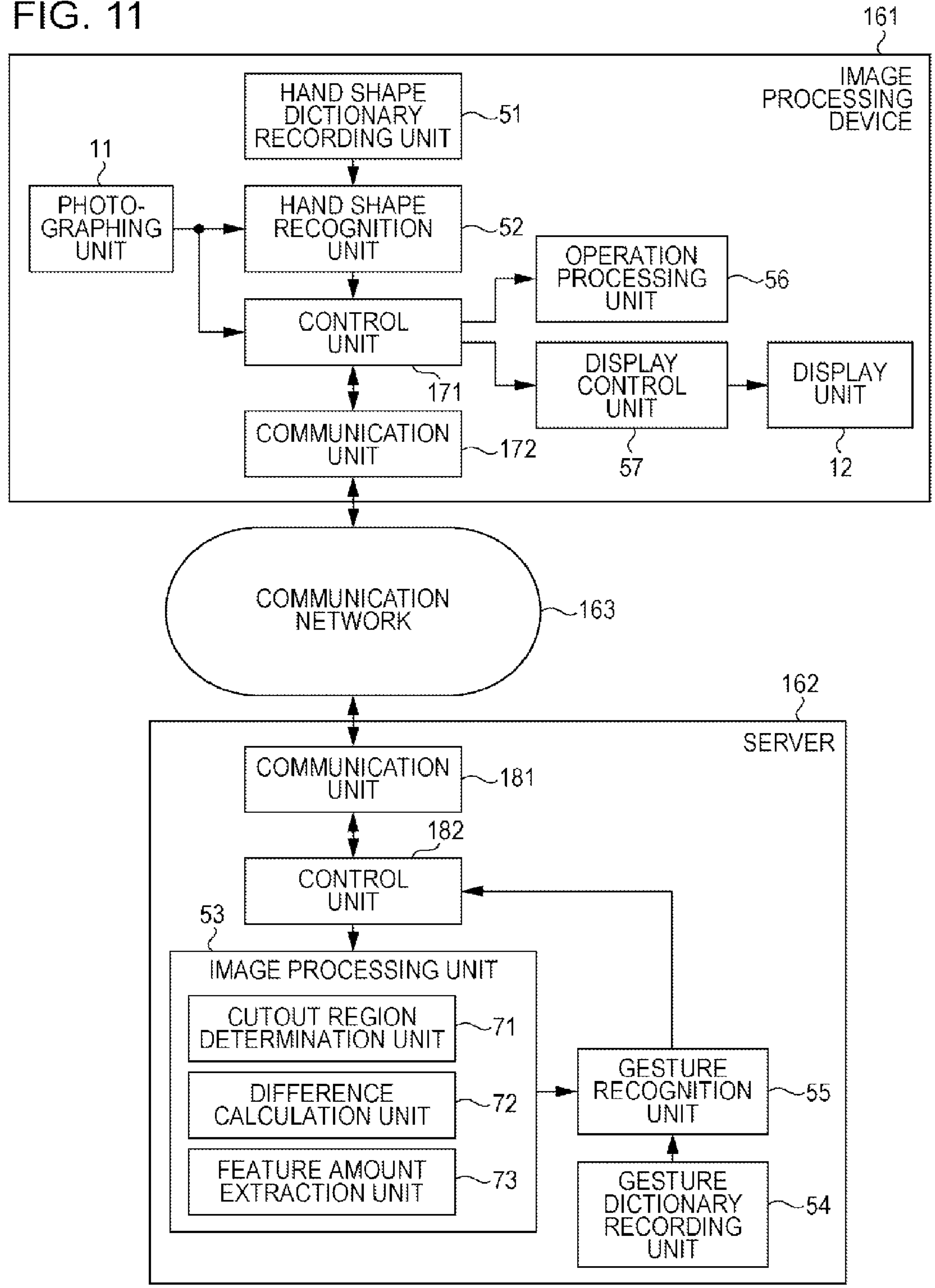
FIG. 11 is a diagram which illustrates a configuration example of a gesture recognition system.

In such a case, a gesture recognition system which performs a gesture recognition by photographing a photographed image is configured, for example, as shown in FIG. 11. In addition, in FIG. 11, the portions corresponding to the case in FIG. 2 are given the same reference numerals, and descriptions thereof will be appropriately omitted.

The gesture recognition system in FIG. 11 is configured by an image processing unit 161, and a server 162. The image processing unit 161 and the server 162 are connected to each other through the communication network 163 which is formed by the Internet.

The image processing device 161 is configured by a photographing unit 11, a hand shape dictionary recording unit 51, a hand shape recognition unit 52, a control unit 171, a communication unit 172, an operation processing unit 56, a display control unit 57, and a display unit 12.

In addition, the server 162 is configured by a communication unit 181, a control unit 182, an image processing unit 53, a gesture dictionary recording unit 54, and a gesture recognition unit 55, and the image processing unit 53 includes a cutout region determination unit 71, a difference calculation unit 72, and a feature amount extraction unit 73.

In such a gesture recognition system, a user performs a desired gesture toward the photographing unit 11 of the image processing device 161.

When the user is photographed as an object, the photographing unit 11 supplies a photographed image which is obtained as the result to the hand shape recognition unit 52, and the control unit 171. The control unit 171 supplies the photographed image from the photographing unit 11 to the display unit 12 through the display control unit 57, and causes the display unit 12 to display the image.

In addition, the hand shape recognition unit 52 recognizes a hand with a specific shape from the photographed image based on the hand shape dictionary which is recorded in the hand shape dictionary recording unit 51, and the photographed image from the photographing unit 11, and supplies the recognition result and the photographed image to the communication unit 172 through the control unit 171.

Subsequently, the communication unit 172 transmits the supplied recognition result and the photographed image to the server 162 through the communication network 163. The recognition result and photographed image are sequentially transmitted to the server 162. In contrast to this, the communication unit 181 of the server 162 receives the recognition result and the photographed image which are transmitted from the communication unit 172, and supplies them to the image processing unit 53 through the control unit 182.

The image processing unit 53 generates a difference image by determining a cutout region based on the supplied recognition result of the hand shape and the photographed image, extracts a feature amount from the obtained difference image, and supplies the feature amount to the gesture recognition unit 55.

At this time, information denoting a position of the cutout region is transmitted to the image processing device 161 from the server 162 as necessary. In addition, when information denoting the position in the cutout region is supplied from the communication unit 172 through the control unit 171, the display control unit 57 causes the display unit 12 to display a frame denoting the position of the cutout region based on the information.

In addition, the gesture recognition unit 55 of the server 162 performs the gesture recognition based on the feature amount from the image processing unit 53, and the gesture dictionary of eh gesture dictionary recording unit 54, and supplies the recognition result to the communication unit 181 through the control unit 182. The communication unit 181 transmits the supplied result of the gesture recognition to the image processing device 161 through the communication network 163.

Subsequently, the communication unit 172 of the image processing device 161 receives the gesture recognition result which is transmitted from the server 162, and supplies to the operation processing unit 56 through the control unit 171. The operation processing unit 56 causes each unit of the image processing device 161 to execute processing corresponding to the supplied gesture recognition result.

In this manner, it is also possible to cause a device which is different from the image processing device 161 (server 162) to execute determining of the cutout region, extracting of the feature amount, the gesture recognition, or the like. In this case, when a processing ability of the image processing device 161 is low, in particular, it is possible to obtain a result of the gesture recognition further rapidly by causing the server 162 with a higher processing ability to share some processes.

Fourth Embodiment

Configuration Example of Gesture Recognition System

Further, a gesture recognition system may also be configured as shown in FIG. 12. In addition, in FIG. 12, portions corresponding to the case in FIG. 11 are given the same reference numerals, and descriptions thereof will be appropriately omitted.

The gesture recognition system in FIG. 12 is configured by an image processing device 201, and a server 202. These image processing device 201, and the server 202 are connected to each other through a communication network 163.

The image processing device 201 is configured by a photographing unit 11, a hand shape dictionary recording unit 51, a hand shape recognition unit 52, an image processing unit 53, a control unit 171, a communication unit 172, an operation processing unit 56, a display control unit 57, and a display unit 12. In addition, the image processing unit 53 includes a cutout region determination unit 71, a difference calculation unit 72, and a feature amount extraction unit 73.

The server 202 is configured by a communication unit 181, a gesture dictionary recording unit 54, and a gesture recognition unit 55.

In such a gesture recognition system, a user performs a desired gesture toward the photographing unit 11 of the image processing device 201.

When the user is photographed as an object, the photographing unit 11 supplies a photographed image which is obtained as the result to the hand shape recognition unit 52, and the control unit 1 71. The control unit 1 71 supplies the photographed image from the photographing unit 11 to the display unit 12 through the display control unit 57, and causes the display unit to display the image.

In addition, the hand shape recognition unit 52 recognizes a hand of a specific shape from the photographed image based on the hand shape dictionary which is recorded in the hand shape dictionary recording unit 51, and the photographed image from the photographing unit 11, and supplies the recognition result and the photographed image to the image processing unit 53.

The image processing unit 53 generates a difference image by determining a cutout region based on the recognition result and the photographed image of a hand shape which is supplied from the hand shape recognition unit 52, extracts a feature amount from the obtained difference image, and supplies the feature amount to the control unit 171. In addition, the control unit 171 supplies the feature amount from the image processing unit 53 to the communication unit 172.

At this time, information denoting a position of the cutout region is supplied to the display control unit 57 from the image processing unit 53 through the control unit 171 as necessary. When the information denoting the position of the cutout region is supplied from the control unit 171, the display control unit 57 causes the display unit 12 to display a frame denoting the position of the cutout region based on the information.

In addition, the communication unit 172 sequentially transmits the feature amount which is supplied from the control unit 171 to the server 202 through the communication network 163.

Subsequently, the communication unit 181 of the server 202 receives the feature amount which is transmitted from the communication unit 172, and supplies the feature amount to the gesture recognition unit 55.

In addition, the gesture recognition unit 55 performs gesture recognition based on the feature amount which is supplied from the communication unit 181, and the gesture dictionary of the gesture dictionary recording unit 54, and supplies the recognition result to the communication unit 181. The communication unit 181 transmits the supplied gesture recognition result to the image processing device 201 through the communication network 163.

Subsequently, the communication unit 172 of the image processing device 201 receives the gesture recognition result which is transmitted from the server 202, and supplies the result to the operation processing unit 56 through the control unit 171. The operation processing unit 56 causes each unit of the image processing device 201 to execute processing corresponding to the supplied gesture recognition result.

In this manner, it is also possible to cause a device which is different from the image processing device 201 (server 202) to execute processing of gesture recognition.

In addition, in the examples in FIGS. 11 and 12, the image processing device 161, or the image processing device 201 may obtain the photographed image from a photographing device which is provided outside, or the display unit 12 may be connected to the image processing device 161, or the image processing device 201. Further, the part of the processes which is performed by the image processing device 101 in FIG. 7 may be performed by an external device, as shown in the example in FIG. 11, or in FIG. 12.

Meanwhile, hitherto, it has been described that the number of cutout regions which is determined on the photographed image is one, however, the number of cutout regions which is determined on the photographed image may be plural.

Fifth Embodiment

Configuration Example of Image Processing Device

Figure 13:
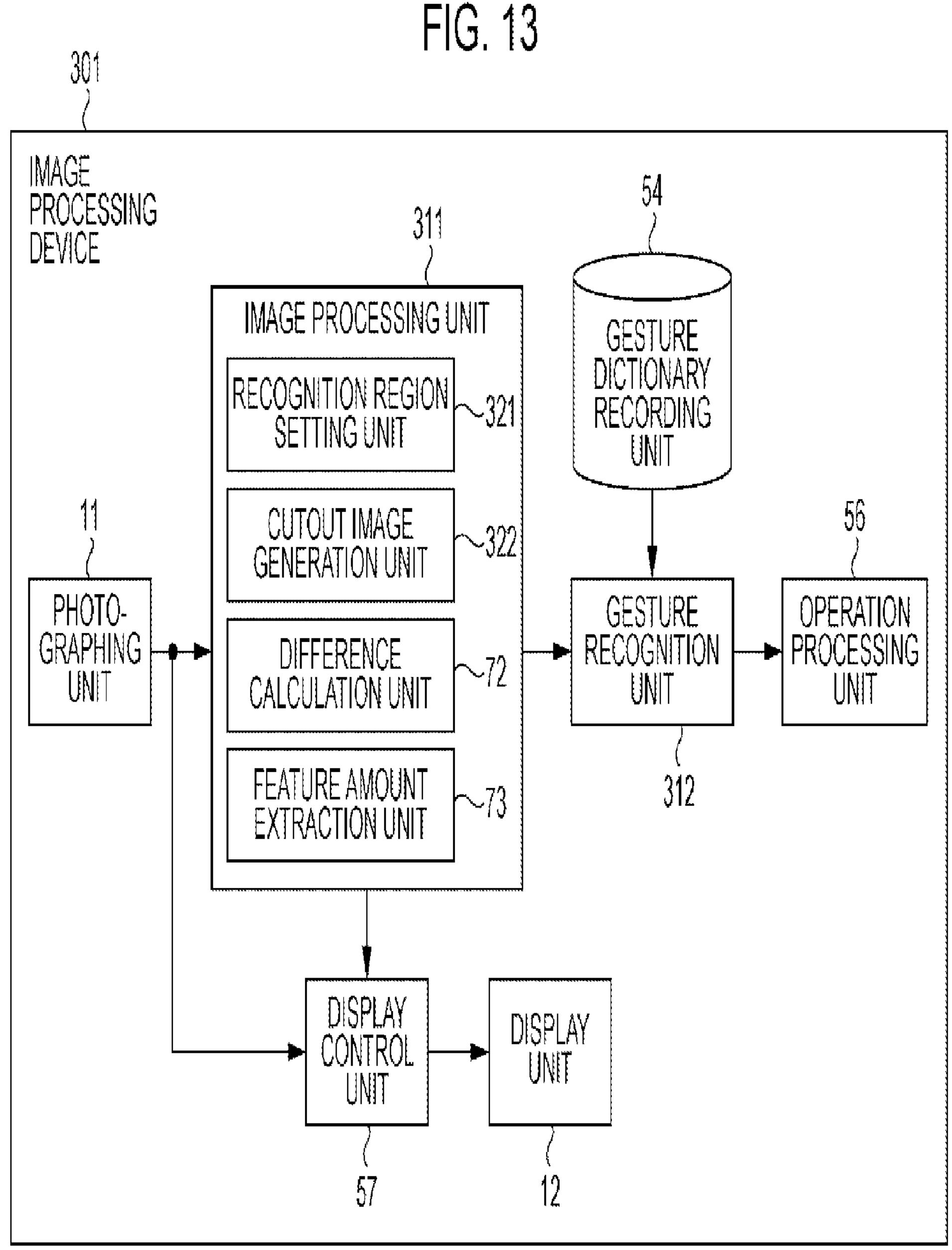
FIG. 13 is a diagram which illustrates a further another configuration example of the image processing device.

In such a case, the image processing device is configured, for example, as illustrated in FIG. 13. In addition, in FIG. 13, the same reference numerals are given to portions corresponding to the case in FIG. 7, and descriptions thereof will be suitably omitted.

An image processing device 301 in FIG. 13 is configured by a photographing unit 11, an image processing unit 311, a gesture dictionary recording unit 54, a gesture recognition unit 312, an operation processing unit 56, a display control unit 57, and a display unit 12.

The image processing unit 311 extracts a feature amount for recognizing a gesture based on a photographed image which is supplied from the photographing unit 11, supplies the feature amount to the gesture recognition unit 312, and supplies information on a cutout region or the like to the display control unit 57 as necessary.

The image processing unit 311 includes a recognition region setting unit 321, a cutout image generation unit 322, a difference calculation unit 72, and a feature amount extraction unit 73. The recognition region setting unit 321 sets a recognition region as a region in which a plurality of cutout regions are arranged on a photographed image. The cutout image generation unit 322 determines the respective sizes of the plurality of cutout regions which are arranged in the recognition region on the photographed image, and arranges the cutout region in the recognition region. In addition, the cutout region generation unit 322 cuts out an image in the cutout region which is arranged on the photographed image, and sets as a cutout image.

The gesture recognition unit 312 performs gesture recognition based on the gesture dictionary which is supplied from the gesture dictionary recording unit 54, and the feature amount in each cutout region which is supplied from the image processing unit 311, and supplies the recognition result to the operation processing unit 56.

Descriptions of Gesture Recognition Processing

Next, the gesture recognition processing by the image processing device 301 will be described with reference to a flowchart in FIG. 14.

In step S111, the photographing unit 11 starts photographing an image to be photographed.

That is, the photographing unit 11 photographs a user in the periphery of the photographing unit 11 as an object, and supplies a photographed image in each frame which is obtained as a result thereof to the image processing unit 311, and the display control unit 57 sequentially.

In addition, the display control unit 57 supplies the photographed image which is supplied from the photographing unit 11 to the display unit 12, and causes the display unit to display the image.

In step S112, the recognition region setting unit 321 sets a recognition region on the photographed image which is supplied from the photographing unit 11. Here, the recognition region setting unit 321 is assumed to set approximately the entire region of the photographed image, specifically, a region excepting for a peripheral portion on the photographed image as a recognition region.

In step S113, the cutout image generation unit 322 determines each size of the plurality of cutout regions which are arranged in the recognition regions which are set by the recognition region setting unit 321, and arranges the cutout region in the recognition region. Here, the cutout image generation unit 322 sets the size of each of the plurality of cutout regions to the same size. In this manner, since a cutout region as a processing target of the gesture recognition is arranged in the recognition region, the recognition region can be regarded as a region in which the gesture recognition is possible. In addition, the image processing unit 311 supplies information which denotes the position of the set recognition region, and information which denotes the respective positions of the determined cutout regions to the display control unit 57.

In step S114, the display control unit 57 causes the display unit 12 to display a frame which denotes the position of the recognition region, or a frame which denotes the position of the cutout region based on information which is supplied from the image processing unit 311.

Figure 15:
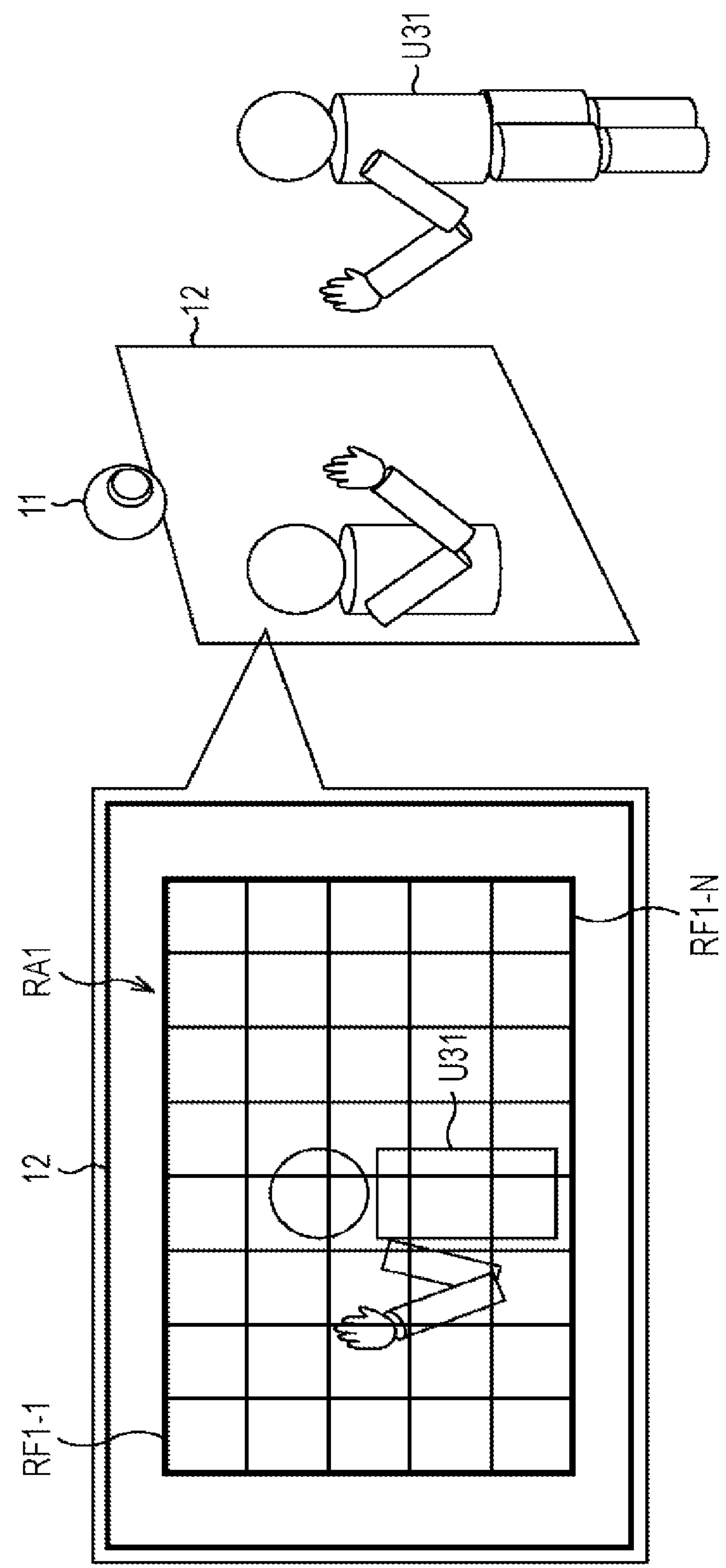
FIG. 15 is diagram which illustrates a display example of a cutout region.

For example, as illustrated in FIG. 15, the display control unit 57 causes the display unit 12 to display frames RF1-1 to RF1-N which denotes the plurality of cutout regions which are arranged in the recognition region RA1 (hereinafter, also referred to as a recognition frame). In addition, in FIG. 15, the same reference numerals are given to portions corresponding to the case in FIG. 1, and descriptions thereof will be omitted. In addition, hereinafter, the cutout regions which are denoted in the recognition frames RF1-1 to RF1-N are also referred to as cutout regions RF1-1 to RF1-N.

In the example in FIG. 15, the recognition frames RF1-1 to RF1-N which denote N cutout regions are displayed in the entire recognition region RA1 including a user U31 on the photographed image which is displayed in the display unit 12. In the example, the respective sizes of the cutout regions are specified sizes which determined in advance, and are sizes which can be spread all over the recognition region RA1 without being overlapped, and without leaving a space.

Figure 16:
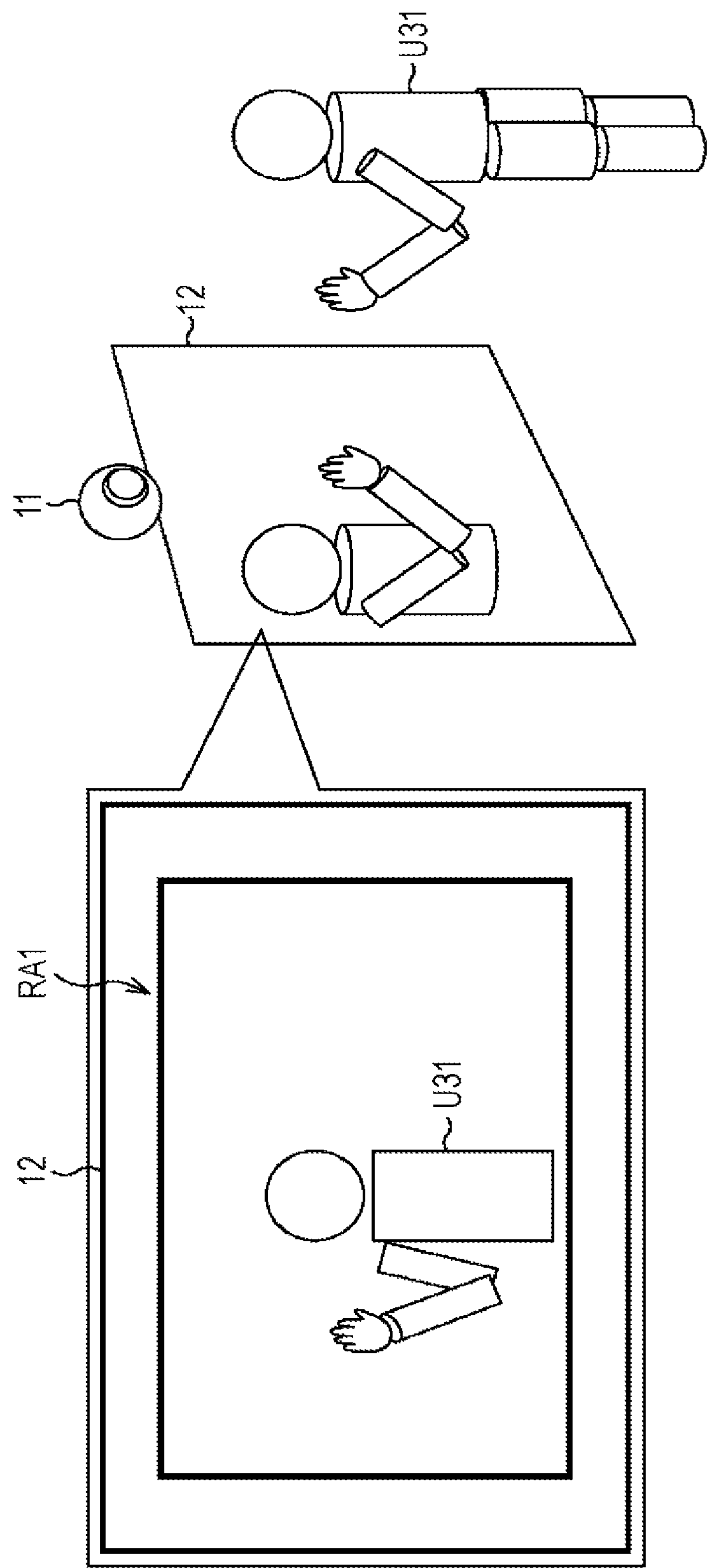
FIG. 16 is a diagram which illustrates a display example of a recognition region.

In addition, as illustrated in FIG. 16, it is also preferable to display only the frame which denotes the recognition region RA1 including the user U31 on the photographed image which is displayed in the display unit 12.

In this manner, a user makes a desired gesture while viewing the frame which is displayed in the display unit 12, or their own hand.

In step S115, the cutout image generation unit 322 cuts out an image in a cutout region which is arranged in a recognition region on a photographed image with respect to a photographed image in each frame which is supplied from the photographing unit 11, and generates a plurality of cutout images.

In step S116, the difference calculation unit 72 obtains a difference between frames of a cutout image in each cutout region, and generates a difference image.

In addition, in step S117, the feature amount extraction unit 73 extracts a feature amount for gesture recognizing based on the difference image in each cutout region, and supplies the feature amount to the gesture recognition unit 312. For example, in step S117, the same processing as that in step S20 in FIG. 3 is performed, and a feature amount in each cutout region is extracted.

In step S118, the gesture recognition unit 312 performs the gesture recognition based on a feature amount which is supplied from the feature amount extraction unit 73, and a gesture dictionary which is recorded in the gesture dictionary recording unit 54, and supplies the recognition result to the operation processing unit 56.

Figure 17:
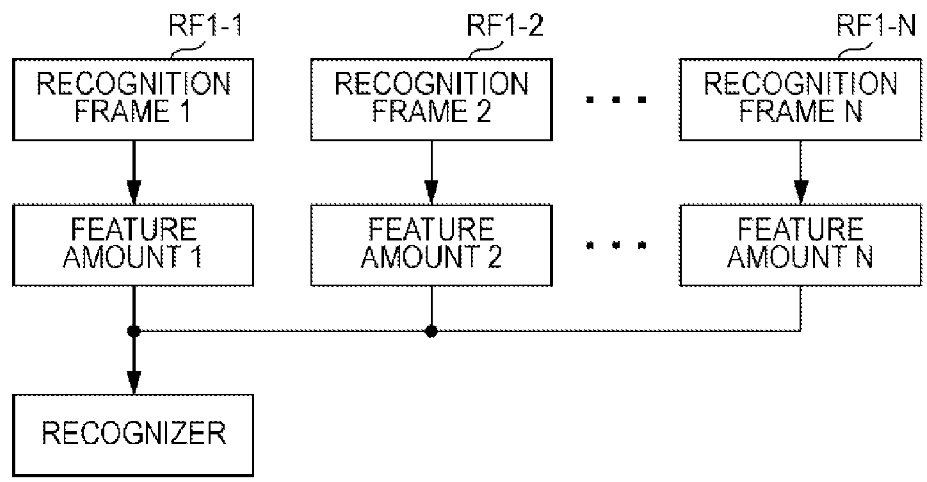
FIG. 17 is a diagram which describes processing of a gesture recognition unit.

In this step S118, as illustrated in FIG. 17, the gesture recognition unit 312 performs the gesture recognition by performing the same recognition processing as that in step S21 in FIG. 3 one by one using one recognizer based on a feature amount which is extracted with respect to the respective cutout regions RF1-1 to RF1-N.

Figure 18:
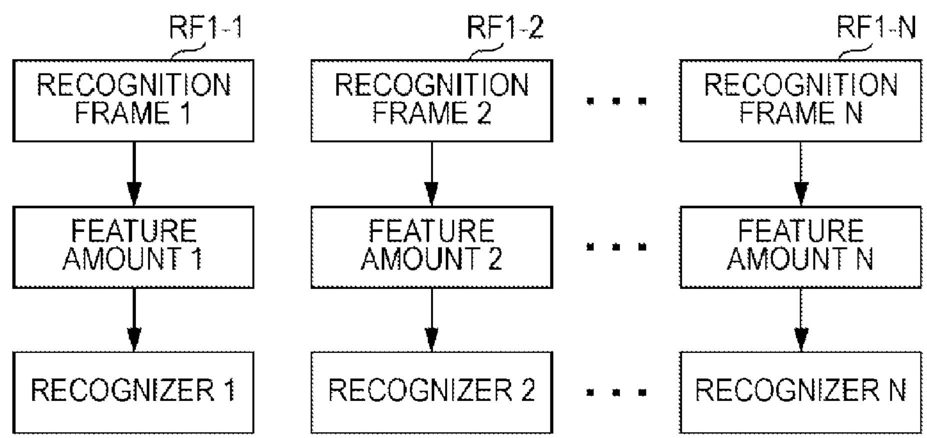
FIG. 18 is a diagram which describes processing of the gesture recognition unit.

In addition, as illustrated in FIG. 18, the gesture recognition unit 312 may perform the gesture recognition by performing the recognition processing in series using N recognizers, based on the feature amount which is extracted with respect to the respective cutout regions RF1-1 to RF1-N.

Further, the gesture recognition unit 312 may perform the gesture recognition by increasing the number of cutout regions as targets of the recognition processing to four, nine, . . . , after performing the recognition processing with respect to one of the cutout regions RF1-1 to RF1-N.

Figure 19:
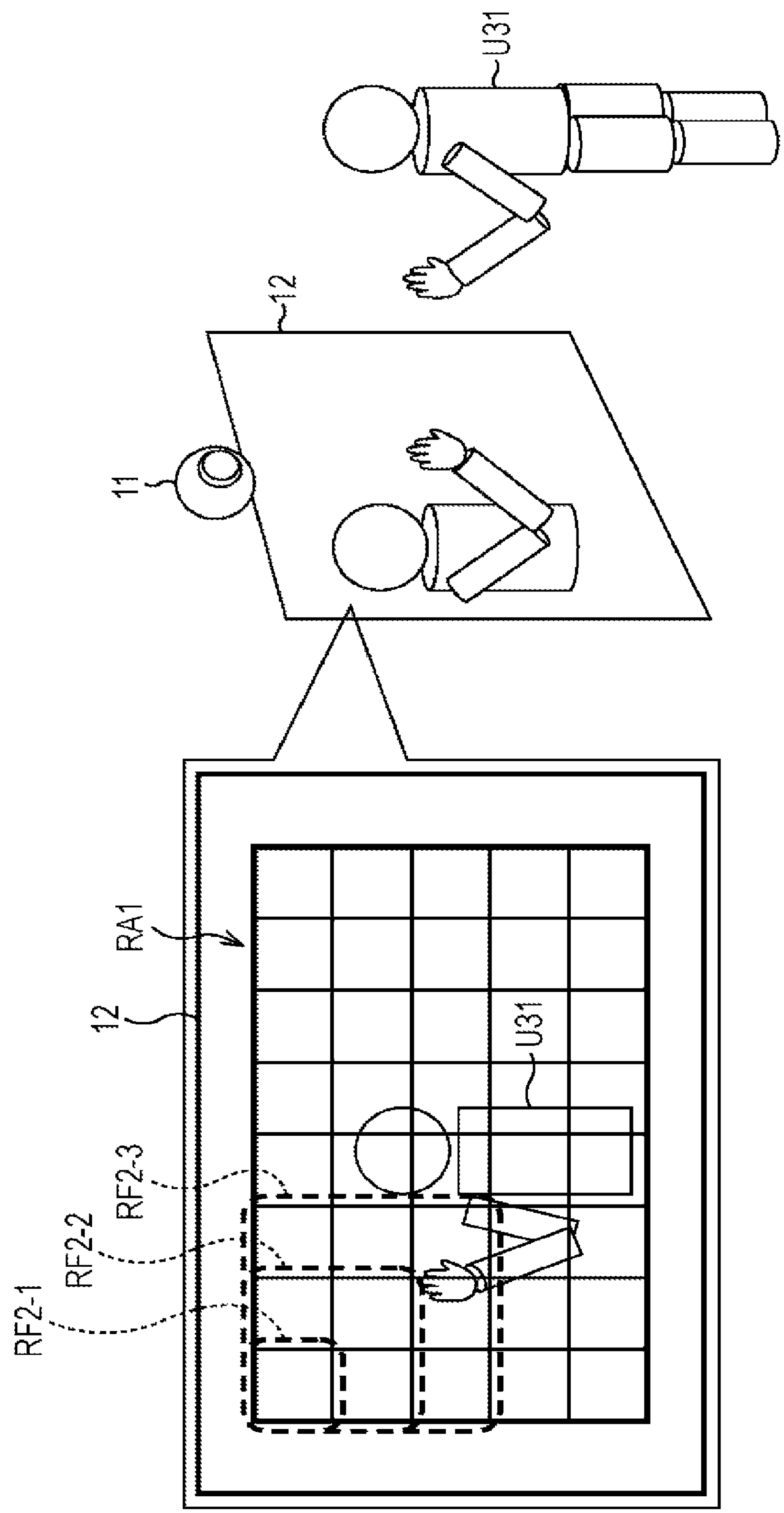
FIG. 19 is a diagram which describes processing of the gesture recognition unit.

Specifically, as illustrated in FIG. 19, the gesture recognition unit 312 performs the recognition processing with respect to a region RF2-2 which is formed by four cutout regions after performing the recognition processing with respect to a region RF2-1 which is formed by one cutout region, first. Subsequently, the gesture recognition unit 312 performs the recognition processing with respect to a region RF2-3 which is formed by nine cutout regions. In this manner, the gesture recognition may be performed by sequentially enlarging regions as the recognition targets.

In addition, when the extracted feature amounts in the predetermined number of cutout regions among the cutout regions RF1-1 to RF1-N become larger than the predetermined value at the same time, the gesture recognition may be performed by performing the recognition processing with respect to the cutout regions.

Further, when the number of cutout regions in which the extracted feature amount is larger than a predetermined value exceeds a predetermined number in a certain time period, the gesture recognition may be performed by performing the recognition processing with respect to the cutout regions.

In addition, in the gesture recognition, the above-described recognition processing may be performed in combination.

In step S119, the operation processing unit 56 causes each unit of the image processing device 301 to perform processing corresponding to the result of the gesture recognition which is supplied from the gesture recognition unit 312.

In addition, when a specified gesture is recognized, and processing is performed corresponding to the gesture, feedback that the gesture is recognized may be performed. For example, such feedback is performed by when the display control unit 57 causes a recognition frame denoting a cutout region which is displayed in the display unit 12 to blink, or a predetermined image to be displayed.

Figure 20:
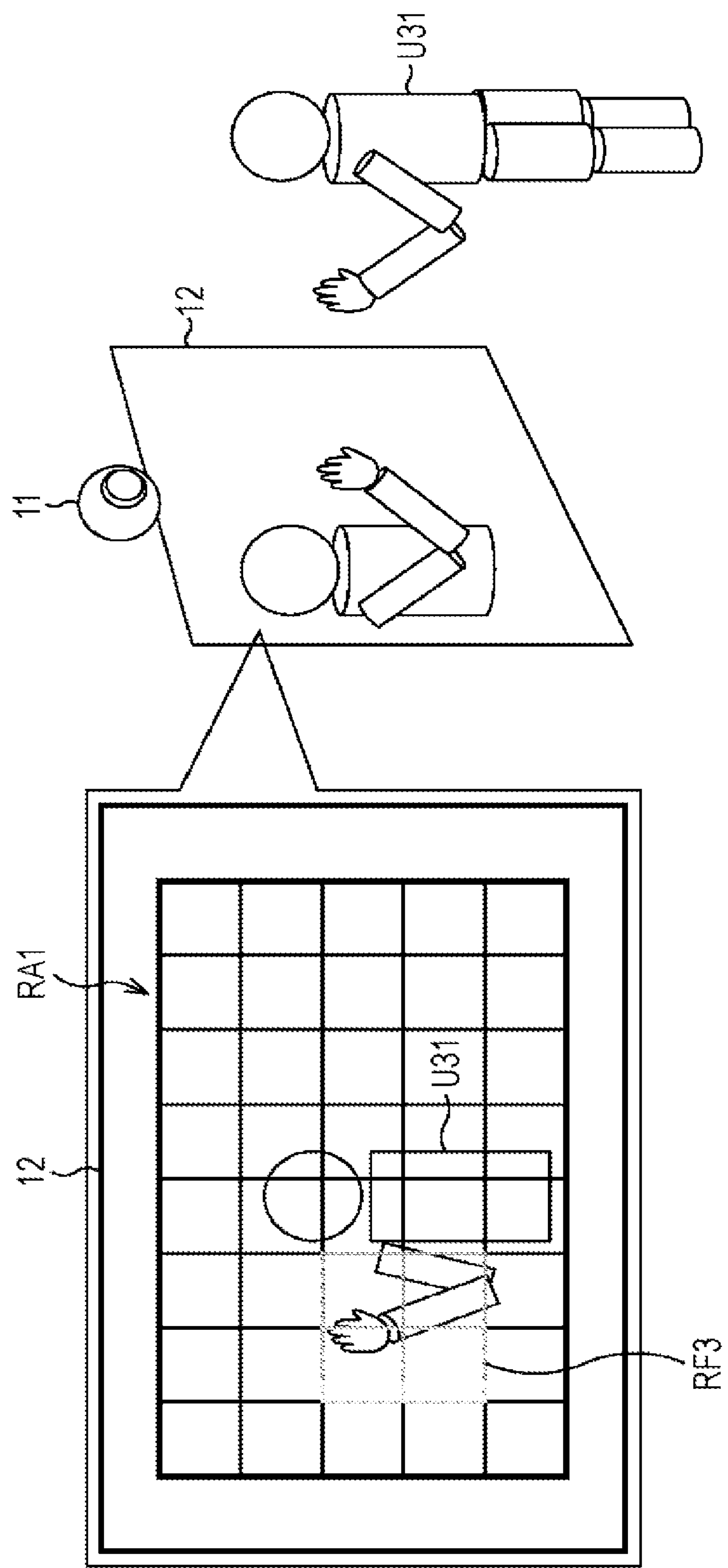
FIG. 20 is a diagram which describes a display example of a processing result of gesture recognition.
Figure 21:
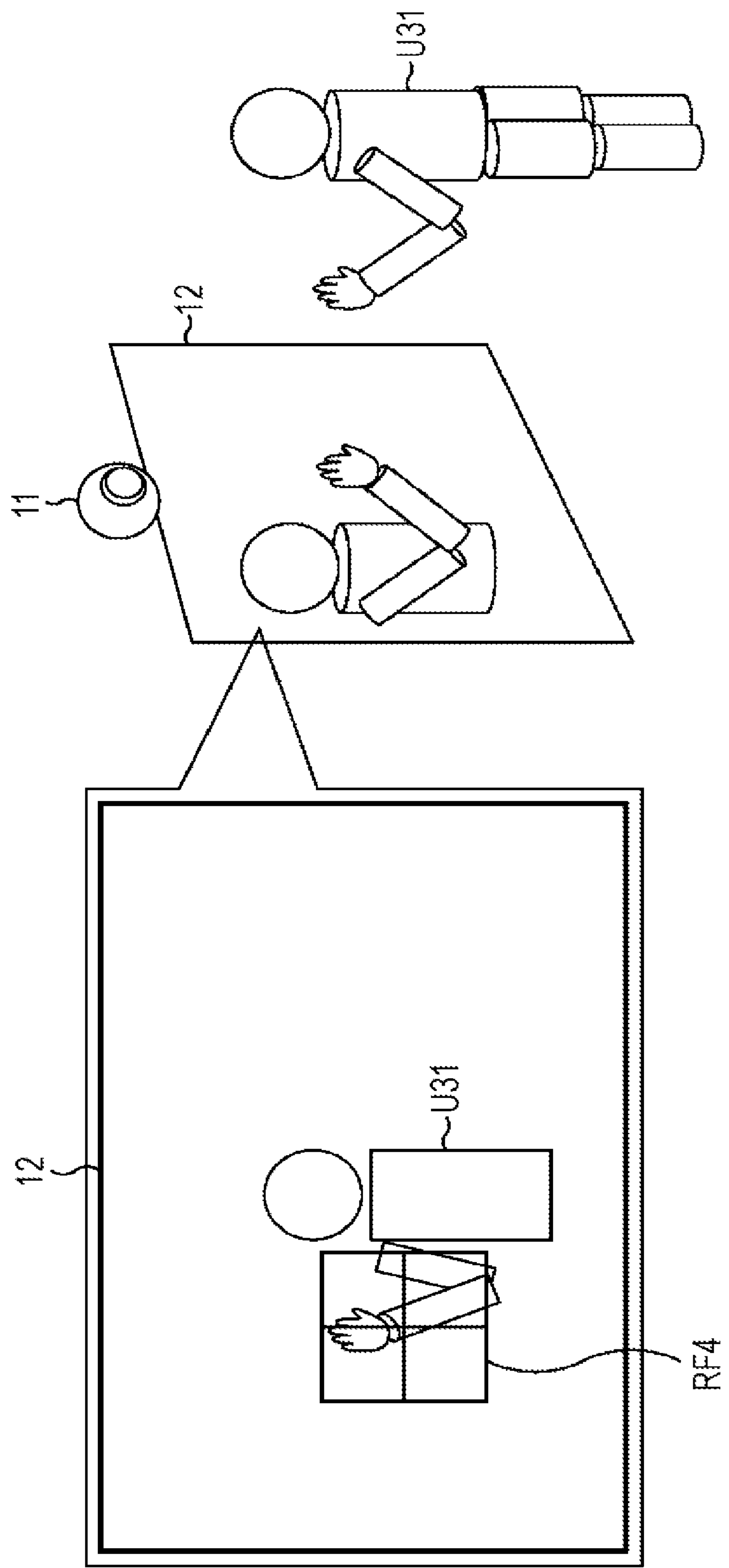
FIG. 21 is a diagram which describes a display example of a processing result of gesture recognition.
Figure 22:
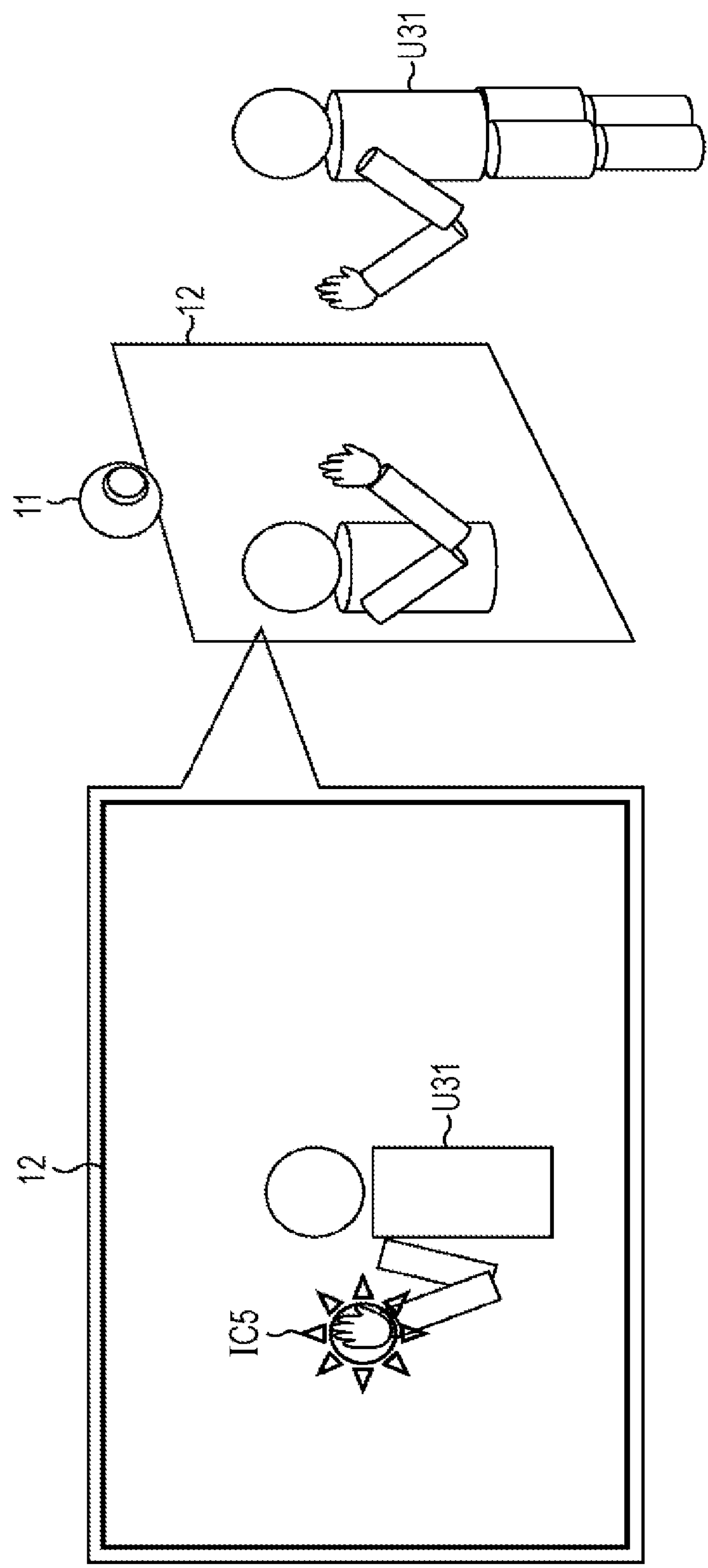
FIG. 22 is a diagram which describes a display example of a processing result of gesture recognition.

Specifically, as illustrated in FIG. 20, color of a frame denoting the region RF3 which is displayed on the display unit 12, and in which the gesture recognition is performed among the cutout regions which are arranged in the recognition region RA1 is displayed by being changed. In addition, as illustrated in FIG. 21, it is also preferable to display only a frame which denotes the region RF4 in which the gesture recognition is performed in a state in which the display unit 12 is not caused to display the cutout region. In addition, as illustrated in FIG. 22, it is also preferable to display a predetermined icon IC5 by overlapping the icon with a portion denoting a region in which the gesture recognition is not performed.

In addition, as feedback that the gesture is recognized, it is also preferable to output a predetermined sound, not a frame or an image which is displayed on the display unit 12.

The process returns to step S115 after step S119, and the above-described processing is repeated. In addition, when a completion of the gesture recognition is instructed by a user, the gesture recognition processing is completed.

As described above, the image processing device 301 arranges the plurality of cutout regions in the recognition region on the photographed image, and a feature amount is extracted from a difference image which is obtained by acquiring a difference between images in each cutout region thereof. In addition, the image processing device 301 recognizes a gesture of a user by performing recognition processes in time sequence based on feature amounts which are aligned in time sequence, and performs processing corresponding to the recognition result.

In this manner, it is possible to recognize a gesture of a user in a wider range by extracting a feature amount from a difference image with respect to a plurality of cutout regions, and performing gesture recognition.

Accordingly, a user is able to perform a gesture operation at an arbitrary position without minding a region in which a gesture such as a movement of flicking a hand from right to left (or from left to right) (hereinafter, referred to as flicking movement) is recognized. That is, a user is able to perform the gesture operation using a natural movement without minding a position of the cutout region, and to improve convenience of an application program or the like in which processing corresponding to a gesture is executed.

In addition, since the gesture recognition is performed in the entire recognition region, there is a possibility that the same movement is recognized as a whole even when a different movement is made locally, accordingly, it is possible to more robustly recognize a gesture, even when there is an individual difference in gesture by a user.

Figure 23:
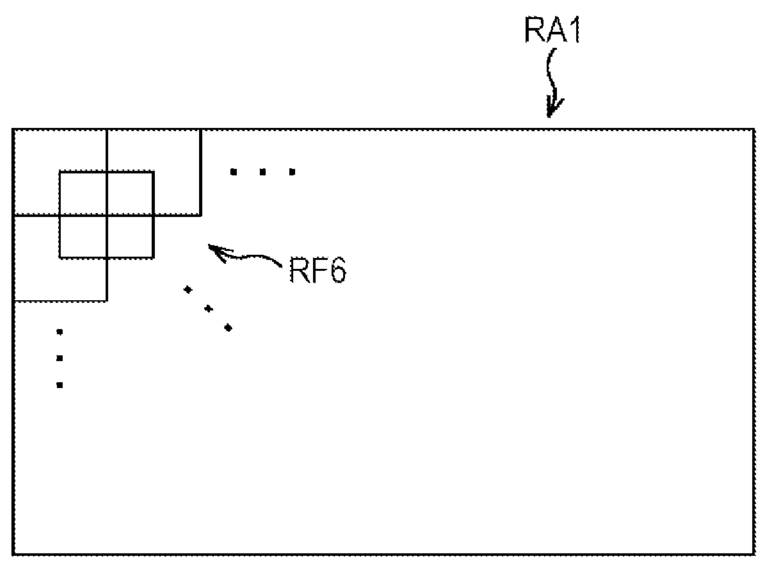
FIG. 23 is a diagram which illustrates a display example of a cutout region.
Figure 24:
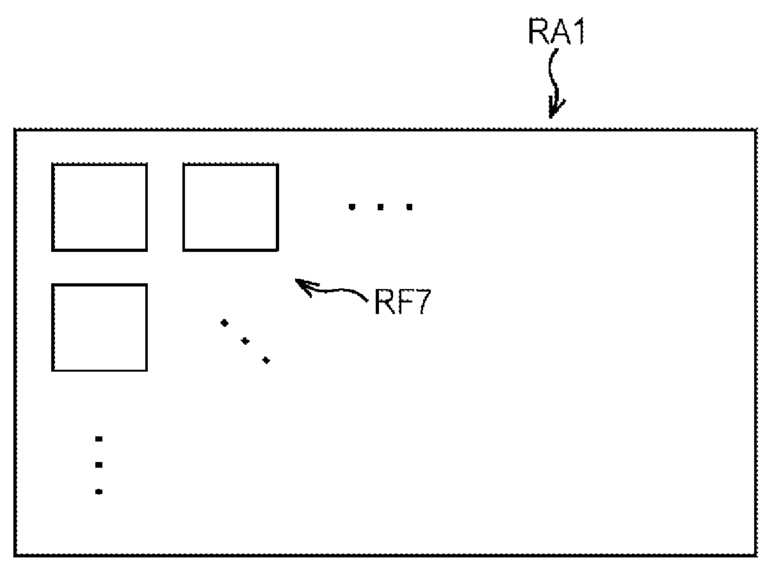
FIG. 24 is a diagram which illustrates a display example of a cutout region.

In addition, as described above with reference to FIG. 15, the cutout region is assumed to be spread in the recognition region without being overlapped, and without leaving a space, however, as illustrated in FIG. 23, the recognition region may be arranged so that the cutout region RF6 is overlapped with the recognition region RA1 therein, and so that the recognition region RF7 is arranged with a predetermined interval in the recognition region RA1 as illustrated in FIG. 24.

Figure 25:
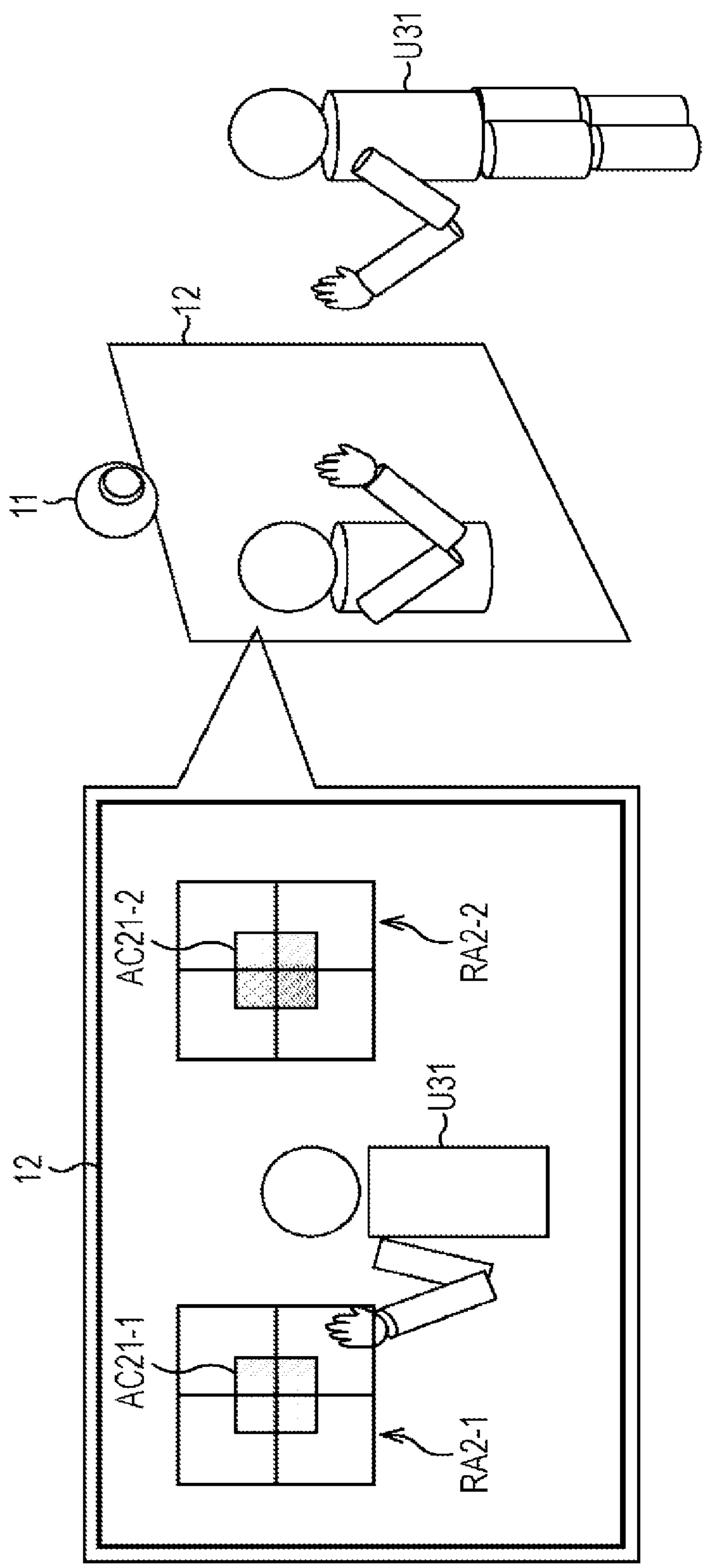
FIG. 25 is a diagram which illustrates a display example of a button icon.

In addition, hitherto, the recognition region in which the plurality of cutout regions are arranged is assumed to be set at a predetermined position, however, as illustrated in FIG. 25, it is also preferable to set a recognition region at a position on a photographed image corresponding to a region of a button icon which is displayed on the display unit 12 which is described in the example of the arrow Q42 in FIG. 9.

In FIG. 25, the photographed user U31, and button icons AC21-1 and AC21-2 for executing each processing are displayed on the display unit 12. Similarly to FIG. 9, it is also preferable to cause an image which reminds of processing which is executed when being operated, or characters which describe processing is displayed in these button icons AC21-1 and AC21-2.

In the example, positions on the photographed image corresponding to regions of each of button icons AC21-1 and AC21-2 are set to recognition regions RA2-1 and RA2-2 in which four cutout regions are arranged. In this case, the user U31 is able to perform determined processing with respect to the button icons AC21-1 and AC21-2 when performing a gesture of moving his own hand to a region in the desired button icon AC21-1, or AC21-2.

In addition, the recognition region may be set at a position which is designated in advance by a provider of a system which performs a gesture recognition, or may be set at a position which is designated in advance, or when being used by a user who uses the system.

Hitherto, the recognition region is assumed to be set at a position which is predetermined, however, the recognition region may be set based on a position as a part of a user's body on the photographed image.

Sixth Embodiment

Configuration Example of Image Processing Device

In such a case, the image processing device is configures as illustrated in FIG. 26, for example. In addition, in FIG. 26, the same reference numerals are given to portions corresponding to the case in FIG. 13, and descriptions thereof will be suitably omitted.

An image processing device 401 in FIG. 26 is configured by a photographing unit 11, a face dictionary recording unit 411, a face detection unit 412, an image processing unit 413, a gesture dictionary recording unit 54, a gesture recognition unit 312, an operation processing unit 56, a display control unit 57, and a display unit 12.

The face dictionary recording unit 411 records a face dictionary which is used when detecting a face which is obtained through a statistical learning such as AdaBoost, and supplies the face dictionary to the face detection unit 412 as necessary. For example, when learning the face dictionary, a plurality of images for learning including an image of a face as a detection target are used, and a recognizer or the like as the face dictionary is obtained due to the learning.

The face detection unit 412 detects a face from a photographed image which is supplied from the photographing unit 11 based on the face dictionary which is supplied from the face dictionary recording unit 411, and supplies the detection result, and the photographed image to the image processing unit 413.

The image processing unit 413 extracts a feature amount for gesture recognition based on the face detection result, and the photographed image which are supplied from the face detection unit 412, supplies the feature amount to the gesture recognition unit 312, and supplies information on a cutout region or the like to the display control unit 57 as necessary.

The image processing unit 413 includes a recognition region setting unit 421, a cutout image generation unit 422, a difference calculation unit 72, and a feature amount extraction unit 73. The recognition region setting unit 421 sets a recognition region based on the face detection result. The cutout image generation unit 422 determines sizes of the respective cutout regions based on the face detection result, and arranges the cutout region in the recognition region. In addition, the cutout image generation unit 422 cuts out an image in the cutout region which is arranged on the photographed image, and sets the image as the cutout image.

Descriptions of Gesture Recognition Processing

Subsequently, gesture recognition processing by the image processing device 401 will be described with reference to a flowchart in FIG. 27.

Figure 14:
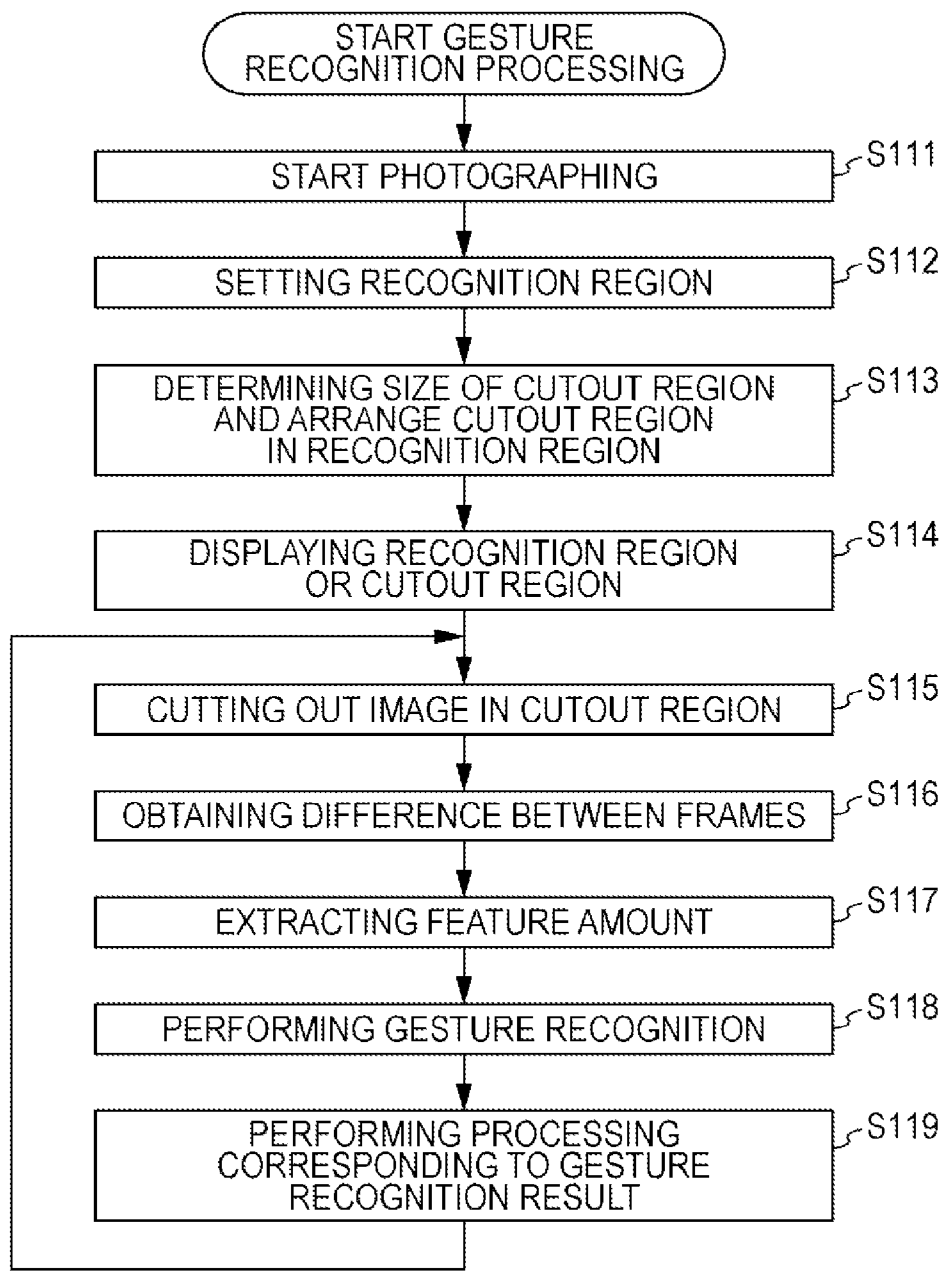
FIG. 14 is a flowchart which describes the gesture recognition processing.
Figure 27:
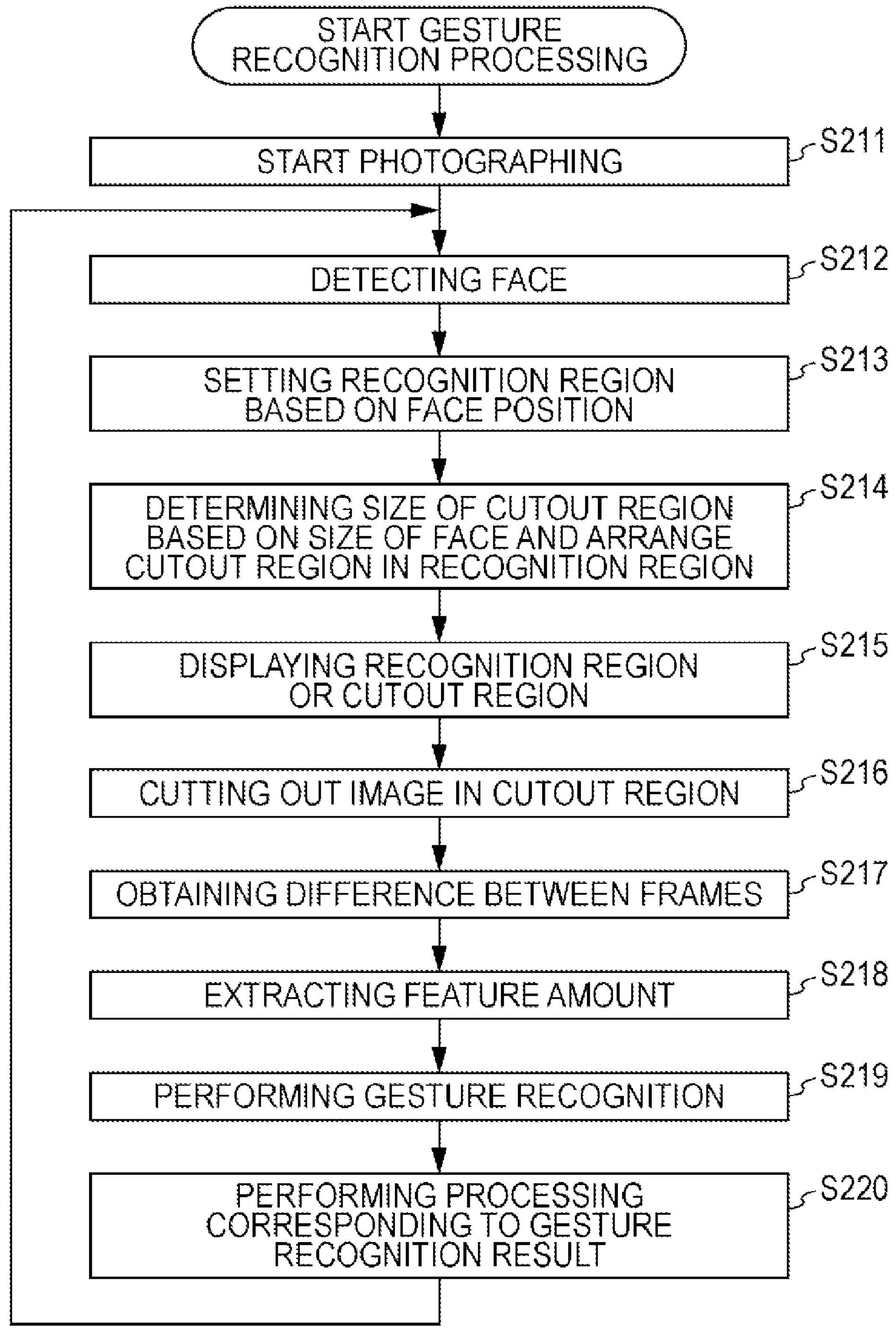
FIG. 27 is a flowchart which describes gesture recognition processing.

In addition, processes in steps S211, and S215 to S220 in the flowchart in FIG. 27 are the same as those in steps S111, and S114 to S119 in FIG. 14, descriptions thereof will be omitted.

That is, in step S212, the face detection unit 412 detects a face.

Specifically, the face detection unit 412 detects a face from a photographed image in each frame based on the face dictionary which is recorded in the face dictionary recording unit 411, and a photographed image which is supplied from the photographing unit 11, and supplies the detection result, and the photographed image to the image processing unit 413.

In step S212, the recognition region setting unit 421 sets a recognition region on a photographed image based on the face detection result which is supplied from the face detection unit 412. Specifically, the recognition region setting unit 421 sets a recognition region based on a position of a face as a part of a user's body which is detected on the photographed image.

Figure 28:
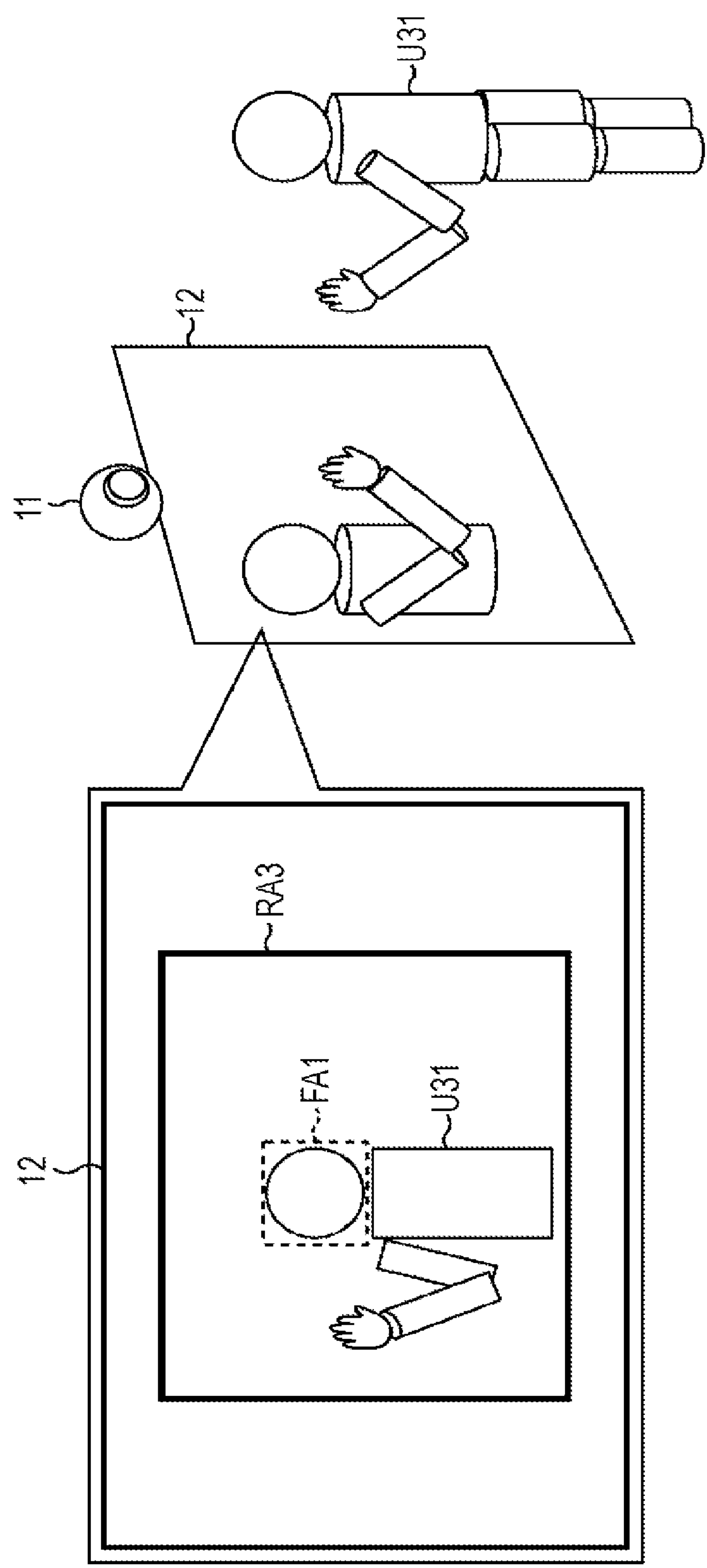
FIG. 28 is a diagram which illustrates an example of a method of setting a recognition region.

For example, as illustrated in FIG. 28, in the photographed image which is displayed on the display unit 12, when a face of the user U31 is detected, a region which is assumed as the movable range of a user's arm is set as the recognition region RA3 based on the position of the detected face region FA1.

In step S213, the cutout image generation unit 422 determines respective sizes of the plurality of cutout regions which are arranged in the recognition region which is set by the recognition region setting unit 421 based on the face detection result which is supplied from the face detection unit 412, and arranges the cutout region in the recognition region. Specifically, the cutout image generation unit 422 determines the size of the cutout region based on the size of a face which is detected on the photographed image, and arranges the cutout region in the recognition region.

Figure 29:
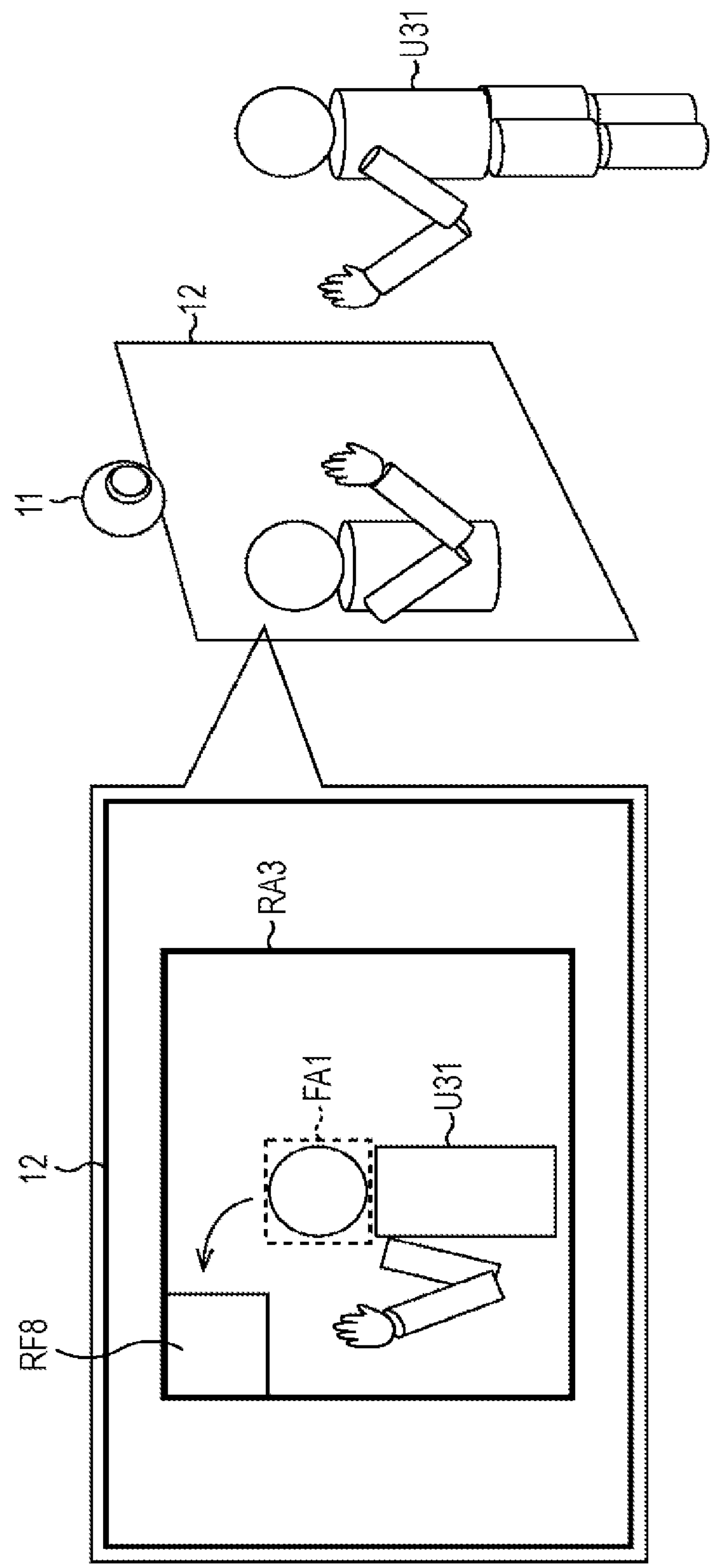
FIG. 29 is a diagram which illustrates an example of a method of determining a cutout region.

For example, as illustrated in FIG. 29, when the face of the user U31 is detected in the photographed image which is displayed on the display unit 12, the size of the cutout region RF8 is determined based on the size of the detected face region FA1, and the cutout region is arranged in the recognition region RA3.

Hereinafter, an image is cut out from the cutout region which is arranged in the recognition region, and a feature amount is extracted from a difference image which is obtained by acquiring a difference in images in each cutout region thereof. In addition, a user's gesture is recognized using recognition processing in time sequence based on the feature amounts which are aligned in time sequence, and processing is performed corresponding to the recognition result thereof.

Even in the above processing, it is possible to recognize a gesture of a user in a wider range by performing gesture recognition by extracting a feature amount from a difference image with respect to the plurality of cutout regions.

Further, since the recognition region is set based on a position of a user's face, recognition processing is not performed with respect to a region which is clearly not a target of the recognition processing, accordingly, it is possible to relieve the burden of processing in gesture recognition.

In addition, even in the above descriptions, the cutout region may be spread in the recognition region without being overlapped, and without leaving a space, may be arranged so as to be overlapped in the recognition region, and may be arranged with a predetermined interval in the recognition region.

In the above descriptions, the recognition region is assumed to be set based on the position of the face as a part of a user's body, however, the recognition region may be set based on the position of a hand as a part of a user's body.

Seventh Embodiment

Configuration Example of Image Processing Device

Figure 30:
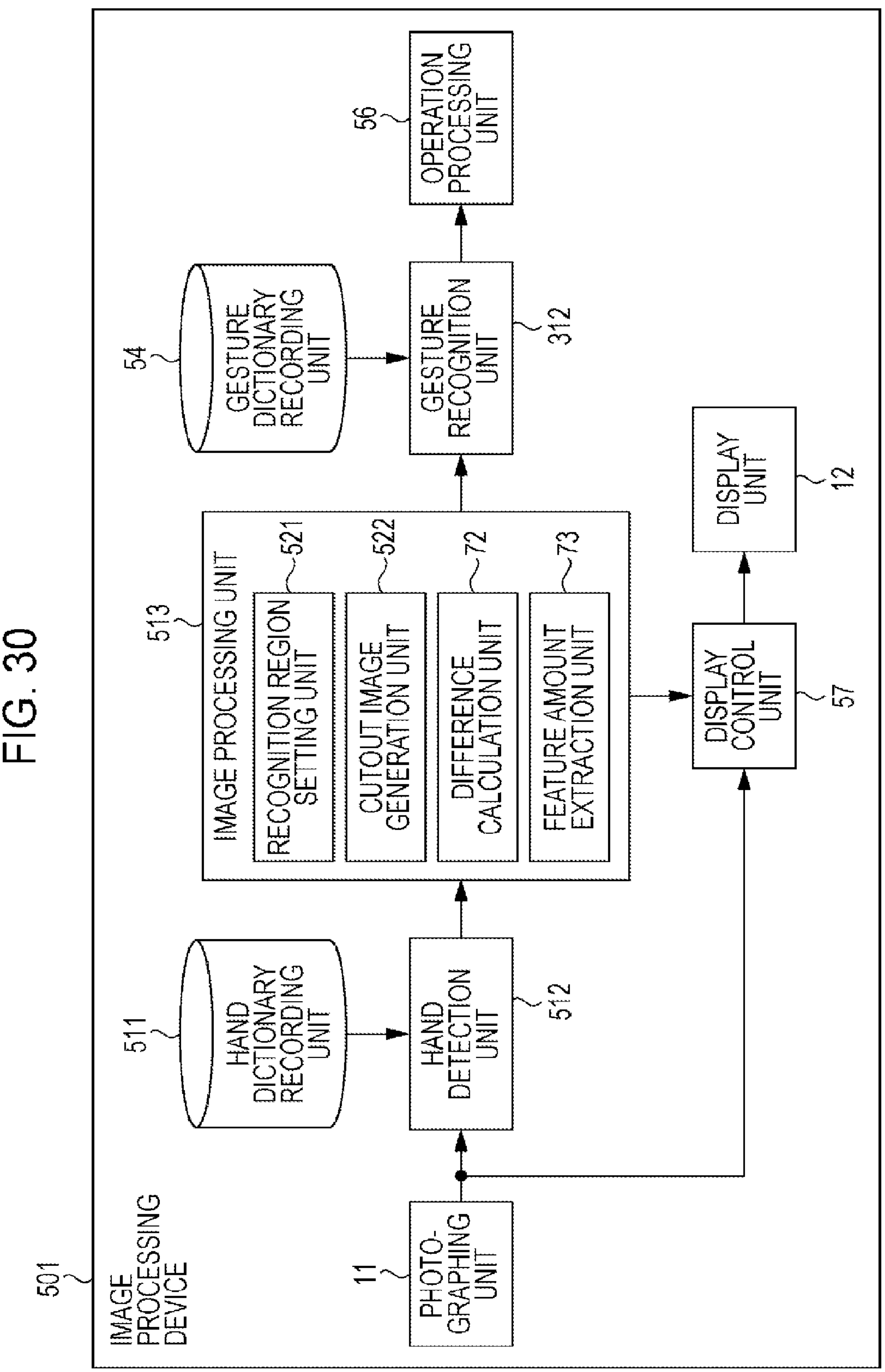
FIG. 30 is a diagram which illustrates a further another configuration example of the image processing device.

In such a case, the image processing device is configured as illustrated in FIG. 30, for example. In addition, in FIG. 30, the same reference numerals are given to portions corresponding to the case in FIG. 13, and descriptions thereof will be suitably omitted.

An image processing device 501 in FIG. 30 is configured by a photographing unit 11, a hand dictionary recording unit 511, a hand detection unit 512, an image processing unit 513, a gesture dictionary recording unit 54, a gesture recognition unit 312, an operation processing unit 56, a display control unit 57, and a display unit 12.

A hand dictionary recording unit 511 records a hand dictionary which is used when detecting a hand which is obtained through a statistical learning such as AdaBoost, and supplies the hand dictionary to the hand detection unit 512 as necessary. For example, when learning the hand dictionary, a plurality of images for learning including an image of a hand as a detection target are used, and a recognizer or the like as the hand dictionary is obtained through the learning.

The hand detection unit 512 detects a hand from a photographed image which is supplied from the photographing unit 11 based on the hand dictionary recording unit 511, and supplies the detection result, and the photographed image to the image processing unit 513.

The image processing unit 513 extracts a feature amount for performing gesture recognition based on the hand detection result which is supplied from the hand detection unit 512, and the photographed image, supplies the feature amount to the gesture recognition unit 312, and supplies information on the cutout region or the like to the display control unit 57 as necessary.

The image processing unit 513 includes a recognition region setting unit 521, a cutout image generation unit 522, a difference calculation unit 72, and a feature amount extraction unit 73. The recognition region setting unit 521 sets a recognition region based on the hand detection result. The cutout image generation unit 522 determines the respective sizes of the cutout regions based on the hand detection result, and arranges the cutout region in the recognition region. In addition, the cutout image generation unit 522 cuts out an image in the cutout region which is arranged on the photographed image, and sets the image as a cutout image.

Descriptions of Gesture Recognition Processing

Subsequently, gesture recognition processing by the image processing device 501 will be described with reference to a flowchart in FIG. 31.

Figure 31:
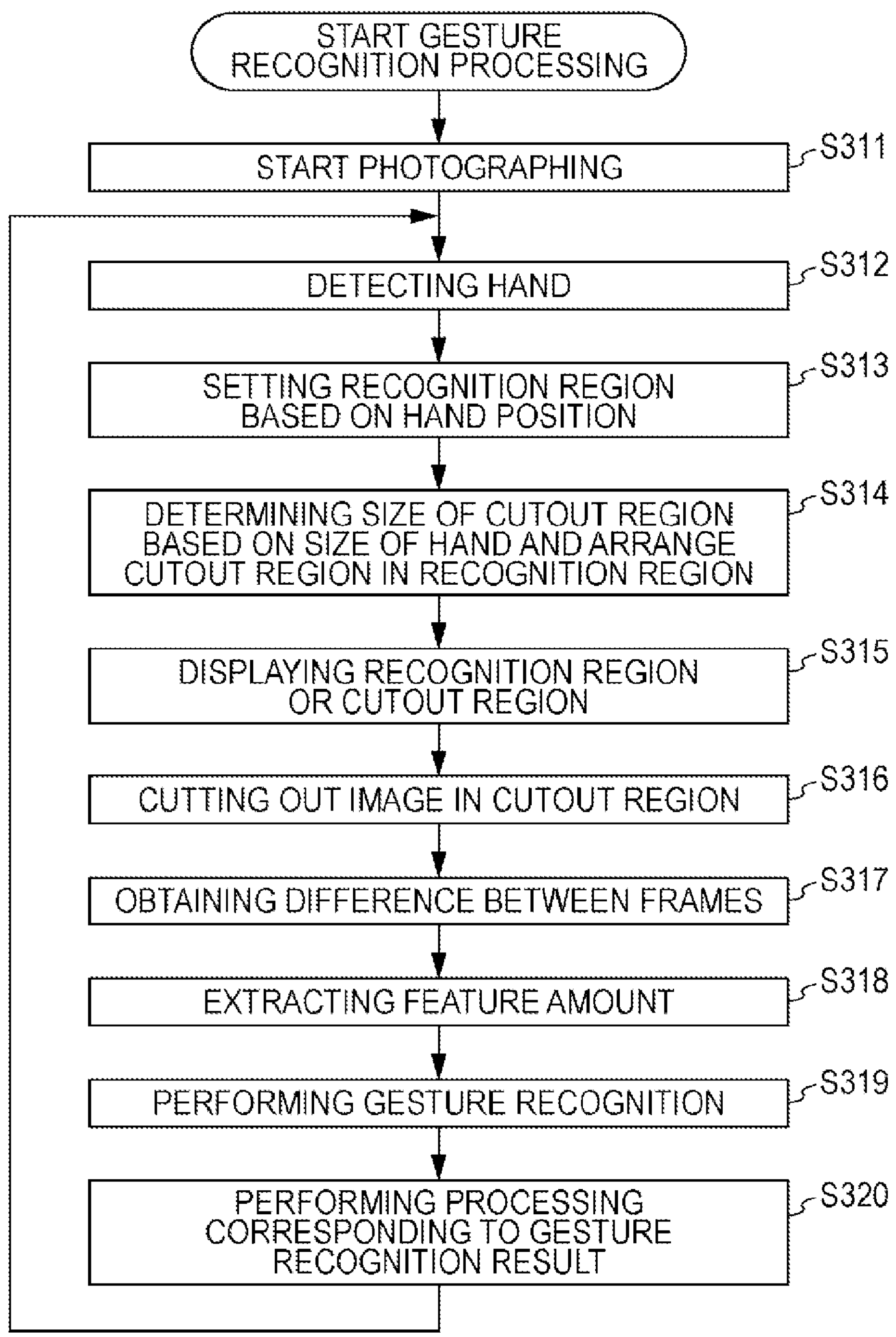
FIG. 31 is a flowchart which describes gesture recognition processing.

In addition, since processes in step S311, and steps S315 to S320 in the flowchart in FIG. 31 are the same as those in step S111, and steps S114 to S119 in FIG. 14, respectively, descriptions thereof will be omitted.

That is, in step S312, the hand detection unit 512 detects a hand.

Specifically, the hand detection unit 512 detects a hand from the photographed image in each frame based on the hand dictionary which is recorded in the hand dictionary recording unit 511, and the photographed image which is supplied from the photographing unit 11, and supplies the detection result and the photographed image to the image processing unit 513.

In step S313, the recognition region setting unit 521 sets a recognition region on the photographed image based on the hand detection result which is supplied from the hand detection unit 512. Specifically, the recognition region setting unit 521 sets the recognition region based on a position of a hand as a part of a user's body which is detected on the photographed image.

Figure 32:
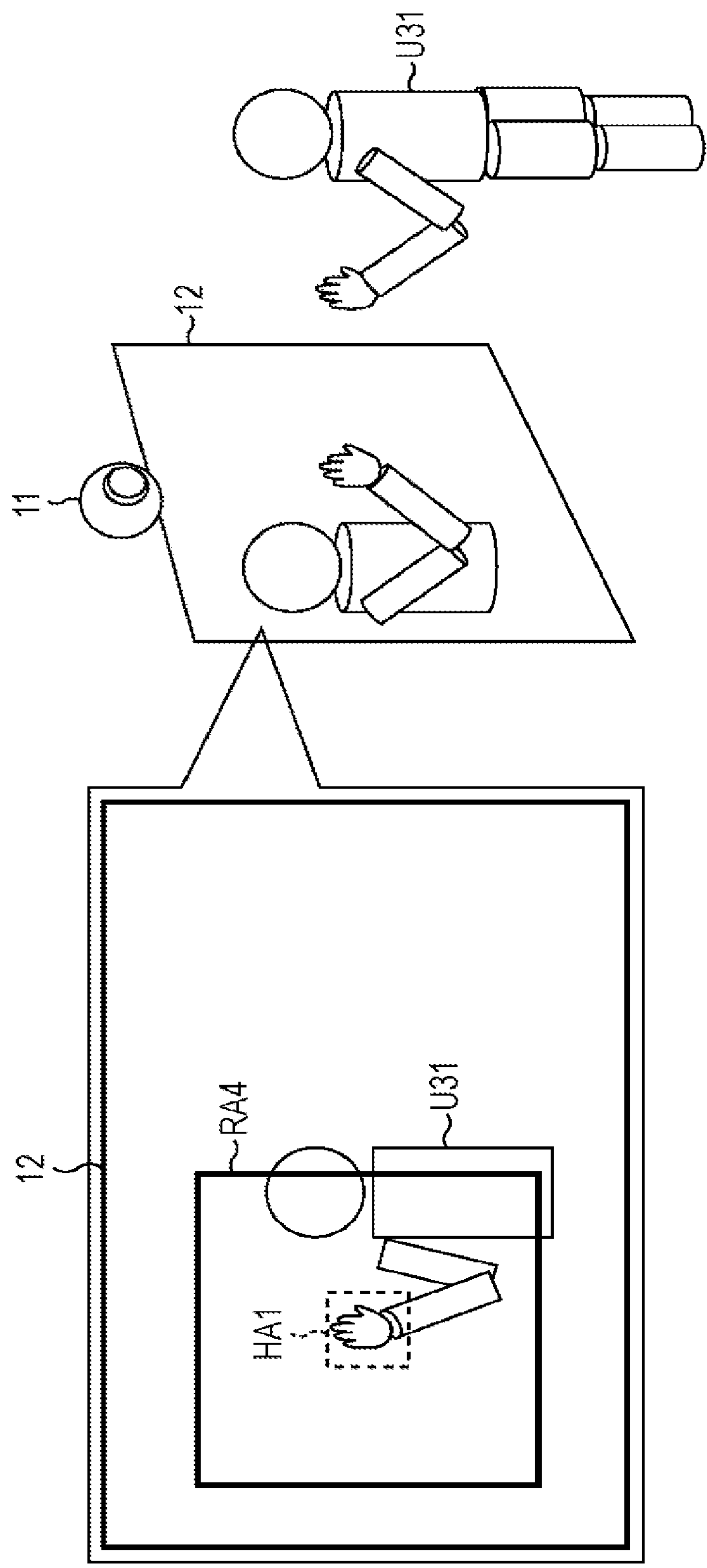
FIG. 32 is a diagram which illustrates an example of a method of setting a recognition region.

For example, as illustrated in FIG. 32, when a hand of the user U31 is detected in the photographed image which is displayed on the display unit 12, a region in a predetermined range around a position of the detected hand region HA1 is set as the recognition region RA4.

In step S313, the cutout image generation unit 522 determines the respective sizes of the plurality of cutout regions which are arranged in the recognition region which is set by the recognition region setting unit 521 based on the hand detection result which is supplied from the hand detection unit 512, and arranges the cutout region in the recognition region. Specifically, the cutout image generation unit 522 determines the size of the cutout region based on the size of the hand which is detected on the photographed image, and arranges the cutout region in the recognition region.

Figure 33:
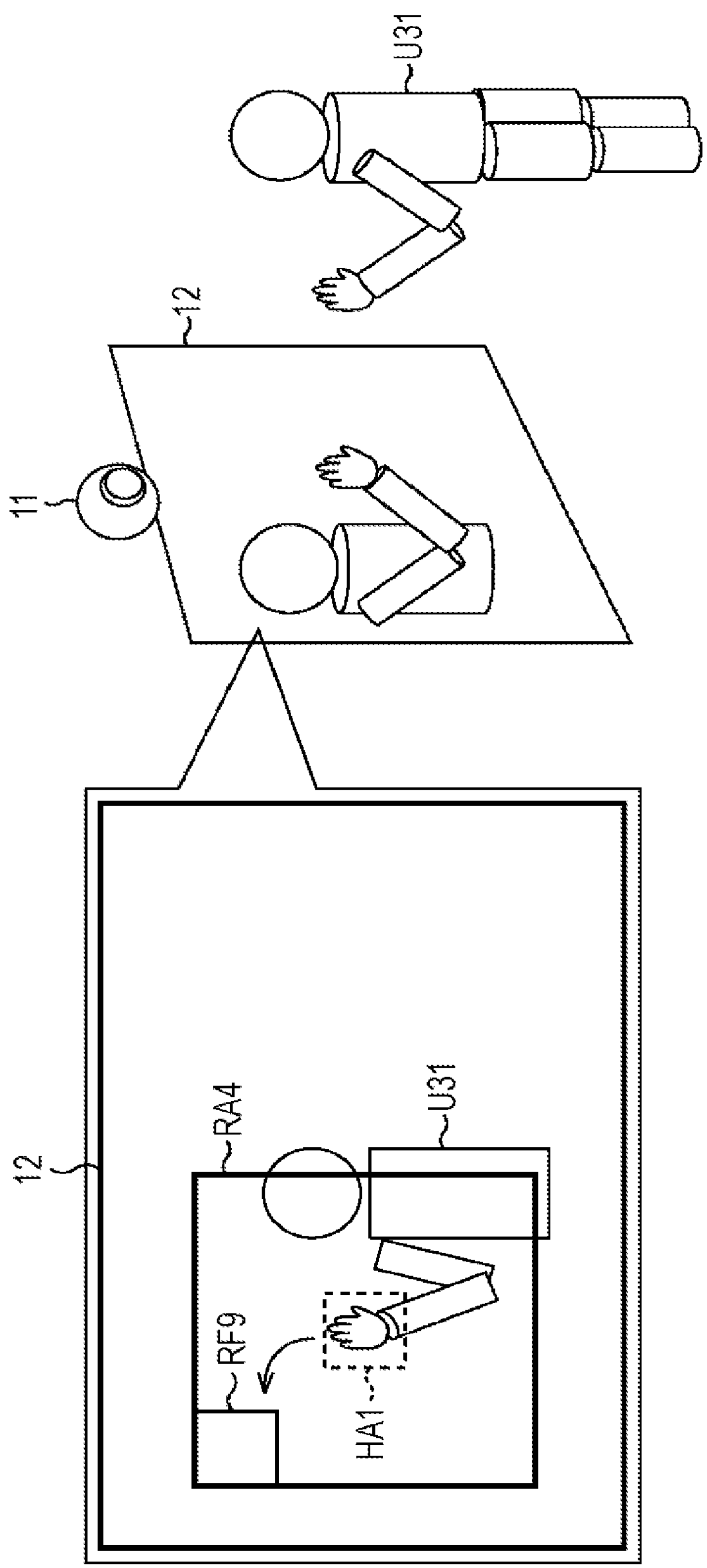
FIG. 33 is a diagram which illustrates an example of a method of determining a cutout region.

For example, as illustrated in FIG. 33, when the hand of the user U31 is detected in the photographed image which is displayed in the display unit 12, the size of the cutout region RF9 is determined based on the size of the detected hand region HA1, and the cutout region is arranged in the recognition region RA4.

Hereinafter, a recognition frame which is arranged in the recognition region is cut out, extracted from a difference image and a feature amount is which is obtained by acquiring a difference in image in each cutout region thereof. In addition, a user's gesture is recognized by recognition processing in time sequence on the basis of the feature amounts which are aligned in time sequence, and processing corresponding to the recognition result is performed.

Even in the above processing, it is possible to recognize a user's gesture in a wider range by performing gesture recognition by extracting a feature amount from a difference image with respect to the plurality of cutout regions.

In addition, since the recognition region is set based on a position of a user's hand, the recognition processing is not performed with respect to a region which is clearly not the target of the recognition processing, accordingly, it is possible to relieve a burden of processing in gesture recognition.

In addition, even in the above descriptions, the cutout region may be spread in the recognition region without being overlapped, and without leaving a space, may be arranged so as to be overlapped in the recognition region, and may be arranged with a predetermined interval in the recognition region.

In addition, in the above descriptions, a configuration has been described in which any one of the face detection unit 412 which detects a user's face, and the hand detection unit 512 which detects a user's hand is included as a unit for detecting a part of user's body on the photographed image, however, it may be a configuration in which both the face detection unit 412 and the hand detection unit 512 are included.

Eighth Embodiment

Configuration Example of Image Processing Device

Figure 34:
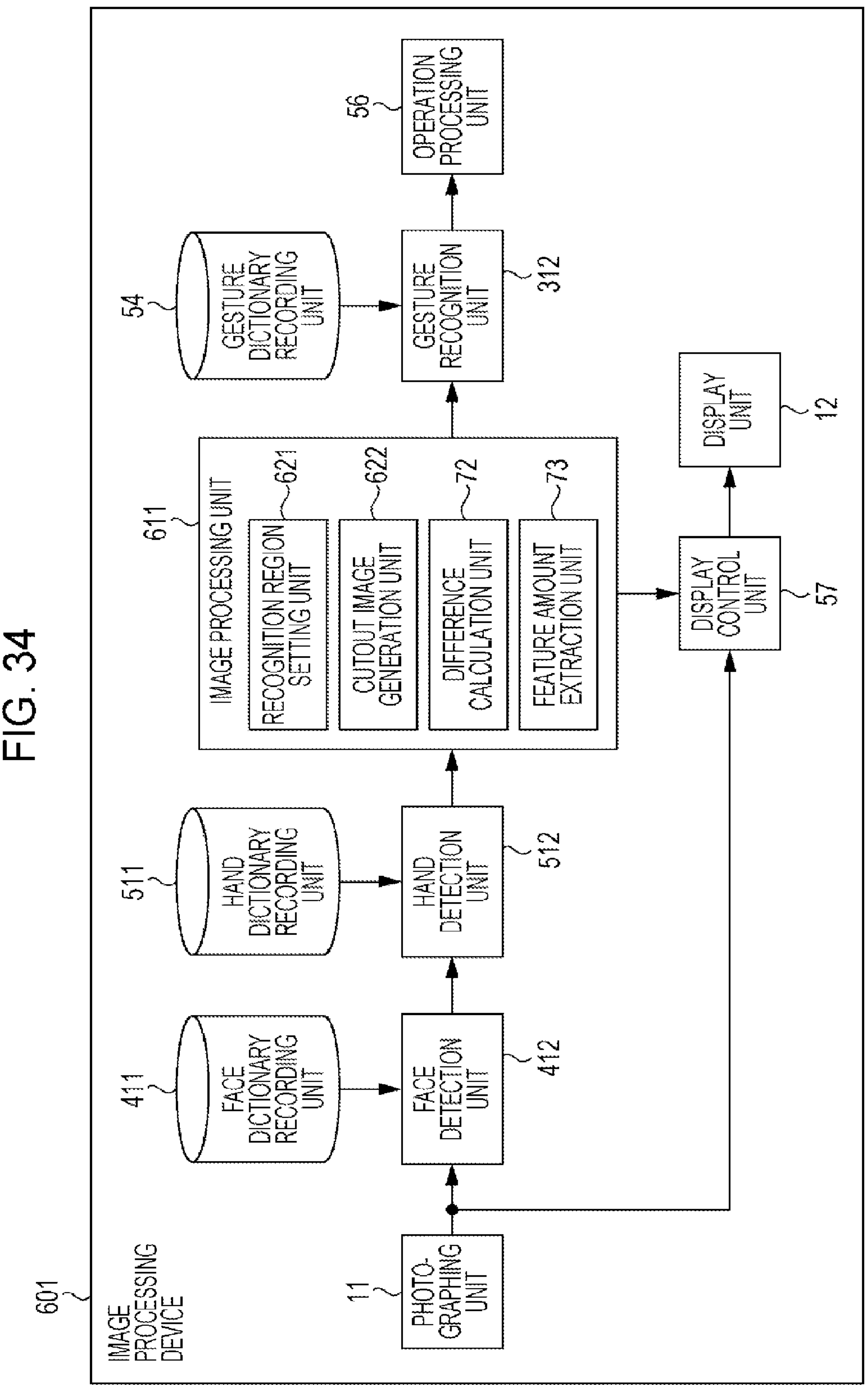
FIG. 34 is a diagram which illustrates a further another configuration example of the image processing device.

In such a case, the image processing device is configured, for example, as illustrated in FIG. 34. In addition, in FIG. 34, portions corresponding to the case in FIG. 13 are given the same reference numerals, and descriptions thereof will be suitably omitted.

An image processing device 601 in FIG. 34 is configured by a photographing unit 11, a face dictionary recording unit 411, a face detection unit 412, a hand dictionary recording unit 511, a hand detection unit 512, and image processing unit 613, a gesture dictionary recording unit 54, a gesture recognition unit 312, an operation processing unit 56, a display control unit 57, and a display unit 12.

In addition, since the face dictionary recording unit 411, and the face detection unit 412 have the same configuration as those which are provided in the image processing device 401 in FIG. 26, and the hand dictionary recording unit 511, and the hand detection unit 512 have the same configuration as those which are provided in the image processing device 501 in FIG. 30, descriptions thereof will be omitted. In addition, in FIG. 34, the face detection unit 412 detects a face from a photographed image which is supplied from the photographing unit 11, and supplies the detection result and the photographed image to the hand detection unit 512. In addition, the hand detection unit 512 detects a hand from a photographed image which is supplied from the face detection unit 412, and supplies the detection result, the detection result, and the photographed image to the image processing unit 611.

The image processing unit 613 includes a recognition region setting unit 621, a cutout image generation unit 622, a difference calculation unit 72, and a feature amount extraction unit 73. The recognition region setting unit 621 sets a recognition region based on a detection result of a face, or a hand. The cutout image generation unit 622 determines the sizes of the respective cutout regions based on the detection result of the face, or the hand, and arranges the cutout region in the recognition region. In addition, the cutout image generation unit 622 cuts out an image in the cutout region which is arranged on the photographed image, and sets the image as a cutout image.

In addition, since gesture recognition processing by the image processing device 601 is executed by combining processing in the flowcharts in the above-described FIGS. 27 and 31, detailed descriptions thereof will be omitted.

As one example, the gesture recognition processing by the image processing device 601 is executed such that, for example, in the flowchart in FIG. 27, step S312 (hand detection) of the flowchart in FIG. 31 is performed after step S212 (face detection), a recognition region based on a position of a face, or a hand is set in step S213, and a determination on a size of the cutout region is made based on the size of the face, or the hand in step S214.

In addition, even in the gesture recognition processing by the image processing device 601, it is possible to obtain the same operation and effect as those in the gesture recognition processing which is described with reference to the flowchart in FIG. 27 or 31.

Meanwhile, in the above-described processing, when an object making a similar movement to a gesture which is the recognition target is photographed, there is concern that the movement of the object may be misrecognized as the gesture which is the recognition target.

For example, when gesture recognition is performed with respect to a flick motion which is performed by the user U31 which is illustrated in FIG. 15, in the above-described processing, there is concern that a movement of the user U31 wagging the upper part of his body in right and left may be misrecognized as a flick motion due to the entire movement in the recognition region.

Therefore, in the image processing device which performs the gesture recognition processing, it is also preferable to set a configuration in which the gesture is prevented from being misrecognized.

Ninth Embodiment

Configuration Example of Image Processing Device

Figure 35:
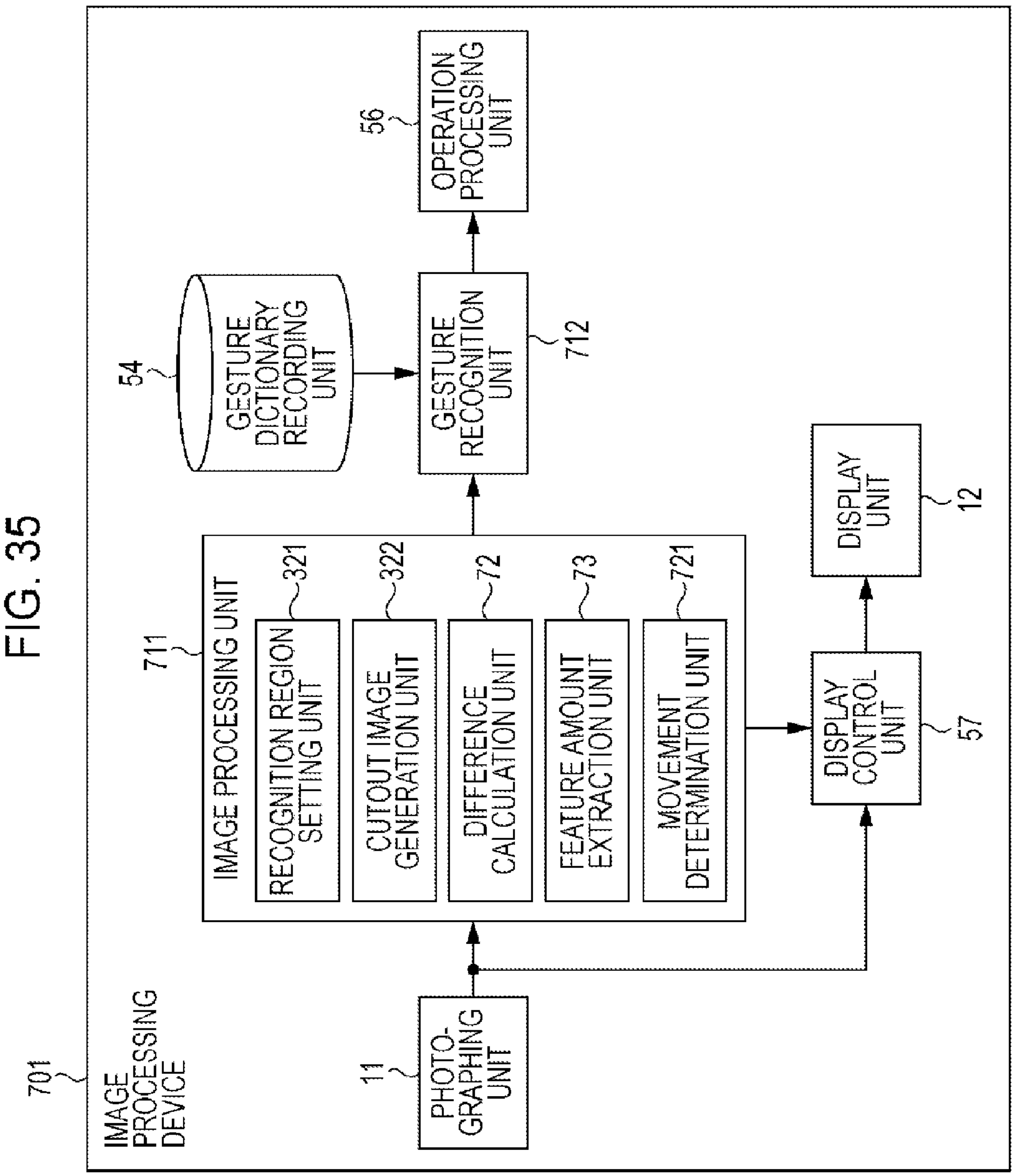
FIG. 35 is a diagram which illustrates a further another configuration example of the image processing device.

In such a case, the image processing device is configured, for example, as illustrated in FIG. 35. In addition, in FIG. 35, portions corresponding to the case in FIG. 13 are given the same reference numerals, and descriptions thereof will be suitably omitted.

An image processing device 701 in FIG. 35 is configured by a photographing unit 11, an image processing unit 713, a gesture dictionary recording unit 54, a gesture recognition unit 712, an operation processing unit 56, a display control unit 57, and a display unit 12.

The image processing unit 711 extracts a feature amount for performing gesture recognition based on a photographed image which is supplied from the photographing unit 11, supplies the feature amount to the gesture recognition unit 712, and supplies information on a cutout region or the like to the display control unit 57 as necessary.

The image processing unit 711 includes a recognition region setting unit 321, a cutout image generation unit 322, a difference calculation unit 72, a feature amount extraction unit 73, and a movement determination unit 721. The movement determination unit 721 determines a movement in the recognition region based on sizes of motion vectors in a plurality of notable points in the recognition region, and supplies the determination result to the gesture recognition unit 712.

The gesture recognition unit 712 performs the gesture recognition based on the gesture dictionary which is supplied from the gesture dictionary recording unit 54, and a feature amount in each cutout region which is supplied from the image processing unit 711 according to the determination result which is supplied from the movement determination unit 721, and supplies the recognition result to the operation processing unit 56.

Descriptions of Gesture Recognition Processing

Subsequently, gesture recognition processing by the image processing device 701 will be described with reference to a flowchart in FIG. 36.

Figure 36:
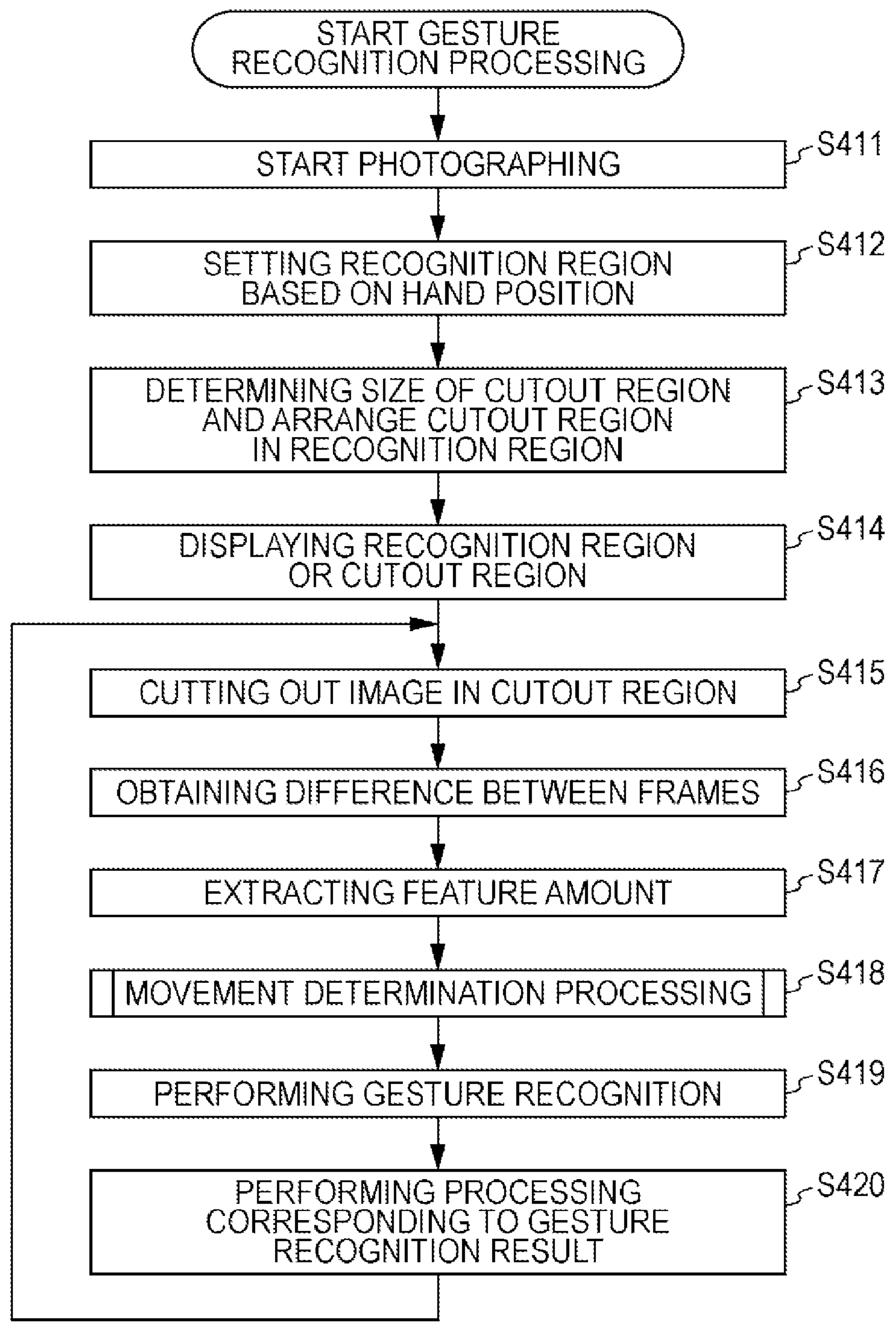
FIG. 36 is a flowchart which describes gesture recognition processing.

In addition, processes in step S411, and steps S417 to 420 in the flowchart in FIG. 36 are the same as those in steps S111 to 117, and steps S119 in the flowchart in FIG. 14, accordingly, descriptions thereof will be omitted.

That is, in step S418, the movement determination unit 721 executes movement determination processing.

Descriptions of Movement Determination Processing

Here, the movement determination processing by the movement determination unit 721 will be described with reference to a flowchart in FIG. 37.

In step S451, the movement determination unit 721 calculates a motion vector in the plurality of notable points in the recognition region using an optical flow of the photographed image which is supplied from the photographing unit 11. The notable point is assumed to be uniformly set all over the recognition region therein. In addition, the motion vector in each notable point may be calculated using another method without being limited to the method in which the optical flow is used.

In step S452, the movement determination unit 721 sorts the motion vectors which are calculated in each of the notable points by a size in the direction to which attention is paid. Here, the direction in the direction to which attention is paid is which a movement becomes particularly large in the gesture as the recognition target, and in this case, the direction is set to the horizontal direction. Hereinafter, the horizontal direction is set to x axis direction, and the vertical direction is set to the y axis direction in the photographed image. In addition, in the horizontal direction and the vertical direction, the positive direction and negative direction are arbitrarily set.

In step S453, the movement determination unit 721 normalizes the motion vectors which are sorted by the magnitudes in the x axis direction (specifically, x component of motion vector) using a maximum value thereof.

In step S454, the movement determination unit 721 converts a negative value of the motion vector to a positive value among the motion vectors which are sorted by the magnitude in the x axis direction, and are normalized using the maximum value of the size.

In step S455, the movement determination unit 721 performs predetermined threshold processing with respect to the motion vector which is sorted by the magnitude in the x axis direction, is normalized using the maximum value of the size, and is converted to the positive value.

Figure 38:
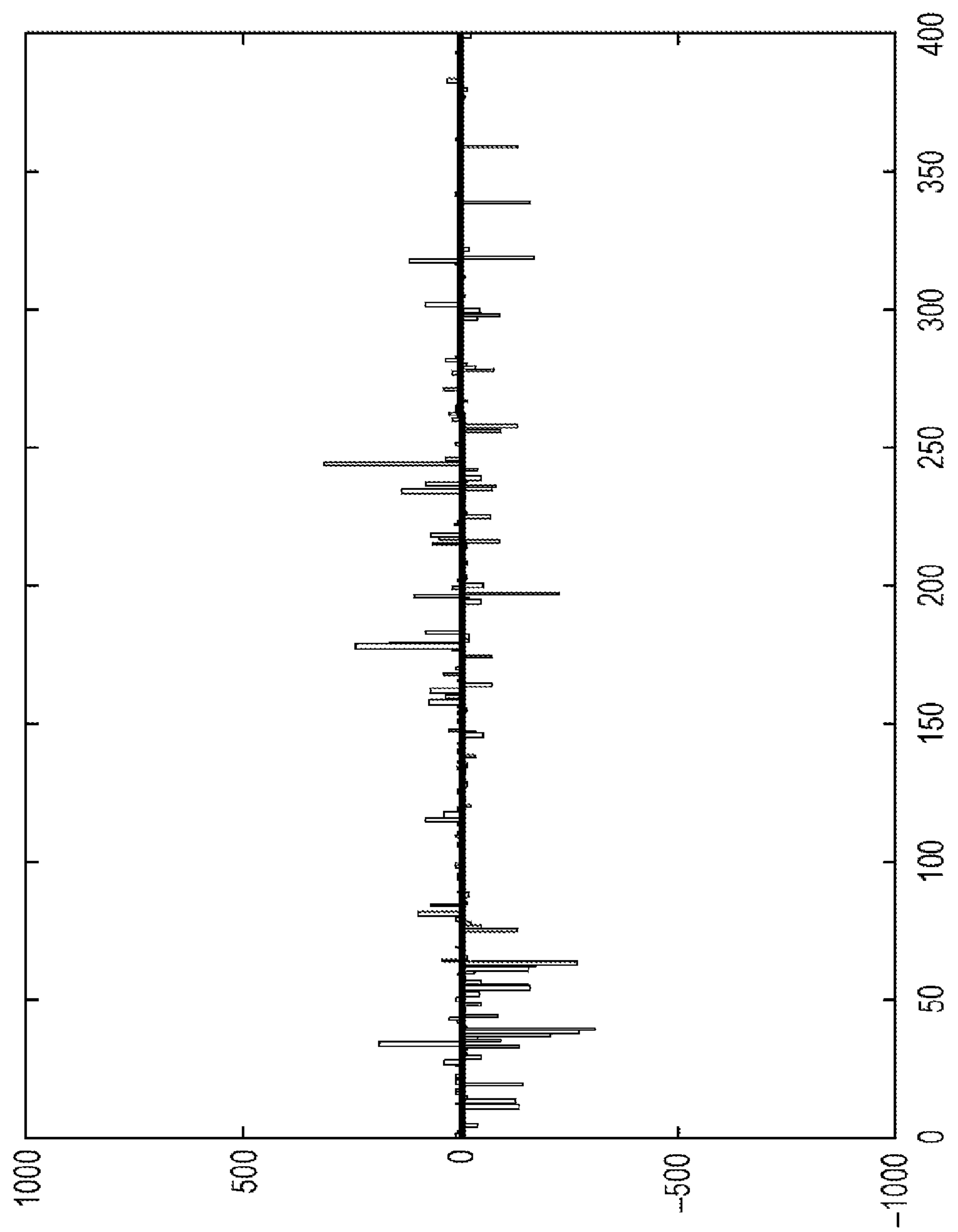
FIG. 38 is a diagram which describes a motion vector in a recognition region.

For example, in each notable point, the motion vector as illustrated in FIG. 38 is calculated. In FIG. 38, the horizontal axis denotes the notable points, and the vertical axis denotes a size of a motion vector in the x axis direction which is calculated using the optical flow.

Figure 39:
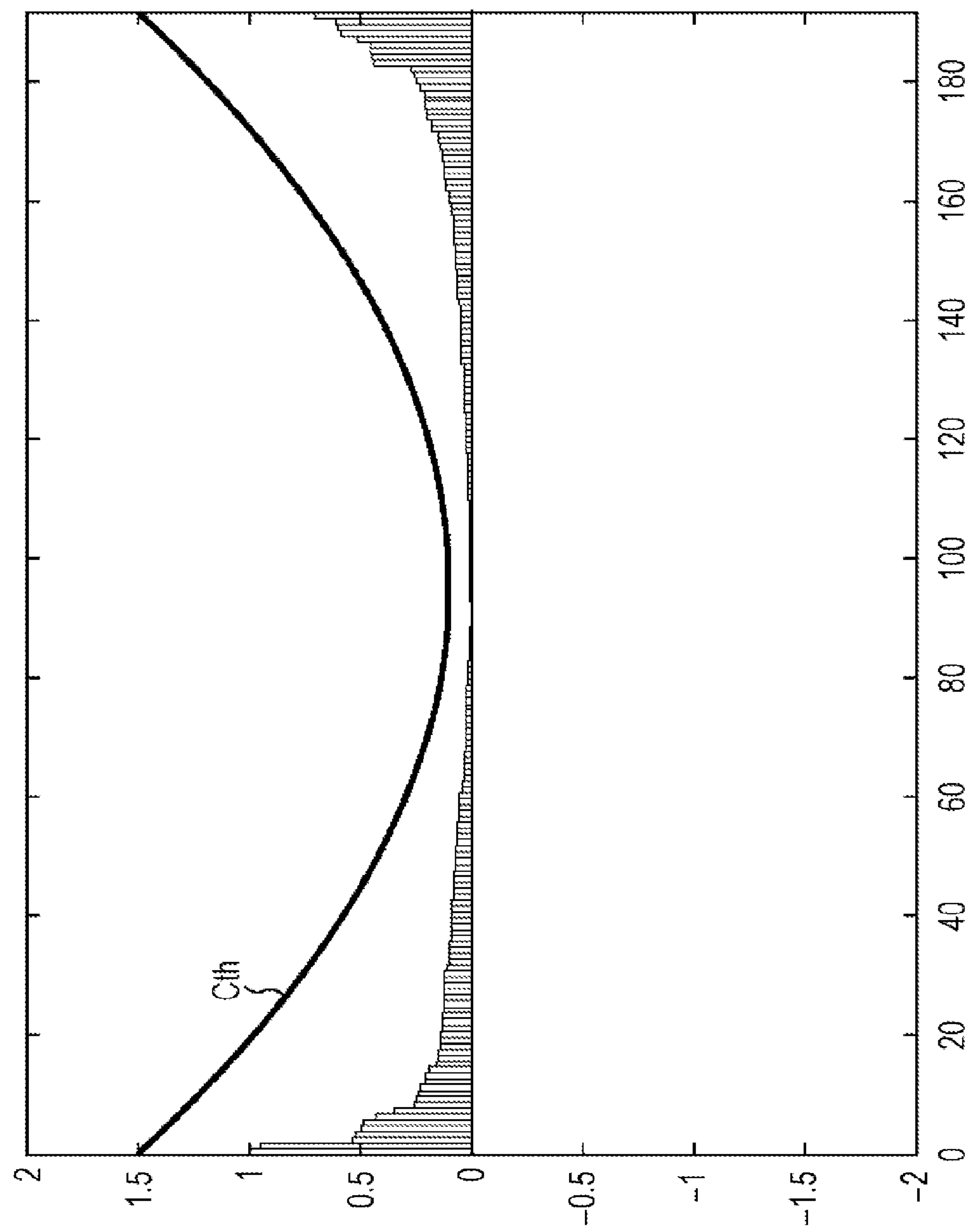
FIG. 39 is a diagram which describes a motion vector in a recognition region.

FIG. 39 illustrates a result in which such a motion vector is sorted by the magnitude, is normalized using the maximum value of the size thereof, and the negative value thereof is converted to the positive value. In FIG. 39, a motion vector which is denoted on the leftmost on the horizontal axis is the motion vector with the maximum size in the x axis direction, and a motion vector which is denoted on the right from a motion vector of which a size is approximately 0, and is near the center is the motion vector of which a value is converted to the positive value. In addition, in FIG. 39, a threshold curved line Cth which is determined according to a gesture as the recognition target image data illustrated.

That is, in step S456, a motion vector which is illustrated in FIG. 39, for example, is determined whether or not exceeds the threshold curved line Cth.

For example, it is assumed that the threshold curved line Cth is determined according to flick motions in right and left. When a user performs the flick motions in right and left, since the motion vector becomes large only in a part of region in the x axis direction in the recognition region, if the motion vector is sorted by the magnitude in the x axis direction, is normalized, and of which a negative value is converted to a positive value, it is possible to obtain a result as illustrated in FIG. 39. In this case, since the magnitude of the motion vector in the x axis direction exceeds the threshold curved line Cth, there is a possibility that a movement of a user in the recognition region is a flick motion in right and left.

On the other hand, when a user makes a movement of wagging his upper body in right and left, since a motion vector becomes large in the x axis direction, almost in the entire recognition region, when the motion vector is sorted by the magnitude, is normalized, and of which a negative value is converted to a positive value, it is possible to obtain a motion vector of which a value is high as a whole. In this case, the magnitude of the motion vector in the x axis direction exceeds the threshold curved line Cth near the center of the horizontal axis, there is no possibility that the movement of the user in the recognition region is the flick motion in right and left.

In this manner, in step S456, whether or not a user's movement is a gesture as a recognition target is determined by determining whether or not the motion vector exceeds the threshold curved line Cth. The movement determination unit 721 supplies the determination result to the gesture recognition unit 712, and the process returns to step S418 in FIG. 36.

Figure 37:
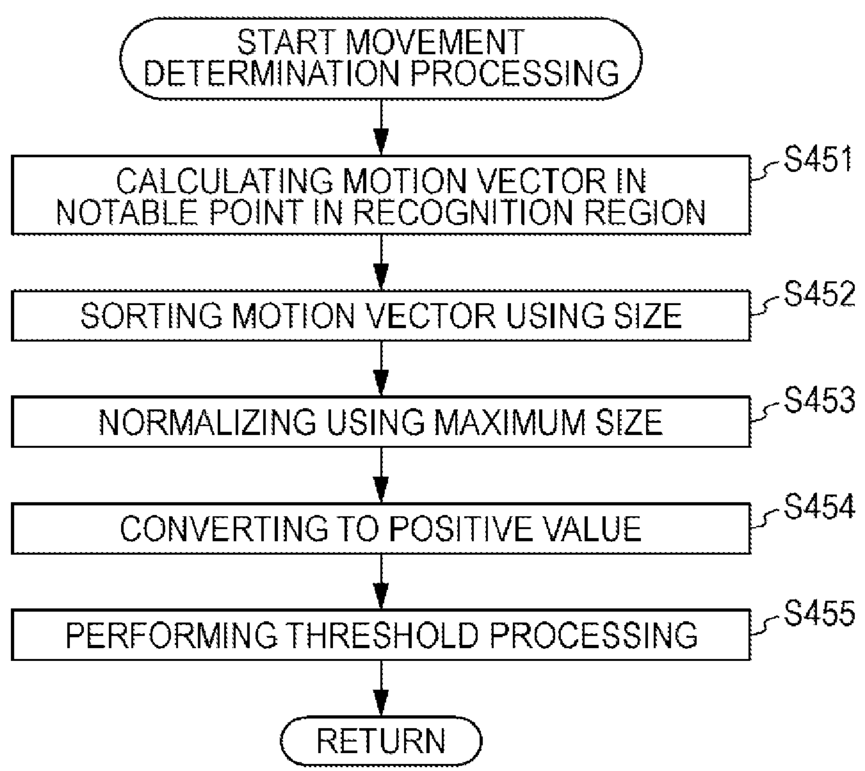
FIG. 37 is a flowchart which describes movement determination processing.

In addition, when the gesture as region is a flick motion which is made up the recognition and down, for example, in motion determination processing in FIG. 37, the above described processing is performed with respect to the magnitude of the motion vector in each notable point in the y axis direction.

Returning to the flowchart in FIG. 36, the gesture recognition unit 712 performs the gesture recognition according to the determination result which is supplied from the movement determination unit 721 in step S419 after step 418, and supplies the recognition result to the operation processing unit 56. That is, when a determination result that the user's movement is a gesture which is the recognition target is supplied from the movement determination unit 721, the gesture recognition unit 712 performs the gesture recognition. In addition, when a determination result that the user's movement is not the gesture which is the recognition target is supplied from movement determination unit 721, the gesture recognition unit 712 does not perform the gesture recognition.

As described above, the image processing device 701 determines a user's movement based on a size of the motion vector in the recognition region on the photographed image. In addition, the image processing device 701 recognizes a user's gesture according to the determination result, and performs processing corresponding to the recognition result.

In this manner, even when an object making a movement similar to the gesture which is the recognition target is photographed, the movement of the object can be prevented from being misrecognized as the gesture which is the recognition target by determining the user's movement.

In addition, the movement determination unit 721 which executes the above-described movement determination processing may be provided in the image processing devices 401, 501, and 601.

Meanwhile, in the above description, in the set recognition region, cutout regions with the same size are assumed to be arranged, however, cutout regions with a plurality of sizes may be arranged.

In addition, a density in the cutout region may be increased by arranging the cutout region so as to be overlapped in the recognition region as illustrated in FIG. 23 in a current frame as the processing target, in a region which is performed with the gesture recognition in the previous frame. In this manner, it is possible to further increase precision of the gesture recognition, since there is a high possibility that the gesture recognition is performed in any of the cutout regions even when a user make a gesture at a position which is deviated to some extent in the vertical direction or in the horizontal direction.

In addition, when a motion of a finger is recognized as a motion of a hand by reducing the size of the cutout region, it is also possible to recognize a smaller motion than a flick motion in right and left using a hand, for example, a flick motion in right and left using a finger as a gesture.

In addition, in each of a plurality of portions in the recognition region, the same gesture recognition may be performed at the same time. In this manner, for example, a gesture using both hands in right and left is recognized, and it is possible to execute an operation input such as so-called multi-touch.

In addition, a part of processes according to the above-described fifth to ninth embodiments may be performed using another device which is connected through a communication network, or the like, which is described in configurations of the third and fourth embodiments.

Application Example to System

Meanwhile, the above-described gesture recognition processing can be applied to various systems.

Figure 40:
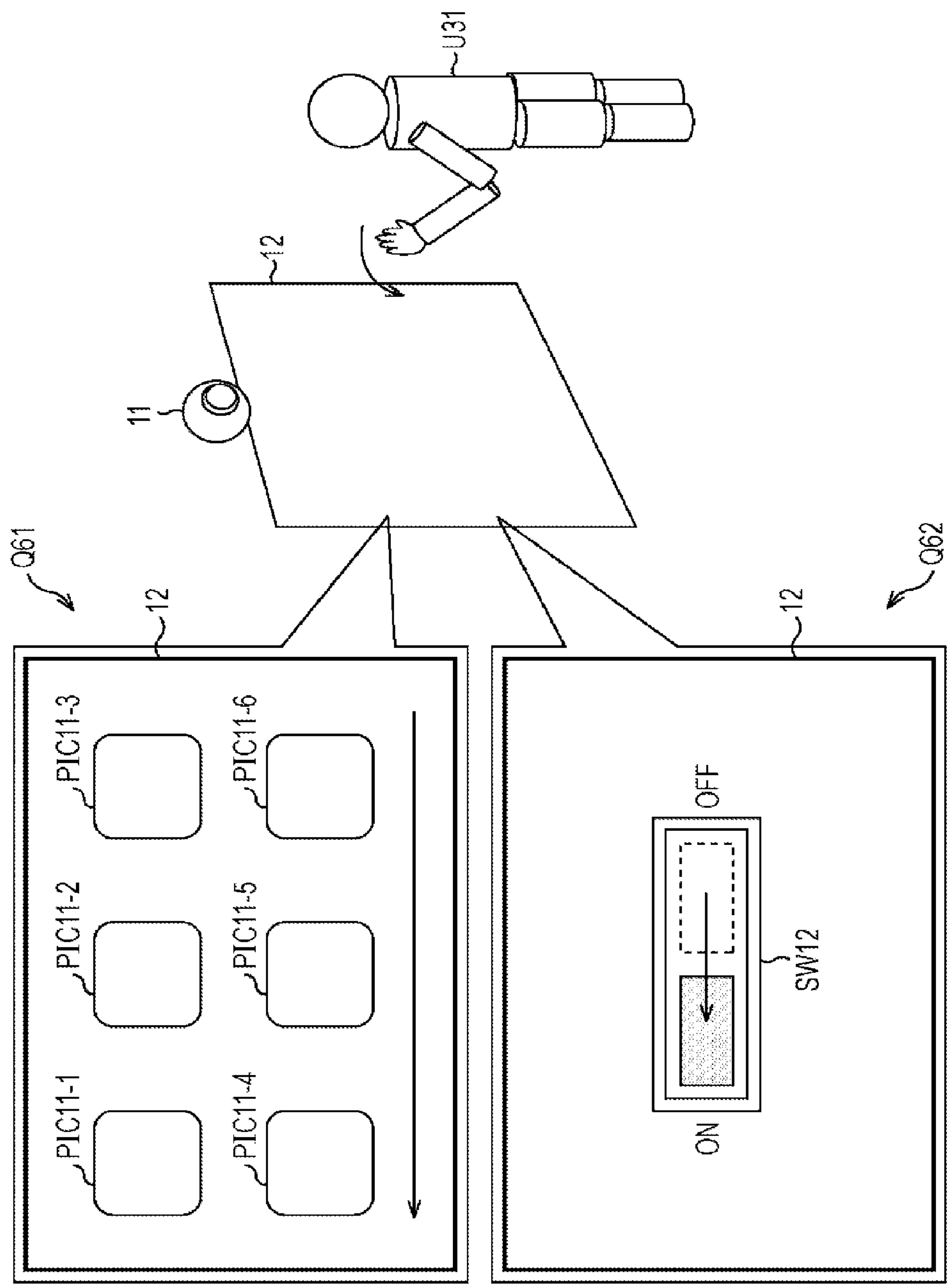
FIG. 40 is a diagram which describes an application example of a system in the present technology.

The above-described gesture recognition processing can be applied to a system which displays thumbnails PIC11-1 to PIC11-6 corresponding to image data which is recorded in a recording medium (not shown) on the display unit 12, for example, as denoted in the arrow Q61 in FIG. 40. In the arrow Q61 in FIG. 40, the user U31 is able to scroll a screen on which the thumbnails PIC11-1 to PIC11-6 are displayed on the display unit 12 to the left, by performing a flick motion from right to left.

In addition, as denoted in the arrow Q62 in FIG. 40, the above-described gesture recognition processing can be applied, for example, to a system in which a sliding-type switch SW12 is displayed on the display unit 12. In the arrow Q62 in FIG. 40, the user U31 is able to switch the displayed switch SW12 from OFF to ON in the display unit 12, by performing the flick motion from right to left.

In addition, though not shown, the above-described gesture recognition processing can be applied, for example, to a television receiver. In the example, the user is able to select a channel of a program, or connected equipment such as a recorder which is connected to the television receiver by performing the flick motion from right to left.

The above-described gesture recognition processing can be applied to a system including a user interface in which a display on a display unit is controlled using a gesture at a position which is separated from the display unit, without being limited to the above-described examples.

In addition, the recognized gesture are not limited to a left-and-right flick motion, and it may be a flick motion which is performed up and down, or other motions than that, naturally.

Meanwhile, the above-described series of processes can be executed by hardware, or can be executed by software.

When the series of processes is executed by the software, a program which configures the software is installed in a computer. Here, in the computer, a computer which is incorporated in dedicated hardware, or, for example, a general purpose personal computer which is able to execute various functions by installing various programs, or the like is included.

Figure 41:
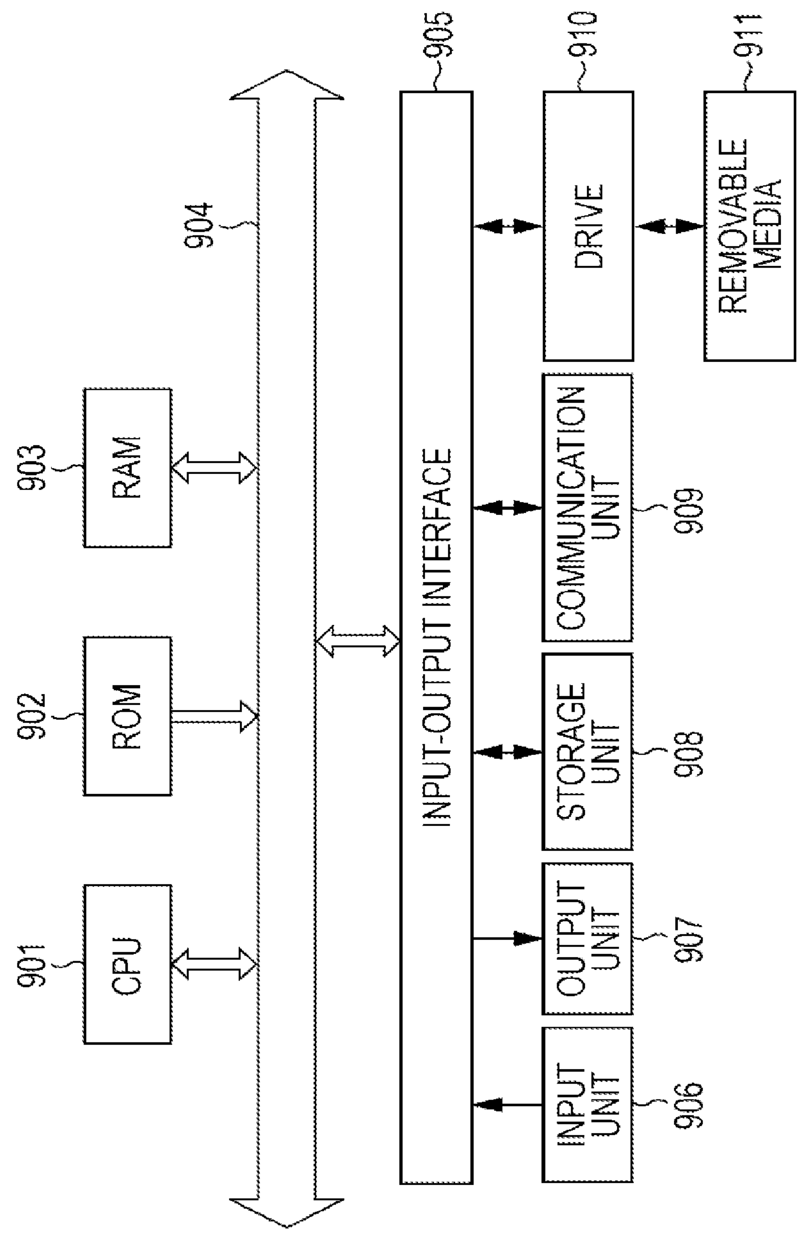
FIG. 41 is a diagram which illustrates a configuration example of a computer.

FIG. 41 is a block diagram which illustrates a configuration example of hardware of a computer in which the above-described series of processes is executed using a program.

In the computer, a CPU (Central Processing Unit) 901, a ROM (Read Only Memory) 902, a RAM (Random Access Memory) 903 are connected to each other through a bus 904.

In the bus 904, an input-output interface 905 is further connected. The input-output interface 905 is connected with an input unit 906, an output unit 907, a recording unit 908, a communication unit 909, and a drive 910.

The input unit 906 is configured by a keyboard, a mouse, a microphone, and the like. The output unit 907 is configured by a display, a speaker, and the like. The recording unit 908 is configured by a hard disk, a nonvolatile memory, or the like. The communication unit 909 is configured by a network interface, or the like. The drive 910 drives a magnetic disk, an optical disc, a magneto-optical disc, or a removable media 911 such as a semiconductor memory.

In the computer which is configured as described above, the above-described series of processes is performed, for example, when the CPU 901 executes the program which is recorded in the recording unit 908 by loading to the RAM 903 through the input-output interface 905, and the bus 904.

The program which is executed by the computer (CPU 901) can be provided by being recorded in the removable media 911, for example, as a package media or the like. In addition, the program can be provided through a wired, or wireless transmission medium such as a local area network, the Internet, a digital satellite broadcasting.

In the computer, the program can be installed to the recording unit 908 through the input-output interface 905 by mounting the removable media 911 on the drive 910. In addition, the program can be installed to the recording unit 908 by being received in the communication unit 909 through a wired, or wireless transmission medium. In addition to that, the program can be installed to the ROM 902, or the recording unit 908 in advance.

In addition, the program which is executed by the computer may be a program in which processes are performed in time sequence according to an order which is described in the specification, and may be a program in which processes are performed in parallel, or at a necessary timing such as when called.

In addition, the embodiments of the present technology are not limited to the above-described embodiments, and various changes can be made without departing from the scope of the present technology.

For example, the present technology is able to adopt a configuration of cloud computing in which one function is jointly processed, by being shared in a plurality of devices through a network.

In addition, each step which is described in the above-described flowchart can be executed in one device, and in the plurality of devices by being shared.

Further, when a plurality of processes are included in one step, the plurality of processes which are included in one step can be executed in one device, and in the plurality of devices by being shared.

Further, the present technology can also adopt the following configuration.

[1] An image processing device which includes a difference image generation unit which generates a difference image by obtaining a difference between frames of a cutout image which is obtained by cutting out a predetermined region on a photographed image; a feature amount extracting unit which extracts a feature amount from the difference image; and a recognition unit which recognizes a specific movement of an object on the photographed image.

[2] The image processing device which is disclosed in [1], in which the recognition unit recognizes a gesture by a user's hand as a specific movement of the object.

[3] The image processing device which is disclosed in [2], further includes a hand detection unit which detects the user's hand from the photographed image; and a cutout region determination unit which determines the predetermined region based on a position of the detected user's hand on the photographed image.

[4] The image processing device which is disclosed in [3], in which the cutout region determination unit determines the predetermined region based on the position of the user's hand when the detected user's hand is located in a certain range on the photographed image with respect to the photographed image of a continuous plurality of frames.

[5] The image processing device which is disclosed in [2], further includes a cutout region determination unit the predetermined region by obtaining a frames in each region on the photographed which determines difference between image.

[6] The image processing device which is disclosed in [2], in which the predetermined region is a region which is predetermined on the photographed image.

[7] The image forming apparatus which is disclosed in [2] further includes, a region setting unit which sets a recognition region in which the plurality of predetermined regions are arranged on the photographed image, in which the difference image generation unit generates the difference image in each of the predetermined regions which is arranged in the recognition region; the feature amount extraction unit extract the feature amount from the difference image in each of the predetermined regions; and the recognition unit recognizes a gesture of the user based on the feature amount which is obtained from the plurality of difference images which are aligned in time sequence in each of the predetermined regions.

[8] The image processing device which is disclosed in [7] further includes a cutout region determination unit which determines sizes of the respective predetermined regions, and is arranged in the recognition region.

[9] The image processing device which is disclosed in [8] further includes a detection unit which detects a part of the user's body from the photographed image; and the region setting unit sets the recognition region based on a position on the photographed image of the part of the user's body which is detected.

[10] The image processing device which is disclosed in [9] in which the cutout region determination unit determines sizes of the respective predetermined regions based on a size of the part of the user's body which is detected.

The detection unit may be caused to detect the user's hand from the photographed image.

[11] The image processing device which is disclosed in [9] in which the detection unit detects the user's face from the photographed image.

[12] The image processing device which is disclosed in [9] in which the detection unit detects the user's hand from the photographed image.

[13] The image processing device which is disclosed in any of [7] to [12] further includes a movement determination unit which determines a movement in the recognition region based on a magnitude of a motion vector in the recognition region, and in which the recognition unit recognizes a gesture of the user according to a determination result by the movement determination unit.

[14] The image processing device which is disclosed in any of [2] to [13], further includes a display control unit which causes a display unit to display the user on the photographed image, and an image denoting a position of the predetermined region.

[15] The image processing device which is disclosed in [14], further includes a motion processing unit which executes processing corresponding to a recognized gesture when the user's gesture is recognized.

[16] The image processing device which is disclosed in [15], in which the display control unit causes the plurality of display units to display the image denoting a position of the predetermined region, and the motion processing unit executes processing which is determined by the predetermined region in which the user's gesture is recognized among the plurality of predetermined regions, and the recognized gesture.

[17] The image processing device which is disclosed in any of [14 J to [16 J, in which the display control unit causes the display unit to display a fact that gesture recognition is being performed, or the user's gesture has been recognized.

[18] The image processing device which is disclosed in any of [2] to [17], in which the feature amount extraction unit divides the difference image into a plurality of blocks, and extracts average luminance of pixels in the block as the feature amount of the blocks.

CROSS-REFERENCE TO RELATED APPLICATION

The present application is a continuation of U.S. patent application Ser. No. 13/734,010 filed on Jan. 4, 2013 which claims priority of Japanese Patent application JP 2012-004837 filed in the Japan Patent Office on Jan. 13, 2012 and Japanese Patent Application JP 2012-265234 filed in the Japan Patent Office on Dec. 4, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing device, comprising:

a central processing unit (CPU) configured to:

detect one of a part of a body or the body as a target to be recognized from a photographed image, wherein the photographed image is aligned in time sequence; and set a recognition region on the photographed image based on the detected one of the part of the body or the body;

track the recognition region in the photographed image;

extract a feature amount from the tracked recognition region in the photographed image;

determine a movement in the set recognition region based on a magnitude of a motion vector in the set recognition region;

recognize a specific movement of the one of the part of the body or the body based on the determined movement;

generate a frame that denotes the recognition region; and control display of the frame.

2. The image processing device according to claim 1, wherein the CPU is further configured to recognize a gesture by the one of the part of the body or the body based on the extracted feature amount.

3. The image processing device according to claim 1, wherein the CPU is further configured to determine a plurality of sub-regions based on the tracked recognition region in the photographed image.

4. The image processing device according to claim 3, wherein the CPU is further configured to determine the plurality of sub-regions based on the detected one of the part of the body or the body.

5. The image processing device according to claim 3, wherein the CPU is further configured to generate a difference image in each of the plurality of sub-regions in the set recognition region.

6. The image processing device according to claim 1, wherein the CPU is further configured to recognize a gesture of the one of the part of the body or the body as the specific movement.

7. The image processing device according to claim 1, wherein the CPU is further configured to control display of an image, wherein the image denotes a position of the frame.

8. The image processing device according to claim 1, wherein the CPU is further configured to control a plurality of display devices to display the frame and an image that denotes a position of the frame.

9. The image processing device according to claim 1, wherein the CPU is further configured to control a display device to display a gesture recognition process.

10. The image processing device according to claim 1, wherein the CPU is further configured to extract the feature amount based on an average luminance of a plurality of pixels in the photographed image.

11. An image processing method, comprising:

detecting one of a part of a body or the body as a target to be recognized from a photographed image, wherein the photographed image is aligned in time sequence; and setting a recognition region on the photographed image based on the detected one of the part of the body or the body;

tracking the set recognition region in the photographed image;

extracting a feature amount from the tracked recognition region in the photographed image;

determining a movement in the set recognition region based on a magnitude of a motion vector in the set recognition region;

recognizing a specific movement of the one of the part of the body or the body based on the determined movement;

generating a frame denoting the recognition region; and controlling display of the frame.

12. A non-transitory computer readable medium having stored thereon computer-readable instructions, which when executed by a computer, cause the computer to execute operations, the operations comprising:

detecting one of a part of a body or the body as a target to be recognized from a photographed image, wherein the photographed image is aligned in time sequence; and setting a recognition region on the photographed image based on the detected one of the part of the body or the body;

tracking the set recognition region in the photographed image;

extracting a feature amount from the tracked recognition region in the photographed image;

determining a movement in the set recognition region based on a magnitude of a motion vector in the set recognition region;

recognizing a specific movement of the one of the part of the body or the body based on the determined movement;

generating a frame denoting the recognition region; and controlling display of the frame.

* * * * *